US012134580B2

(12) United States Patent
Ellison et al.

(10) Patent No.: US 12,134,580 B2
(45) Date of Patent: *Nov. 5, 2024

(54) ALUMINOBOROSILICATE GLASS SUBSTANTIALLY FREE OF ALKALI OXIDES

(71) Applicant: CORNING INCORPORATED, Corning, NY (US)

(72) Inventors: Adam James Ellison, Corning, NY (US); Jason Sanger Frackenpohl, Corning, NY (US); John Christopher Mauro, Boalsburg, PA (US); Douglas Miles Noni, Jr., Horseheads, NY (US); Natesan Venkataraman, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 594 days.

This patent is subject to a terminal disclaimer.

(21) Appl. No.: 17/492,772

(22) Filed: Oct. 4, 2021

(65) Prior Publication Data

US 2022/0024804 A1 Jan. 27, 2022

Related U.S. Application Data

(63) Continuation of application No. 17/221,926, filed on Apr. 5, 2021, now Pat. No. 11,168,018, which is a continuation of application No. 16/142,814, filed on Sep. 26, 2018, now Pat. No. 10,988,405, which is a continuation of application No. 15/136,189, filed on Apr. 22, 2016, now Pat. No. 10,112,865, which is a continuation of application No. 14/458,565, filed on Aug. 13, 2014, now Pat. No. 9,346,705.

(60) Provisional application No. 61/878,829, filed on Sep. 17, 2013, provisional application No. 61/866,168, filed on Aug. 15, 2013.

(51) Int. Cl.
| | |
|---|---|
| *C03C 3/091* | (2006.01) |
| *B32B 17/00* | (2006.01) |
| *B32B 17/06* | (2006.01) |
| *C03B 17/02* | (2006.01) |
| *C03C 3/085* | (2006.01) |
| *C03C 3/087* | (2006.01) |
| *C03C 13/04* | (2006.01) |

(52) U.S. Cl.
CPC .............. *C03C 3/091* (2013.01); *B32B 17/00* (2013.01); *B32B 17/06* (2013.01); *B32B 2457/20* (2013.01); *C03B 17/02* (2013.01); *C03C 3/085* (2013.01); *C03C 3/087* (2013.01); *C03C 13/046* (2013.01); *Y02P 40/57* (2015.11)

(58) Field of Classification Search
CPC .................................................... C03C 3/091
See application file for complete search history.

(56) References Cited

U.S. PATENT DOCUMENTS

| | | |
|---|---|---|
| 3,008,841 A | 11/1961 | Tiede |
| 3,673,049 A | 6/1972 | Giffen et al. |
| 3,737,294 A | 6/1973 | Dumbaugh et al. |
| 3,746,526 A | 7/1973 | Giffon |
| 3,849,097 A | 11/1974 | Giffen et al. |
| 3,931,438 A | 1/1976 | Beall et al. |
| 4,102,664 A | 7/1978 | Dumbaugh, Jr. |
| 4,214,886 A | 7/1980 | Shay et al. |
| 4,350,532 A | 9/1982 | Randklev |
| 4,554,259 A | 11/1985 | Franklin et al. |
| 5,116,787 A | 5/1992 | Dumbaugh, Jr. |
| 5,342,426 A | 8/1994 | Dumbaugh, Jr. |
| 5,348,916 A | 9/1994 | Kushitani et al. |
| 5,489,558 A | 2/1996 | Moffatt et al. |
| 5,559,060 A | 9/1996 | Dumbaugh et al. |
| 5,785,726 A | 7/1998 | Dorfeld et al. |
| 5,801,109 A | 9/1998 | Nishizawa et al. |
| 5,811,361 A | 9/1998 | Miwa |
| 5,824,127 A | 10/1998 | Bange et al. |
| 5,851,939 A | 12/1998 | Miwa |
| 6,096,670 A | 8/2000 | Lautenschlaeger et al. |
| 6,128,924 A | 10/2000 | Bange et al. |
| 6,169,047 B1 | 1/2001 | Nishizawa et al. |
| 6,287,674 B1 | 9/2001 | Verlinden et al. |
| 6,319,867 B1 | 11/2001 | Chacon et al. |
| 6,329,310 B1 | 12/2001 | Peuchert et al. |
| 6,417,124 B1 | 7/2002 | Peuchert et al. |
| 6,465,381 B1 | 10/2002 | Lautenschlaeger et al. |
| 6,468,933 B1 | 10/2002 | Narita et al. |
| 6,537,937 B1 | 3/2003 | Nishizawa et al. |
| 6,680,266 B1 | 1/2004 | Peuchert et al. |
| 6,707,526 B2 | 3/2004 | Peuchert et al. |

(Continued)

FOREIGN PATENT DOCUMENTS

| | | |
|---|---|---|
| CN | 1531007 A | 9/2004 |
| CN | 1807308 A | 7/2006 |

(Continued)

OTHER PUBLICATIONS

Chinese Patent Application No. 202110371219.2, Office Action, dated Jul. 1, 2022, 5 pages, Chinese Patent Office.
Chinese Patent Application No. 201480056637.0 Notice on Reexamination dated Dec. 23, 2020; 6 Pages (English Translation Only) Chinese Patent Office.
Ellison et al; U.S. Appl. No. 61/821,426; "Alkali-Free Phosphoborosilicate Glass;" filed May 2013; 24 pages.

(Continued)

*Primary Examiner* — Elizabeth A. Bolden
(74) *Attorney, Agent, or Firm* — Kevin M. Able

(57) ABSTRACT

An aluminoborosilicate glass includes alkaline earth oxides and is substantially free of alkali oxides. The glass may be fusion formable and may be useful as a substrate or other article, such as with consumer and commercial electronic devices.

14 Claims, 5 Drawing Sheets

(56) References Cited

U.S. PATENT DOCUMENTS

| | | | |
|---|---|---|---|
| RE38,959 E | 1/2006 | Kohli | |
| 6,992,030 B2 | 1/2006 | Paulson | |
| 7,153,797 B2 | 12/2006 | Peuchert | |
| 7,157,392 B2 | 1/2007 | Peuchert et al. | |
| 7,201,965 B2 | 4/2007 | Gulati et al. | |
| 7,323,426 B2 | 1/2008 | Aitken | |
| 7,323,427 B2 | 1/2008 | Wolff et al. | |
| 7,470,642 B2 | 12/2008 | Fechner et al. | |
| 7,514,149 B2 | 4/2009 | Bocko et al. | |
| 7,534,734 B2 | 5/2009 | Ellison | |
| 7,635,521 B2 | 12/2009 | Aitken et al. | |
| 7,696,113 B2 | 4/2010 | Ellison | |
| 7,763,559 B2 | 7/2010 | Kurachi et al. | |
| 8,007,913 B2 | 8/2011 | Coppola et al. | |
| 8,129,299 B2 | 3/2012 | Kishimoto et al. | |
| 8,349,751 B2 | 1/2013 | Nagai et al. | |
| 8,445,394 B2 | 5/2013 | Aitken et al. | |
| 8,497,220 B2 | 7/2013 | Murata | |
| 8,697,590 B2 | 4/2014 | Li et al. | |
| 8,796,165 B2 | 8/2014 | Ellison et al. | |
| 8,835,335 B2 | 9/2014 | Murata et al. | |
| 9,023,421 B2 | 5/2015 | Nakashima | |
| 9,096,462 B2 | 8/2015 | Li | |
| 9,266,769 B2 | 2/2016 | Aitken et al. | |
| 9,346,705 B2 | 5/2016 | Kiczenski et al. | |
| 9,512,030 B2 | 12/2016 | Mauro | |
| 9,643,884 B2 * | 5/2017 | Ellison | C03C 3/095 |
| 10,000,409 B2 * | 6/2018 | Ellison | C03C 13/046 |
| 10,112,865 B2 | 10/2018 | Kiczenski et al. | |
| 11,168,018 B2 * | 11/2021 | Ellison | C03C 3/091 |
| 2001/0034293 A1 | 10/2001 | Peuchert et al. | |
| 2001/0034294 A1 | 10/2001 | Peuchert et al. | |
| 2002/0013210 A1 | 1/2002 | Peuchert et al. | |
| 2002/0032117 A1 | 3/2002 | Peuchert et al. | |
| 2002/0151426 A1 | 10/2002 | Murata et al. | |
| 2003/0087746 A1 | 5/2003 | Ritter et al. | |
| 2003/0129417 A1 | 7/2003 | Chen et al. | |
| 2004/0209758 A1 | 10/2004 | Peuchert et al. | |
| 2006/0003884 A1 | 1/2006 | Nishizawa et al. | |
| 2006/0127679 A1 | 6/2006 | Gulati et al. | |
| 2006/0242996 A1 | 11/2006 | DeAngelis et al. | |
| 2007/0158317 A1 | 7/2007 | Brix et al. | |
| 2007/0190338 A1 | 8/2007 | Aitken et al. | |
| 2007/0190340 A1 | 8/2007 | Coppola et al. | |
| 2007/0213194 A1 | 9/2007 | Abensour et al. | |
| 2008/0194394 A1 | 8/2008 | Lecomte | |
| 2008/0206494 A1 | 8/2008 | Kurachi et al. | |
| 2009/0129061 A1 | 5/2009 | Fechner et al. | |
| 2010/0048016 A1 | 2/2010 | Izumi et al. | |
| 2010/0084016 A1 | 4/2010 | Aitken et al. | |
| 2010/0151210 A1 | 6/2010 | Shimatani | |
| 2010/0292068 A1 | 11/2010 | Takaya et al. | |
| 2010/0300536 A1 | 12/2010 | Aitken et al. | |
| 2011/0207594 A1 | 8/2011 | Niida et al. | |
| 2011/0240499 A1 | 10/2011 | Taniguchi et al. | |
| 2011/0318555 A1 | 12/2011 | Bookbinder et al. | |
| 2011/0318561 A1 | 12/2011 | Murata et al. | |
| 2012/0015150 A1 | 1/2012 | Suzuki | |
| 2012/0063479 A1 | 3/2012 | Li et al. | |
| 2012/0088648 A1 | 4/2012 | Ellison et al. | |
| 2012/0135226 A1 | 5/2012 | Bookbinder et al. | |
| 2012/0135852 A1 | 5/2012 | Ellison et al. | |
| 2012/0135853 A1 | 5/2012 | Amin et al. | |
| 2012/0141668 A1 | 6/2012 | Nakashima | |
| 2012/0282450 A1 | 11/2012 | Kawaguchi et al. | |
| 2012/0308803 A1 | 12/2012 | Dejneka et al. | |
| 2013/0037105 A1 | 2/2013 | Aitken et al. | |
| 2013/0330599 A1 | 12/2013 | Kroll et al. | |
| 2014/0049708 A1 | 2/2014 | Murata et al. | |
| 2014/0242375 A1 | 8/2014 | Mauro et al. | |
| 2014/0335331 A1 | 11/2014 | Ellison et al. | |
| 2014/0342897 A1 | 11/2014 | Amin et al. | |
| 2015/0037552 A1 | 2/2015 | Mauro | |
| 2015/0037553 A1 | 2/2015 | Mauro | |
| 2015/0051060 A1 | 2/2015 | Ellison et al. | |
| 2015/0140299 A1 | 5/2015 | Ellison et al. | |
| 2016/0174301 A1 | 6/2016 | Comte et al. | |
| 2018/0339932 A1 | 11/2018 | Qian et al. | |
| 2020/0055769 A1 | 2/2020 | Schwall et al. | |
| 2020/0102241 A1 | 4/2020 | Miyasaka et al. | |

FOREIGN PATENT DOCUMENTS

| | | |
|---|---|---|
| CN | 101092280 A | 12/2007 |
| CN | 101243020 A | 8/2008 |
| CN | 101400613 A | 4/2009 |
| CN | 102417295 A | 4/2012 |
| CN | 102448901 A | 5/2012 |
| CN | 103249689 A | 8/2013 |
| DE | 102005019958 A1 | 11/2006 |
| DE | 102008005857 A1 | 7/2009 |
| FR | 2905694 A1 | 3/2008 |
| JP | 60-036349 A | 2/1985 |
| JP | 63-011543 A | 1/1988 |
| JP | 01-201041 A | 8/1989 |
| JP | 07-010598 A | 1/1995 |
| JP | 07-277763 A | 10/1995 |
| JP | 07-300336 A | 11/1995 |
| JP | 08-295530 A | 11/1996 |
| JP | 09-156953 A | 6/1997 |
| JP | 2719504 B2 | 2/1998 |
| JP | 10-139467 A | 5/1998 |
| JP | 2000-001331 A | 1/2000 |
| JP | 2001-151534 A | 6/2001 |
| JP | 2001-172041 A | 6/2001 |
| JP | 2002-003240 A | 1/2002 |
| JP | 2002-029775 A | 1/2002 |
| JP | 2003-054984 A | 2/2003 |
| JP | 2003-335548 A | 11/2003 |
| JP | 2004-002062 A | 1/2004 |
| JP | 2004-075494 A | 3/2004 |
| JP | 2004-168597 A | 6/2004 |
| JP | 2004-189535 A | 7/2004 |
| JP | 2005-089286 A | 4/2005 |
| JP | 2005-263628 A | 9/2005 |
| JP | 2006-188406 A | 7/2006 |
| JP | 2006-213595 A | 8/2006 |
| JP | 2007-246365 A | 9/2007 |
| JP | 2008-522950 A | 7/2008 |
| JP | 2008-308375 A | 12/2008 |
| JP | 2008-308376 A | 12/2008 |
| JP | 2009-525943 A | 7/2009 |
| JP | 2010-509180 A | 3/2010 |
| JP | 2010-215463 A | 9/2010 |
| JP | 2011-093728 A | 5/2011 |
| JP | 2011-162413 A | 8/2011 |
| JP | 2012-111692 A | 6/2012 |
| JP | 2012-528072 A | 11/2012 |
| JP | 2013-530123 A | 7/2013 |
| SU | 1377250 A1 | 2/1988 |
| TW | I252844 B | 4/2006 |
| WO | 89/02877 A1 | 4/1989 |
| WO | 2008/149021 A2 | 12/2008 |
| WO | 2011/136027 A1 | 11/2011 |
| WO | 2012/074953 A1 | 6/2012 |
| WO | 2012/147615 A1 | 11/2012 |
| WO | 2013/020128 A1 | 2/2013 |
| WO | 2013/065648 A1 | 5/2013 |
| WO | 2013/130700 A1 | 9/2013 |
| WO | 2013/130718 A1 | 9/2013 |
| WO | 2014/182753 A1 | 11/2014 |
| WO | 2019/119341 A1 | 6/2019 |
| WO | 2019/181707 A1 | 9/2019 |
| WO | 2019/233290 A1 | 12/2019 |
| WO | 2019/233291 A1 | 12/2019 |

OTHER PUBLICATIONS

Ellison et al.; U.S. Appl. No. 61/866,272; "Alkali-Doped and Alkali-Free Boroaluminosilicate Glass;" filed Aug. 2013; 23 pages.

English Translation of CN201480054310.X First Office Action dated Mar. 17, 2017, China Patent Office.

English Translation of JP2014560016 Office Action dated Oct. 25, 2016; 3 pages; Japanese Patent Office.

(56) References Cited

OTHER PUBLICATIONS

English Translation of JP2016534765 Office Action dated May 8, 2018; 4 pages; Japanese Patent Office.
European Patent Application No. 14753438.2; Office Action dated Jan. 13, 2021; 5 pages; European Patent Office.
European Patent Application No. 13710680.3 Office Action dated Dec. 8, 2017; 4 Pages; European Patent Office.
European Patent Application No. 14755493.5 Decision to grant a European patent dated Feb. 11, 2021; 2 Pages; European Patent Office.
European Patent Application No. 14755493.5 Office Action dated Oct. 2, 2018; 6 pages; European Patent Office.
European Patent Application No. 21153397.1, Extended European Search Report dated Mar. 3, 2021; 7 pages; European Patent Office.
European Patent Office; International Search Report; Mail Date: Oct. 29, 2014; pp. 1-4.
European Patent Office; International Search Report; Mailing Date: Mar. 6, 2015; pp. 1-4.
International Preliminary Report on Patentability; PCT/US2014/050486; dated Feb. 23, 2016.
International Search Report and Written Opinion of the International Searching Authority; PCT/US13/28177; Mailed Jul. 16, 2013; 10 Pages; European Patent Office.
International Search Report and Written Opinion of the International Searching Authority; PCT/US2014/037043; Mailed Aug. 13, 2014; 11 Pages; European Patent Office.
International Search Report and Written Opinion of the International Searching Authority; PCT/US2014/050486; dated Mar. 6, 2015.
International Search Report and Written Opinion, dated Jul. 16, 2013, pp. 1-11, International Patent Application No. PCT/US2013/028177, European Patent Office, The Netherlands.
JC. Mauro, "Statistics of Modifier Distributions in Mixed Network Glasses," J. Chem. Phys. 138, 12A522 (2013).
John C. Mauro; "Statistics of modifier distributions in mixed network glasses"; The Journal of Chemical Physics 138 (2013); pp. 12A522-1-12A522-8.
Korean Patent Application No. 10-2016-7006353, Notice of Allowance dated May 12, 2021, 4 pages (2 pages of English Translation and 2 pages of Original Document), Korean Patent Office.
Korean Patent Application No. 10-2015-7033782; Office Action dated Mar. 30, 2021; 4 Pages; Korean Patent Office.
Korean Patent Application No. 10-2016-7006450, Office Action dated May 22, 2021, 5 pages (2 pages of English Translation and 3 pages of Original Document), Korean Patent Office.
Mauro et al.; U.S. Appl. No. 61/604,839; "Low CTE Alkali-Free Boroaluminosilcate Glass Compositions and Glass Articles Comprising the Same;" Feb. 2012; 25 pages.
Orlov A.D., Razrabotka Sostavov i Tekhnologii Tugoplavkikh Elektrovakuumnykh Stekol Volframovoi Gruppy. Thesis. Moskva, 1991.
PCT/US2014/037043 International Preliminary Report on Patentability Dated Nov. 19, 2015.
PCT/US2014/037043 Search Report dated Aug. 13, 2014.
Shigeki Morimoto; "Phase separation and crystallization in the system $SiO_2$—$Al_2O_3$—$P_2O_5$—$B_2O_3$—$Na_2O$ glasses"; Journal of Non-Crystalline Solids 352 (2006); pp. 756-760.
U.S. Appl. No. 17/221,926 Office Action dated Jun. 23, 2021; 44 pages; US Patent Office.
U.S. Appl. No. 17/221,926, Response to Office Action dated Jul. 8, 2021; 14 pages; US Patent Office.
U.S. Appl. No. 17/221,926 Notice of Allowance dated Sep. 27, 2021; 7 pages; US Patent Office.
U.S. Appl. No. 17/221,926 Examiner Initiated Summary Record dated Aug. 30, 2021; 5 pages; US Patent Office.
U.S. Appl. No. 17/221,926, Final Office Action dated Aug. 10, 2021; 11 pages; US Patent Office.
U.S. Appl. No. 17/221,926, Response to Office Action dated Aug. 12, 2021; 4 pages; US Patent Office.
U.S. Appl. No. 17/221,926, Response to Office Action dated Sep. 7, 2021; 5 pages; US Patent Office.

\* cited by examiner

ALUMINOBOROSILICATE GLASS SUBSTANTIALLY FREE OF ALKALI OXIDES

RELATED APPLICATIONS

This application is a continuation of U.S. application Ser. No. 17/221,926 filed Apr. 5, 2021, which is a continuation of U.S. application Ser. No. 16/142,814 filed Sep. 26, 2018, which issued Apr. 27, 2021 as U.S. Pat. No. 10,988,405 and is a continuation of U.S. application Ser. No. 15/136,189 filed Apr. 22, 2016, which issued Oct. 30, 2018 as U.S. Pat. No. 10,112,865 and is a continuation of U.S. application Ser. No. 14/458,565 filed Aug. 13, 2014, which issued May 24, 2016 as U.S. Pat. No. 9,346,705 and claims the priority benefit of U.S. Application Nos. 61/878,829 filed Sep. 17, 2013 and 61/866,168 filed Aug. 15, 2013, the content of each of which is incorporated by reference herein in its entirety.

As indicated in disclosure below, U.S. Application Nos. 61/604,839, 61/866,272, and 61/821,426 are incorporated by reference herein in their entireties. Original subject matter from these applications is transcribed herein. No new matter has been added.

BACKGROUND

Field

The present specification generally relates to glass compositions and, more specifically, to intermediate to high CTE, potassium-containing aluminosilicate and/or aluminoborosilicate glass compositions and glass articles comprising the same.

Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

Glass articles are commonly strengthened by thermal tempering and/or by ion exchange treatment. In either case, the glass article is subjected to additional processing steps after the glass article is formed. These additional processing steps may increase the overall cost of the glass article. Moreover, the additional handling required to carry out these processing steps increases the risk of damage to the glass article which decreases manufacturing yields and further increases production costs and the ultimate cost of the glass article.

Accordingly, a need exists for alternative glass compositions which may be used to produce strengthened glass articles without the need for additional processing steps and glass articles manufactured from such compositions.

SUMMARY

A first aspect comprises a glass composition comprising about 60 mol % to about 75 mol % $SiO_2$, about 2 mol % to about 11 mol % $Al_2O_3$, 0 mol % to about 11 mol % $B_2O_3$, 0 mol % to about 1 mol % $Na_2O$, about 1 mol % to about 18 mol % $K_2O$, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

A second aspect comprises a glass composition comprising about 65 mol % to about 75 mol % $SiO_2$, about 5 mol % to about 11 mol % $Al_2O_3$, about 4 mol % to about 11 mol % $B_2O_3$, 0 mol % to about 0.5 mol % $Na_2O$, about 2 mol % to about 13 mol % $K_2O$, 0 mol % to about 7 mol % MgO, 0 mol % to about 9 mol % CaO, about 2 mol % to about 6 mol % SrO, 0 mol % to about 1 mol % BaO, and about 3 mol % to about 16 mol % R'O, wherein R'O comprises the mol % of MgO, CaO, SrO, and BaO in the composition.

Another aspect comprises a glass composition comprising about 60 mol % to about 75 mol % $SiO_2$, about 5 mol % to less than 8 (<8) mol % $Al_2O_3$, about 4 mol % to about 11 mol % $B_2O_3$, 0 mol % to about 1 mol % $Na_2O$, about 1 mol % to about 18 mol % $K_2O$, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

A fourth aspect comprises a glass composition comprising about 60 mol % to about 75 mol % $SiO_2$, about 2 mol % to about 11 mol % $Al_2O_3$, about 4 mol % to less than 7 mol % $B_2O_3$, 0 mol % to about 1 mol % $Na_2O$, about 1 mol % to about 18 mol % $K_2O$, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

A fifth aspect comprises a glass composition comprising about 60 mol % to about 75 mol % $SiO_2$, about 2 mol % to about 11 mol % $Al_2O_3$, about 4 mol % to about 11 mol % $B_2O_3$, 0 mol % to about 1 mol % $Na_2O$, greater than 8 mol % to about 14 mol % $K_2O$, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

A sixth aspect comprises a glass composition comprising about 60 mol % to about 75 mol % $SiO_2$, about 2 mol % to about 11 mol % $Al_2O_3$, about 4 mol % to about 11 mol % $B_2O_3$, 0 mol % to about 1 mol % $Na_2O$, about 1 mol % to about 18 mol % $K_2O$, 0 mol % to about 7 mol % MgO, 0 mol % to about 9 mol % CaO, about 1 mol % to about 8 mol % SrO, 0 mol % to about 4 mol % BaO, and about 3 mol % to about less than 9 mol % R'O, wherein R'O comprises the mol % of MgO, CaO, SrO, and BaO in the composition.

In some embodiments, the glass compositions above further comprise one or more of $SnO_2$, $Fe_2O_3$, or $ZrO_2$, wherein when present, the amount of each of $SnO_2$, $Fe_2O_3$, or $ZrO_2$ is from greater than 0 to about 3 mol %.

In some embodiments, the glass composition above consist essentially of the components listed above along with >0 mol % to about 3 mol % of one or more of $SnO_2$, $Fe_2O_3$, or $ZrO_2$, and from 0 to about 3 mol % of one or more of $TiO_2$, MnO, ZnO, Nb$_2$O$_5$, MoO$_3$, Ta$_2$O$_5$, WO$_3$, ZrO$_2$, Y$_2$O$_3$, La$_2$O$_3$, HfO$_2$, CdO, CeO$_2$, Fe$_2$O$_3$, F$^-$, Cl$^-$, Br$^-$ or I$^-$.

In some embodiments, the glass compositions above have a CTE from about 55×10$^{-7}$/° C. to about 120×10$^{-7}$/° C. in a range from 20° C. to 300° C. In other embodiments, the glass compositions above have a from about 75×10$^{-7}$/° C. to about 110×10$^{-7}$/° C. in a range from 20° C. to 300° C. In some embodiments, the glass compositions above have a liquidus viscosity is greater than or equal to about 100 kPoise. In other embodiments, the glass compositions above have a liquidus viscosity is greater than or equal to about 250 kPoise.

Also embodied herein are glass laminates comprising a core glass and at least one clad glass. A seventh aspect comprises a glass laminate comprising a glass core and at least one glass clad, wherein the glass core comprises comprising about 60 mol % to about 75 mol % SiO$_2$, about 2 mol % to about 11 mol % Al$_2$O$_3$, 0 mol % to about 11 mol % B$_2$O$_3$, 0 mol % to about 1 mol % Na$_2$O, about 1 mol % to about 18 mol % K$_2$O, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

And eighth aspect comprises a glass laminate comprising a glass core comprising about 65 mol % to about 75 mol % SiO$_2$, about 5 mol % to about 11 mol % Al$_2$O$_3$, about 4 mol % to about 11 mol % B$_2$O$_3$, 0 mol % to about 0.5 mol % Na$_2$O, about 2 mol % to about 13 mol % K$_2$O, 0 mol % to about 7 mol % MgO, 0 mol % to about 9 mol % CaO, about 2 mol % to about 6 mol % SrO, 0 mol % to about 1 mol % BaO, and about 3 mol % to about 16 mol % R'O, wherein R'O comprises the mol % of MgO, CaO, SrO, and BaO in the composition.

A ninth aspect comprises a glass laminate comprising a glass core comprising about 65 mol % to about 73 mol % SiO$_2$, about 5 mol % to about 11 mol % Al$_2$O$_3$, about 4 mol % to about 11 mol % B$_2$O$_3$, >0 mol % to about 0.5 mol % Na$_2$O, about 2 mol % to about 13 mol % K$_2$O, 0 mol % to about 7 mol % MgO, >0 mol % to about 9 mol % CaO, about 2 mol % to about 6 mol % SrO, >0 mol % to about 1 mol % BaO, and about 5 mol % to about 16 mol % R'O, wherein R'O comprises the mol % of MgO, CaO, SrO, and BaO in the composition.

A tenth aspect comprises a glass laminate comprising about 60 mol % to about 75 mol % SiO$_2$, about 5 mol % to less than 8 (<8) mol % Al$_2$O$_3$, about 4 mol % to about 11 mol % B$_2$O$_3$, 0 mol % to about 1 mol % Na$_2$O, about 1 mol % to about 18 mol % K$_2$O, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

An eleventh aspect comprises a glass laminate comprising about 60 mol % to about 75 mol % SiO$_2$, about 2 mol % to about 11 mol % Al$_2$O$_3$, about 4 mol % to less than 7 mol % B$_2$O$_3$, 0 mol % to about 1 mol % Na$_2$O, about 1 mol % to about 18 mol % K$_2$O, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

A twelfth aspect comprises a glass laminate comprising about 60 mol % to about 75 mol % SiO$_2$, about 2 mol % to about 11 mol % Al$_2$O$_3$, about 4 mol % to about 11 mol % B$_2$O$_3$, 0 mol % to about 1 mol % Na$_2$O, greater than 8 mol % to about 14 mol % K$_2$O, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

Another aspect comprises a glass laminate comprising about 60 mol % to about 75 mol % SiO$_2$, about 2 mol % to about 11 mol % Al$_2$O$_3$, about 4 mol % to about 11 mol % B$_2$O$_3$, 0 mol % to about 1 mol % Na$_2$O, about 1 mol % to about 18 mol % K$_2$O, 0 mol % to about 7 mol % MgO, 0 mol % to about 9 mol % CaO, about 1 mol % to about 8 mol % SrO, 0 mol % to about 4 mol % BaO, and about 3 mol % to about less than 9 mol % R'O, wherein R'O comprises the mol % of MgO, CaO, SrO, and BaO in the composition.

In some embodiments, the glass core of any of the glass laminates above further comprises one or more of SnO$_2$, Fe$_2$O$_3$, or ZrO$_2$, wherein when present, the amount of each of SnO$_2$, Fe$_2$O$_3$, or ZrO$_2$ is from greater than 0 to about 3 mol %.

In some embodiments, the glass composition above consist essentially of the components listed above along with >0 mol % to about 3 mol % of one or more of SnO$_2$, Fe$_2$O$_3$, or ZrO$_2$, and from 0 to about 3 mol % of one or more of TiO$_2$, MnO, ZnO, Nb$_2$O$_5$, MoO$_3$, Ta$_2$O$_5$, WO$_3$, ZrO$_2$, Y$_2$O$_3$, La$_2$O$_3$, HfO$_2$, CdO, CeO$_2$, Fe$_2$O$_3$, F$^-$, Cl$^-$, Br$^-$, or I$^-$.

In some embodiments, the glass core above has a CTE from about 55×10$^{-7}$/° C. to about 120×10$^{-7}$/° C. in a range from 20° C. to 300° C. In other embodiments, the glass cores described above have a from about 75×10$^{-7}$/° C. to about 110×10$^{-7}$/° C. in a range from 20° C. to 300° C. In some embodiments, the glass cores described above have a liquidus viscosity is greater than or equal to about 100 kPoise. In other embodiments, the glass cores described above have a liquidus viscosity is greater than or equal to about 250 kPoise.

In some embodiments, the glass laminates described above comprise a clad glass comprising about 60 mol % to about 66 mol % SiO$_2$, about 7 mol % to about 10 mol % Al$_2$O$_3$, about 14 mol % to about 18 mol % B$_2$O$_3$, and about 9 mol % to about 16 mol % alkaline earth oxide, wherein the alkaline earth oxide comprises at least CaO and the CaO is present in the glass composition in a concentration from about 3 mol % to about 12 mol %, and wherein the glass composition is substantially free from alkali metals and compounds containing alkali metals.

A fourteenth aspect comprises a use of any of the above glass compositions or laminates in a cover glass or glass backplane application in consumer or commercial electronic devices, including LCD and LED displays, computer monitors, automated teller machines (ATMs), for touch screen or touch sensor applications, for portable electronic devices including mobile telephones, personal media players, and tablet computers, for photovoltaic applications, for architectural glass applications, for automotive or vehicular glass applications, or for commercial or household appliance applications.

Additional features and advantages of the glass compositions and glass articles formed from the glass compositions described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

As indicated in original disclosure below, U.S. Application Nos. 61/604,839, 61/866,272, and 61/821,426 are incorporated by reference herein in their entireties. Original subject matter from these applications is transcribed below. To avoid ambiguity, reference numbers from U.S. App. No. 61/604,839 are further designated with a single prime ('), reference numbers from U.S. App. No. 61/866,272 are further designated with a double prime ("), and reference numbers from U.S. App. No. 61/821,426 are further designated with a triple prime ('''). No new matter has been added.

Figure 3:
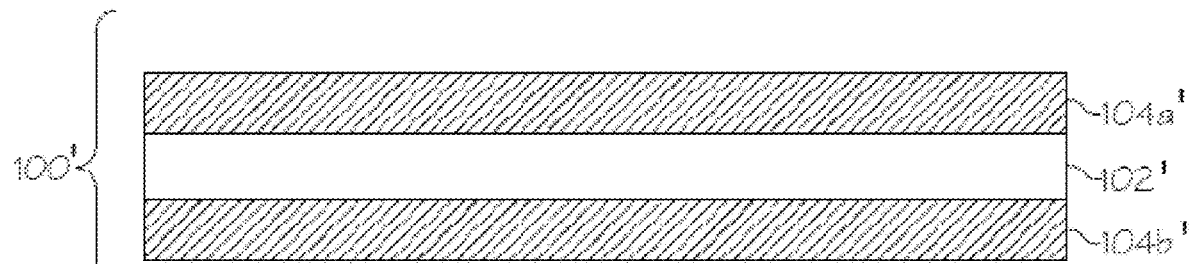
Figure 4:
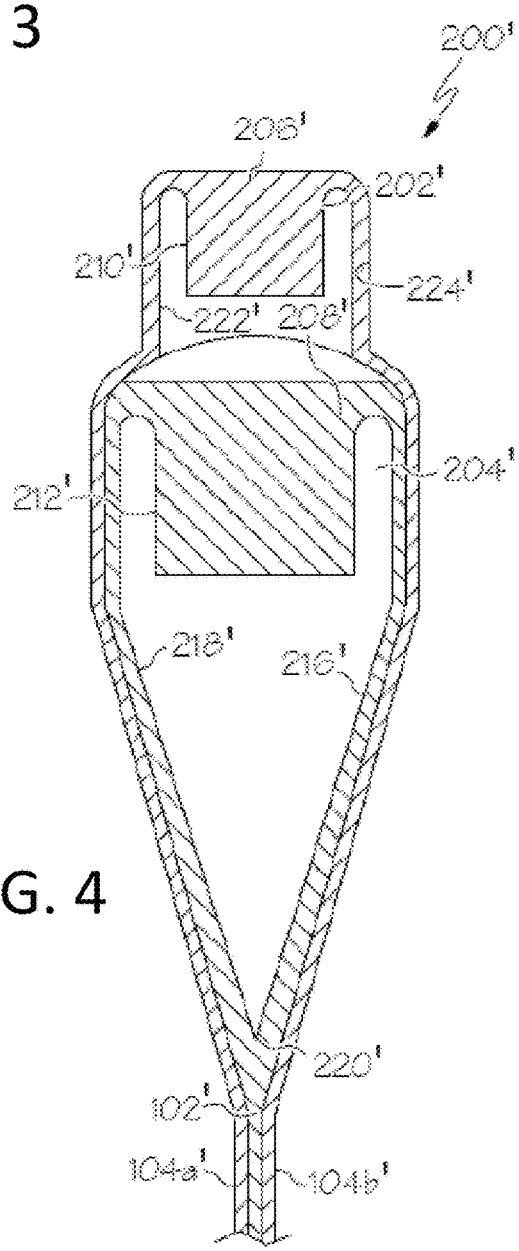

FIG. 3 schematically depicts a cross section of a laminated glass article according to one or more embodiments shown and described herein; and FIG. 4 schematically depicts a fusion draw process for making the glass article of FIG. r.

Figure 5:
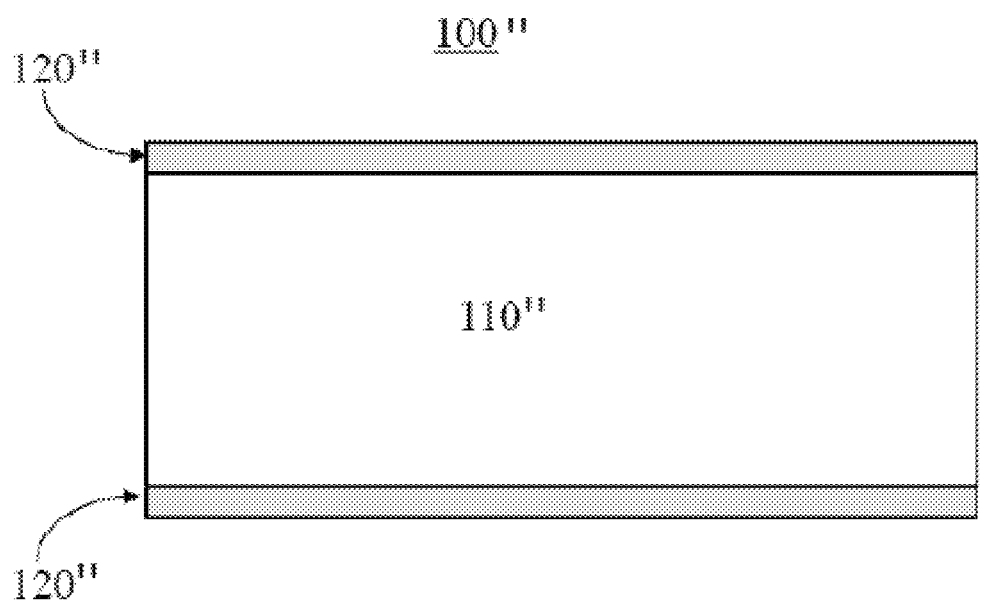
Figure 6:
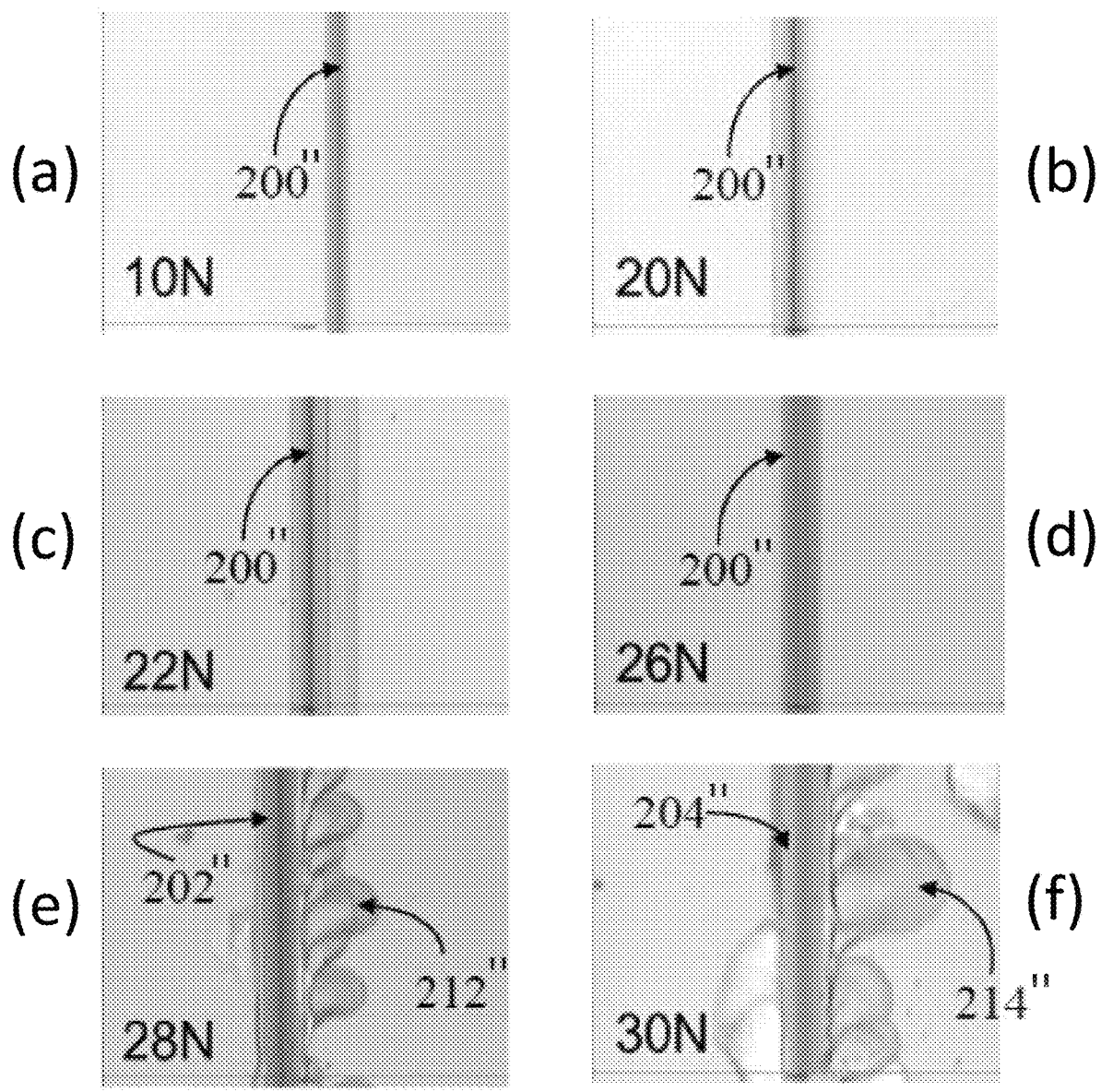

FIG. 5 is a schematic cross-sectional view of a glass laminate; and

FIGS. 6a-f are photographs of Knoop scratch test results for a glass sample.

Figure 7:
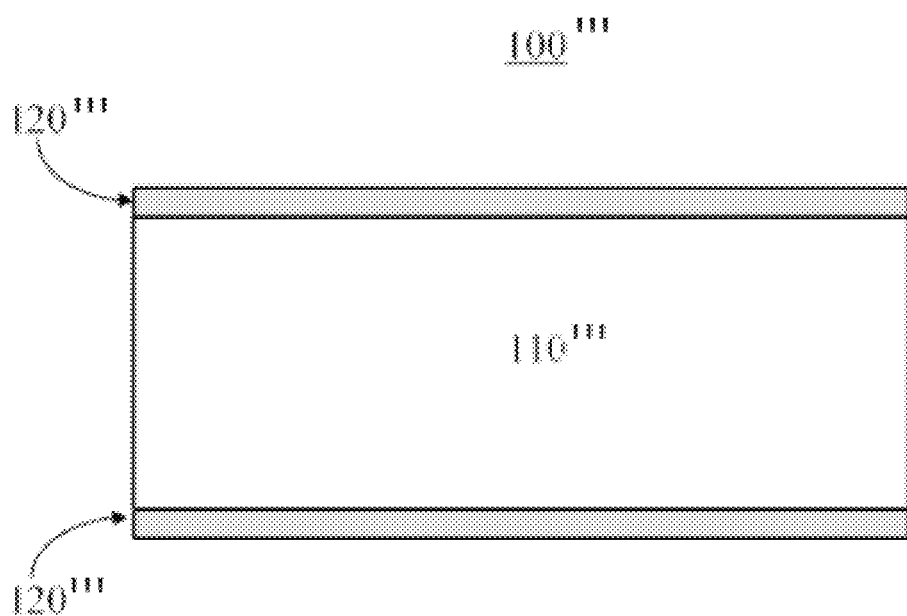

FIG. 7 is a schematic cross-section view of a glass laminate.

DETAILED DESCRIPTION

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements. Moreover, unless otherwise defined, all technical and scientific terms used herein have the same meaning as commonly understood by one of ordinary skill in the art to which this invention belongs. In case of conflict, the present specification, including the definitions herein, will control.

Although other methods and can be used in the practice or testing of the invention, certain suitable methods and materials are described herein.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the subgroup of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. More specifically, the example composition ranges given herein are considered part of the specification and further, are considered to provide example numerical range endpoints, equivalent in all respects to their specific inclusion in the text, and all combinations are specifically contemplated and disclosed. Further, if there are a variety of additional steps that can be performed it is understood that each of these additional steps can be performed with any specific embodiment or combination of embodiments of the disclosed methods, and that each such combination is specifically contemplated and should be considered disclosed.

Moreover, where a range of numerical values is recited herein, comprising upper and lower values, unless otherwise stated in specific circumstances, the range is intended to include the endpoints thereof, and all integers and fractions within the range. It is not intended that the scope of the invention be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B." Exclusive "or" is designated herein by terms such as "either A or B" and "one of A or B," for example.

The indefinite articles "a" and "an" are employed to describe elements and components of the invention. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

For the purposes of describing the embodiments, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

It is noted that one or more of the claims may utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

As a result of the raw materials and/or equipment used to produce the glass or glass ceramic composition of the present invention, certain impurities or components that are not intentionally added, can be present in the final glass or glass ceramic composition. Such materials are present in the glass or glass ceramic composition in minor amounts and are referred to herein as "tramp materials."

As used herein, a glass or glass ceramic composition having 0 mol % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts.

The term "substantially free," when used to describe the absence of a particular oxide constituent in a glass composition, means that the constituent is present in the glass composition as a contaminant in a trace amount of less than 1 mol %.

In the embodiments of the glass compositions described herein, the concentration of constituent components (e.g., $SiO_2$, $Al_2O_3$, $B_2O_3$ and the like) are given in mole percent (mol %) on an oxide basis, unless otherwise specified.

The term "liquidus viscosity, as used herein, refers to the shear viscosity of the glass composition at its liquidus temperature.

The term "liquidus temperature," as used herein, refers to the highest temperature at which devitrification occurs in the glass composition.

The term "CTE," as used herein, refers to the coefficient of thermal expansion of the glass composition averaged over a temperature range from about 20° C. to about 300° C.

Intermediate to High CTE Glasses

The glass compositions described herein have properties, such as the liquidus viscosity and the liquidus temperature, which make the glass compositions particularly well suited for use in fusion forming processes, such as the fusion down draw process and/or the fusion lamination process. These properties are attributable to the specific compositions of the glasses, as will be described in more detail herein.

A first aspect comprises a glass composition having an intermediate to high CTE and comprising (Composition 1):
about 60 mol % to about 75 mol % $SiO_2$
about 2 mol % to about 11 mol % $Al_2O_3$
0 mol % to about 11 mol % $B_2O_3$
0 mol % to about 1 mol % $Na_2O$
about 1 mol % to about 18 mol % $K_2O$
0 mol % to about 7 mol % MgO
0 mol % to about 9 mol % CaO
about 1 mol % to about 8 mol % SrO,
0 mol % to about 4 mol % BaO, and
about 3 mol % to about 16 mol % R'O, wherein R'O comprises the mol % of MgO, CaO, SrO, and BaO in the composition.

In another aspect, the glass may comprise a composition comprising (Composition 2):
about 65 mol % to about 75 mol % $SiO_2$
about 5 mol % to about 11 mol % $Al_2O_3$
about 4 mol % to about 11 mol % $B_2O_3$
0 mol % to about 0.5 mol % $Na_2O$
about 2 mol % to about 13 mol % $K_2O$
0 mol % to about 7 mol % MgO
0 mol % to about 9 mol % CaO
about 2 mol % to about 6 mol % SrO,
0 mol % to about 1 mol % BaO,
about 3 mol % to about 16 mol % R'O,
wherein R'O comprises the mol % of MgO, CaO, SrO, and BaO in the composition.

In another aspect, the glass composition comprises (Composition 3):
about 60 mol % to about 75 mol % $SiO_2$,
about 5 mol % to less than 8 mol % $Al_2O_3$,
about 4 mol % to about 11 mol % $B_2O_3$,
0 mol % to about 1 mol % $Na_2O$,
about 1 mol % to about 18 mol % $K_2O$,
0 mol % to about 7 mol % MgO,
0 mol % to about 9 mol % CaO,
about 1 mol % to about 8 mol % SrO,
0 mol % to about 4 mol % BaO, and
about 3 mol % to about 16 mol % R'O,
wherein R'O comprises the mol % of MgO, CaO, SrO, and BaO in the composition.

A fourth aspect comprises a glass composition comprising (Composition 4):
about 60 mol % to about 75 mol % $SiO_2$,
about 2 mol % to about 11 mol % $Al_2O_3$,
about 4 mol % to less than 7 mol % $B_2O_3$,
0 mol % to about 1 mol % $Na_2O$,
about 1 mol % to about 18 mol % $K_2O$,
0 mol % to about 7 mol % MgO,
0 mol % to about 9 mol % CaO,
about 1 mol % to about 8 mol % SrO,
0 mol % to about 4 mol % BaO, and
about 3 mol % to about 16 mol % R'O,
wherein R'O comprises the mol % of MgO, CaO, SrO, and BaO in the composition.

A fifth aspect comprises a glass composition comprising (Composition 5):
about 60 mol % to about 75 mol % $SiO_2$,
about 2 mol % to about 11 mol % $Al_2O_3$, about 4 mol % to about 11 mol % $B_2O_3$,
0 mol % to about 1 mol % $Na_2O$,
greater than 8 mol % to about 14 mol % $K_2O$,
0 mol % to about 7 mol % MgO,
0 mol % to about 9 mol % CaO,
about 1 mol % to about 8 mol % SrO,
0 mol % to about 4 mol % BaO, and
about 3 mol % to about 16 mol % R'O,
wherein R'O comprises the mol % of MgO, CaO, SrO, and BaO in the composition.

A sixth aspect comprises a glass composition comprising (Composition 6):
about 60 mol % to about 75 mol % $SiO_2$,
about 2 mol % to about 11 mol % $Al_2O_3$,
about 4 mol % to about 11 mol % $B_2O_3$,
0 mol % to about 1 mol % $Na_2O$,
about 1 mol % to about 18 mol % $K_2O$,
0 mol % to about 7 mol % MgO,
0 mol % to about 9 mol % CaO,
about 1 mol % to about 8 mol % SrO,
0 mol % to about 4 mol % BaO, and
about 3 mol % to about less than 9 mol % R'O,
wherein R'O comprises the mol % of MgO, CaO, SrO, and BaO in the composition.

As detailed herein the glass compositions may further comprise 0 to about 3 mol %, or in some cases >0 to about 1 mol %, additional components and fining agents, such as $SnO_2$, $Fe_2O_3$, $ZrO_2$. In addition, the glass composition may include from about 1 mol % to about 28 mol % alkaline earth oxide. The alkaline earth oxide may include at least one of CaO, SrO, MgO, and BaO.

In the embodiments of the glass compositions described herein $SiO_2$ is the largest constituent of the composition and, as such, $SiO_2$ is the primary constituent of the resulting glass network. $SiO_2$ is utilized in the glass compositions described herein to obtain the desired liquidus viscosity while, at the same time, offsetting the amount of $Al_2O_3$ added to the composition. Accordingly, a high $SiO_2$ concentration is generally desired. However, if the content of $SiO_2$ is too high, the formability of the glass may be diminished as higher concentrations of $SiO_2$ increase the difficulty of melting the glass which, in turn, adversely impacts the formability of the glass. In the embodiments described herein, the glass composition generally comprises $SiO_2$ in an amount from about 60 to about 75 mol %. In other embodiments, the glass composition generally comprises about 65 to about 75 mol % $SiO_2$. For example, in some embodiments, the amount of $SiO_2$ in the glass composition is about 60 to about 75 mol %, about 60 to about 73 mol %, about 60 to about 70 mol %, about 60 to about 67 mol %, about 60 to about 65 mol %, about 60 to about 63 mol %, about 63 to about 75 mol %, about 63 to about 73 mol %, about 63 to about 70 mol %, about 63 to about 67 mol %, about 63 to about 65 mol %, about 65 to about 75 mol %, about 65 to about 73 mol %, about 65 to about 70 mol %, about 65 to about 67 mol %, about 67 to about 75 mol %, about 67 to about 73 mol %, about 67 to about 70 mol %, about 70 to about 75 mol %, about 70 to about 73 mol %, or about 73 to about 75 mol % $SiO_2$. In some embodiments, the glass composition comprises about 60, 61, 62, 63, 64, 65, 66, 67, 68, 69, 70, 71, 72, 73, 74, or 75 $SiO_2$.

In some embodiments, the glass compositions may further comprise $Al_2O_3$. $Al_2O_3$, when present, may act in a manner similar to $SiO_2$ and may increase the viscosity of the glass composition when in a tetrahedral coordination in a glass melt formed from the glass composition. However, the presence of $Al_2O_3$ in the glass compositions may also increases the mobility of alkali constituents in the glass components. Accordingly, the amount of $Al_2O_3$ in the glass compositions needs to be carefully considered.

In the embodiments of the glass compositions described herein, the concentration of $Al_2O_3$ in the glass compositions, when present, is generally from about 2 to about 11 mol %. In some embodiments, $Al_2O_3$ is present in the glass compositions at from about 5 to <8 mol %. In some embodiments, the glass composition can comprise from about 2 to about 11 mol %, about 2 to about 10 mol %, about 2 to about 8 mol %, about 2 to <8 mol %, about 2 to about 5 mol %, about 4 to about 11 mol %, about 4 to about 10 mol %, about 4 to about 8 mol %, about 4 to <8 mol %, about 5 to about 11 mol %, about 5 to about 10 mol %, about 5 to about 8 mol %, about 5 to <8 mol %, about 8 to about 11 mol %, or about 8 to about 10 mol % $Al_2O_3$. In some embodiments, the glass or glass ceramic composition can comprise about 2, 3, 4, 5, 6, 7, <8, 8, 9, 10, or 11 mol % $Al_2O_3$.

The glass compositions in the embodiments described herein further comprise $B_2O_3$. Like $SiO_2$ and $Al_2O_3$, $B_2O_3$ contributes to the formation of the glass network. Conventionally, $B_2O_3$ is added to a glass composition in order to decrease the viscosity of the glass composition. However, in some of the embodiments described herein, $B_2O_3$ may work in conjunction with additions of $K_2O$ and $Al_2O_3$ (when present) to increase the annealing point of the glass composition, increase the liquidus viscosity, and inhibit alkali mobility. In the embodiments described herein, $B_2O_3$ is generally present in the glass compositions in an amount from 0 to about 11 mol %. In some embodiments, the glass comprises $B_2O_3$ in an amount from >0 to about 11 mol %. In some embodiments, the glass comprises $B_2O_3$ in an amount from about 4 to about 11 mol %. In other embodiments, the glass comprises from 0 to about 6.5 mol % $B_2O_3$. In still other embodiments, the glass comprises from about 4 to less than 7 mol % $B_2O_3$. In some embodiments, the glass composition can comprise from 0 to about 11 mol %, 0 to about 10 mol %, 0 to about 8 mol %, 0 to about 6 mol %, 0 to about 5 mol %, 0 to 3 mol %, 0 to about 1 mol %, >0 to about 11 mol %, >0 to about 10 mol %, >0 to about 8 mol %, >0 to about 6 mol %, >0 to about 5 mol %, >0 to 3 mol %, >0 to about 1 mol %, about 1 to about 11 mol %, about 1 to about 10 mol %, about 1 to about 8 mol %, about 1 to about 6 mol %, about 1 to about 5 mol %, about 1 to 3 mol %, about 1 to 2 mol %, about 2 to about 11 mol %, about 2 to about 10 mol %, about 2 to about 8 mol %, about 2 to about 6 mol %, about 2 to about 5 mol %, about 2 to 3 mol %, about 4 to about 11 mol %, about 4 to about 10 mol %, about 4 to about 8 mol %, about 4 to less than 7 mol %, about 3 to about 6 mol %, about 3 to about 5 mol %, about 5 to about 11 mol %, about 5 to about 10 mol %, about 5 to about 8 mol %, about 5 to about 6 mol %, about 6 to about 11 mol %, about 6 to about 10 mol %, about 6 to about 8 mol %, about 8 to about 11 mol %, or about 8 to about 10 mol % $B_2O_3$. In some embodiments, the glass composition can comprise about 0, >0, 1, 2, 3, 4, 5, 6, <7, 7, 8, 9, 10, or 11 mol % $B_2O_3$.

The glass compositions in the embodiments described herein also include alkali oxides. Specifically, the glass compositions described herein include at least $K_2O$. The addition of alkali oxides such as $K_2O$ to the glass compositions increases the average coefficient of thermal expansion of the resultant glass and may also decreases the liquidus temperature of the glass. $K_2O$ is used as the primary alkali oxide constituent as the relatively large ionic radius of $K_2O$ (relative to other alkali oxides such as $Na_2O$ and $Li_2O$) decreases the diffusivity of $K_2O$ in the glass. Low $K_2O$ diffusivity is particularly important when the glass composition is used to form backplanes for displays and the diffusion of $K_2O$ from the glass to thin film transistors deposited on the glass damages the transistors. In embodiments where the glass composition is utilized to form a glass core layer of a laminated glass article, the presence of $K_2O$ in the composition may facilitate ion-exchange strengthening of the cladding layers at the interface between the glass core layer and the glass cladding layers fused to the glass core layer. In the embodiments described herein, the concentration of $K_2O$ in the glass compositions is. In some embodiments, the glass composition can comprise from 1 to about 18 mol % $K_2O$. In some embodiments, the glass composition can comprise from 5 to about 18 mol % $K_2O$. In some embodiments, the glass composition can comprise from >8 to about 14 mol % $K_2O$. In some embodiments, the glass composition can comprise from about 1 to 18 mol %, about 1 to about 15 mol %, about 1 to about 12 mol %, about 1 to about 10 mol %, about 3 to about 18 mol %, about 3 to about 15 mol %, about 3 to about 12 mol %, about 3 to about 10 mol %, about 5 to about 18 mol %, about 5 to about 18 mol %, about 5 to about 15 mol %, about 5 to about 12 mol %, about 5 to about 10 mol %, about 8 to about 18 mol %, about 8 to about 15 mol %, about 8 to about 12 mol %, about 8 to about 10 mol %, >8 to about 18 mol %, >8 to about 15 mol %, >8 to about 14 mol %, >8 to about 10 mol %, about 10 to about 18 mol %, about 10 to about 15 mol %, about 10 to about 12 mol %, about 12 to about 18 mol %, or about 12 to about 15 mol % $K_2O$. In some embodiments, the glass composition can comprise about 1, 2, 3, 4, 5, 6, 7, 8, >8, 9, 10, 11, 12, 13, 14, 15, 16, 17, or 18 mol % $K_2O$.

In some embodiments of the glass compositions described herein, the glass compositions may comprise one or more additional alkali oxides, such as $Na_2O$ or $Li_2O$. In some embodiments where addition alkali oxides are present, the alkali oxide is specifically $Na_2O$. In embodiments where additional alkali oxides are present in the glass composition, the concentration of the additional alkali oxides is from >0 to about 3 mol %. In some other embodiments, the additional alkali oxide is $Na_2O$, which is present in the glass composition at >0 mol % to about 1 mol %. In some embodiments, the glass can comprise from 0 to about 3 mol %, 0 to about 2 mol %, 0 to about 1 mol %, 0 to about 0.5 mol %, 0 to about 0.1 mol %, 0 to about 0.05 mol %, 0 to about 0.01 mol %, >0 to about 3 mol %, >0 to about 2 mol %, >0 to about 1 mol %, >0 to about 0.5 mol %, >0 to about 0.1 mol %, >0 to about 0.05 mol %, or >0 to about 0.01 mol % $Na_2O$ or $Li_2O$ or a combination thereof.

In some embodiments of the glass compositions described herein, the glass compositions may comprise total alkali oxides, $R_2O$, wherein $R_2O$ is the sum of $Na_2O$, $Li_2O$ $K_2O$, $Rb_2O$, and $Cs_2O$, of from about 1 to about 18 mol %. In some embodiments, the glass compositions may comprise total alkali oxides, $R_2O$, of from about 1 to about 18 mol %, wherein $Na_2O$<1 mol %, $Li_2O$<1 mol %, and $Rb_2O$=0 mol % and $Cs_2O$=0 mol %.

The glass compositions described herein may further comprise one or more alkaline earth oxides. The alkaline earth oxides improve the melting behavior of the glass composition, lower the melting temperature of the glass composition, and inhibit the diffusion of alkali constituents in the glass composition. In some of the embodiments described herein, the alkali earth oxides include MgO, CaO, SrO, BaO or combinations thereof. In some embodiments, the primary alkaline earth oxide present in the glass composition is MgO. In some embodiments, the primary alkaline earth oxide present in the glass composition is BaO which is utilized to minimize alkali diffusivity. However, in other embodiments, the alkaline earth oxide primarily comprises SrO and/or CaO. In still other embodiments, the glass compositions are substantially free from BaO, such as when the glass composition is a "SuperGreen" or environmentally friendly glass composition.

As defined herein, R'O comprises the mol % of MgO, CaO, SrO, and BaO in the glass composition. In some embodiments, the glass composition can comprise from about 1 to about 28 mol % R'O. In some embodiments, the glass composition can comprise from about 3 to about 16 mol % R'O. In some embodiments, the glass composition can comprise from about 5 to about 16 mol % R'O or about 3 to about 16 mol % R'O. In other embodiments, the glass composition comprises about 3 to less than 9 mol % R'O. In some embodiments, the glass composition can comprise from about 1 to about 28 mol %, about 1 to about 24 mol %, about 1 to about 20 mol %, about 1 to about 16 mol %, about 1 to about 12 mol %, about 1 to about 8 mol %, about 1 to about 5 mol %, about 3 to about 28 mol %, about 3 to about 24 mol %, about 3 to about 20 mol %, about 3 to about 16 mol %, about 3 to about 12 mol %, about 3 to less than 9 mol %, about 3 to about 8 mol %, about 3 to about 5 mol %, about 5 to about 28 mol %, about 5 to about 24 mol %, about 5 to about 20 mol %, about 5 to about 16 mol %, about 5 to about 12 mol %, about 5 to about 8 mol %, about 8 to about 28 mol %, about 8 to about 24 mol %, about 8 to about 20 mol %, about 8 to about 16 mol %, about 8 to about 12 mol %, about 12 to about 28 mol %, about 12 to about 24 mol %, about 12 to about 20 mol %, about 12 to about 16 mol %, about 16 to about 28 mol %, about 16 to about 24 mol %, about 8 to about 20 mol %, or about 20 to about 28 mol % R'O. In some embodiments, the glass composition can comprise about 1, 2, 3, 4, 5, 6, 7, 8, <9, 9, 10, 11, 12, 13, 14, 15, 16, 17, 18, 19, 20, 21, 22, 23, 24, 25, 26, 27, or 28 mol % R'O.

In some embodiments, MgO can be added to the glass to reduce melting temperature, increase strain point, or adjust CTE when used in combination with other alkaline earth compounds (e.g., CaO, SrO, and BaO). In some embodiments, the glass can comprise about 0 to about 7 mol % MgO. In some embodiments, the glass composition can comprise greater than 0 to about 5 mol % MgO. In some embodiments, the glass composition can comprise greater than 0 to about 5 mol % MgO. In some embodiments, the glass composition can comprise 0 to about 7 mol %, 0 to about 5 mol %, 0 to about 4 mol %, 0 to about 3 mol %, 0 to about 2 mol %, 0 to about 1 mol %, >0 to about 7 mol %, >0 to about 5 mol %, >0 to about 4 mol %, >0 to about 3 mol %, >0 to about 2 mol %, >0 to about 1 mol %, about 1 to about 7 mol %, about 1 to about 5 mol %, about 1 to about 4 mol %, about 1 to about 3 mol %, about 1 to about 2 mol %, about 2 to about 7 mol %, about 2 to about 5 mol %, about 2 to about 4 mol %, about 2 to about 3 mol %, about 3 to about 7 mol %, about 3 to about 5 mol %, about 3 to about 4 mol %, about 4 to about 7 mol %, about 4 to about 5 mol %, or about 5 to about 7 mol % MgO. In some embodiments, the glass compositions can comprise about 0, >0, 1, 2, 3, 4, 5, 6, or 7 mol % MgO.

In some embodiments, CaO can contribute to higher strain point, lower density, and lower melting temperature. More generally, it can be a component of certain possible devitrification phases, particularly anorthite ($CaAl_2Si_2O_8$), and this phase has complete solid solution with an analogous sodium phase, albite ($NaAlSi_3O_8$). CaO sources include limestone, an inexpensive material, so to the extent that volume and low cost are factors, in some embodiments it is can be useful to make the CaO content as high as can be reasonably achieved relative to other alkaline earth oxides. The glasses or glass ceramics embodied herein can comprise 0 to 10 mol % CaO. In some embodiments, the glass or glass ceramic composition can comprise from 0 to about 10 mol % CaO. In some embodiments, the glass composition about from 0 to about 9 mol % CaO. In some embodiments, the glass composition can comprise from >0 to about 9 mol % CaO. In some embodiments, the glass composition can comprise from 0 to about 10 mol %, 0 to about 9 mol %, 0 to about 6 mol %, 0 to about 5 mol %, 0 to 3 mol %, 0 to about 1 mol %, >0 to about 10 mol %, >0 to about 9 mol %, >0 to about 6 mol %, >0 to about 5 mol %, >0 to 3 mol %, >0 to about 1 mol %, 1 to about 10 mol %, about 1 to about 9 mol %, about 1 to about 6 mol %, about 1 to about 5 mol %, about 1 to 3 mol %, about 1 to about 2 mol %, about 2 to about 10 mol %, about 2 to about 9 mol %, about 2 to about 6 mol %, about 2 to about 5 mol %, about 2 to 3 mol %, about 3 to about 10 mol %, about 3 to about 9 mol %, about 3 to about 6 mol %, about 3 to about 5 mol %, about 5 to about 10 mol %, about 5 to about 9 mol %, about 5 to about 6 mol %, about 6 to about 10 mol %, about 6 to about 9 mol %, or about 9 to about 10 mol % CaO. In some embodiments, the glass composition can comprise about 0, >0, 1, 2, 3, 4, 5, 6, 7, 8, 9, or 10 mol % CaO.

In some embodiments, the glass can comprise about 0 to about 5 mol % BaO. In some embodiments, the glass composition can comprise greater than 0 to about 4 mol % BaO. In other embodiments, the glass composition can comprise greater than 0 to about 1 mol % BaO. In some embodiments, the glass or glass composition can comprise from 0 to about 5 mol %, 0 to 4 mol %, 0 to 3 mol %, 0 to about 2 mol %, 0 to about 1 mol %, >0 to about 5 mol %, >0 to about 4 mol %, >0 to about 3 mol %, >0 to about 2 mol %, >0 to about 1 mol %, about 1 to about 5 mol %, about 1 to about 4 mol %, about 1 to about 3 mol %, about 1 to about 2 mol %, about 2 to about 5 mol %, about 2 to about 4 mol %, about 2 to about 3 mol %, about 3 to about 5 mol %, about 3 to about 4 mol %, or about 4 to about 5 mol % BaO. In some embodiments, the glass composition can comprise about 0, >0, 1, 2, 3, 4, or 5 mol % BaO.

SrO can contribute to higher coefficient of thermal expansion, and the relative proportion of SrO and SrO can be manipulated to improve liquidus temperature, and thus liquidus viscosity. In some embodiments, the glass can comprise about 1 to about 8 mol % SrO. In some embodiments, the glass composition can comprise about 2 to about 6 mol % SrO. In some embodiments, the glass composition can comprise about 1 to about 8 mol %, about 1 to about 6 mol %, about 1 to about 4 mol %, about 1 to about 2 mol %, about 2 to about 8 mol %, about 2 to about 6 mol %, about 2 to about 4 mol %, about 4 to about 8 mol %, about 4 to about 6 mol %, or about 6 to about 8 mol % SrO. In some embodiments, the glass compositions can comprise about 1, 2, 3, 4, 5, 6, 7, or 8 mol % SrO.

Concentrations of $ZrO_2$ may optionally be found in the glass as a function of the forming process or added as an additional component. In some embodiments, the glass can comprise from 0 to about 3 mol %, 0 to about 2 mol %, 0 to about 1 mol %, 0 to 0.5 mol %, 0 to 0.1 mol %, 0 to 0.05 mol %, 0 to 0.01 mol %, >0 to about 3 mol %, >0 to about 2 mol %, >0 to about 1 mol %, >0 to 0.5 mol %, >0 to 0.1 mol %, >0 to 0.05 mol %, >0 to 0.01 mol % $ZrO_2$.

As a result of the raw materials and/or equipment used to produce the glass or glass ceramic composition of the present invention, certain impurities or components that are not intentionally added, can be present in the final glass or glass ceramic composition. Such materials are present in the glass or glass ceramic composition in minor amounts and are referred to herein as "tramp materials."

As used herein, a glass or glass ceramic composition having 0 mol % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts. Tramp compounds that may be found in glass or glass ceramic embodied herein include, but are not limited to, $Na_2O$, $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, sulfur-based compounds, such as sulfates, halogens, or combinations thereof.

In some embodiments, the glass or glass ceramic further includes a chemical fining agent. Such fining agents include, but are not limited to, $SnO_2$, $As_2O_3$, $Sb_2O_3$, F, Cl and Br.

In some embodiments, the concentrations of the chemical fining agents are kept at a level of 3, 2, 1, or 0.5, >0 mol %. In some embodiments, the fining agent amount is from >0 to about 3 mol %. Chemical fining agents may also include $CeO_2$, $Fe_2O_3$, and other oxides of transition metals, such as $MnO_2$. These oxides may introduce color to the glass or glass ceramic via visible absorptions in their final valence state(s) in the glass, and thus, when present, their concentration is usually kept at a level of 0.5, 0.4, 0.3, 0.2, 0.1 or >0 mol %.

Compared to $As_2O_3$ and $Sb_2O_3$ fining, tin fining (i.e., $SnO_2$ fining) is less effective, but $SnO_2$ is a ubiquitous material that has no known hazardous properties. Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. It is contemplated that these other fining techniques can be used alone. U.S. Pat. Nos. 5,785,726, 6,128,924, 5,824,127 and co-pending U.S. application Ser. No. 11/116,669, all of which are hereby incorporated by reference in their entireties, disclose processes for manufacturing arsenic-free glasses. U.S. Pat. No. 7,696,113, incorporated by reference in its entirety, discloses a process for manufacturing arsenic- and antimony-free glass using iron and tin to minimize gaseous inclusions.

The glasses or glass ceramics can also contain $SnO_2$ either as a result of Joule melting using tin-oxide electrodes, through the batching of tin containing materials, e.g., $SnO_2$, SnO, $SnCO_3$, $SnC_2O_2$, etc., or through addition of $SnO_2$ as an agent to adjust various physical, melting, and forming attributes. The glass can comprise from 0 to about 3 mol %, 0 to about 2 mol %, 0 to about 1 mol %, 0 to 0.5 mol %, or 0 to 0.1 mol % $SnO_2$.

In some embodiments, the glass can be substantially free of $Sb_2O_3$, $As_2O_3$, or combinations thereof. For example, the glass can comprise 0.05 weight percent or less of $Sb_2O_3$ or $As_2O_3$ or a combination thereof, the glass may comprise zero weight percent of $Sb_2O_3$ or $As_2O_3$ or a combination thereof, or the glass may be, for example, free of any intentionally added $Sb_2O_3$, $As_2O_3$, or combinations thereof.

Additional components can be incorporated into the glass compositions to provide additional benefits or alternatively, can further comprise contaminants typically found in commercially-prepared glass. For example, additional components can be added to adjust various physical, melting, and forming attributes. The glasses, according to some embodiments, can also include various contaminants associated with batch materials and/or introduced into the glass by the melting, fining, and/or forming equipment used to produce the glass (e.g., $ZrO_2$). In some embodiments, the glass may comprise one or more compounds useful as ultraviolet radiation absorbers. In some embodiments, the glass can comprise 3 mol % or less $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $Fe_2O_3$, $CeO_2$, halogens, or combinations thereof. In some embodiments, the glass can comprise from 0 to about 3 mol %, 0 to about 2 mol %, 0 to about 1 mol %, 0 to 0.5 mol %, 0 to 0.1 mol %, 0 to 0.05 mol %, or 0 to 0.01 mol % $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $CeO_2$, $Fe_2O_3$, halogens, or combinations thereof.

The glass compositions described herein generally have a coefficient of thermal expansion (CTE) which is greater than or equal to about $55\times10^{-7}/°$ C. averaged over the range from 20° C. to 300° C. In some embodiments, the CTE of the glass compositions may be from about $55\times10^{-7}/°$ C. to about $120\times10^{-7}/°$ C. in a range from 20° C. to 300° C. In other embodiments, the CTE of the glass compositions may be from about $75\times10^{-7}/°$ C. to about $110\times10^{-7}/°$ C. in a range from 20° C. to 300° C. In yet other embodiments, the CTE of the glass compositions may be from about $90\times10^{-7}/°$ C. to about $110\times10^{-7}/°$ C. in a range from 20° C. to 300° C. These relatively high CTEs make the glass compositions particularly well suited for use as a glass core layer in a fusion-formed laminated glass article. Specifically, when the high CTE of the glass core layer is paired with glass cladding layers having lower CTEs during the fusion lamination process, the difference in the CTEs of the glass core layer and the glass cladding layers results in the formation of a compressive stress in the glass cladding layers upon cooling. Accordingly, the glass compositions described herein may be utilized to form a strengthened laminated glass article without the need for an ion exchange treatment or thermal tempering.

The glass compositions described herein have a liquidus viscosity which renders them suitable for use in a fusion draw process and, in particular, for use as a glass core composition in a fusion laminate process. In some embodiments, the liquidus viscosity is greater than or equal to about 100 kPoise. In some other embodiments, the liquidus viscosity may be greater than or equal to 350 kPoise or even greater than or equal to 500 kPoise. The high liquidus viscosity values of the glass compositions described herein are attributable to the combination of a low liquidus temperature with a highly polymerized melt containing high $SiO_2$ content.

The glass compositions described herein have a low liquidus temperature which, like the liquidus viscosity, renders the glass compositions suitable for use in a fusion draw process and, in particular, for use as a glass core layer in a fusion laminate process. A low liquidus temperature prevents devitrification of the glass during the fusion draw fusion. This ensures high-quality homogeneous glass and consistent flow behavior. In some embodiments, the glass compositions have a liquidus temperature from about 900° C. to about 1300° C. In some other embodiments, the liquidus temperature may be less than or equal to about 1000° C. or even less than or equal to about 950° C. In some embodiments, the liquidus temperature of the glass compositions may be less than or equal to 900° C. The liquidus temperature of the glass composition generally decreases with increasing concentrations of $B_2O_3$, alkali oxides and/or alkaline earth oxides.

Table 1 provides embodied example compositional ranges, as discussed herein, that may also provide the attributes, properties or desired traits disclosed herein. Unless zero ("0") or preceded by a less than or greater than (">" or "<") sign, all numerical values in the table should be considered to refer to "about" said value.

TABLE 1

| Composition (mol %) | A | B | C | D | E | F | G |
|---|---|---|---|---|---|---|---|
| $SiO_2$ | 60-75 | 61-75 | 60-73 | 61-73 | 64-71 | 60-75 | 60-75 |
| $Al_2O_3$ | 2-11 | 2-11 | 2-11 | 2-11 | 2-11 | 5-11 | 2-8 |
| $B_2O_3$ | 0-11 | 0-11 | 0-11 | 0-11 | 0-11 | 0-11 | 0-11 |
| MgO | 0-7 | 0-7 | 0-7 | 0-7 | 0-7 | 0-7 | 0-7 |
| CaO | 0-9 | 0-9 | 0-9 | 0-9 | 0-9 | 0-9 | 0-9 |
| SrO | 1-8 | 1-8 | 1-8 | 1-8 | 1-8 | 1-8 | 1-8 |
| BaO | 0-4 | 0-4 | 0-4 | 0-4 | 0-4 | 0-4 | 0-4 |
| $K_2O$ | 1-18 | 1-18 | 1-18 | 1-18 | 1-18 | 1-18 | 1-18 |
| $Na_2O$ | 0-1 | 0-1 | 0-1 | 0-1 | 0-1 | 0-1 | 0-1 |

| Composition (mol %) | H | I | J | K | L | M | N |
|---|---|---|---|---|---|---|---|
| $SiO_2$ | 60-75 | 60-75 | 60-75 | 60-75 | 60-75 | 60-75 | 60-75 |
| $Al_2O_3$ | 5-8 | 2-11 | 2-11 | 2-11 | 2-11 | 2-11 | 2-11 |
| $B_2O_3$ | 0-11 | 4-11 | 0-8 | 4-8 | 0-11 | 0-11 | 0-11 |
| MgO | 0-7 | 0-7 | 0-7 | 0-7 | 2-7 | 0-4 | 2-4 |
| CaO | 0-9 | 0-9 | 0-9 | 0-9 | 0-9 | 0-9 | 0-9 |
| SrO | 1-8 | 1-8 | 1-8 | 1-8 | 1-8 | 1-8 | 1-8 |
| BaO | 0-4 | 0-4 | 0-4 | 0-4 | 0-4 | 0-4 | 0-4 |
| $K_2O$ | 1-18 | 1-18 | 1-18 | 1-18 | 1-18 | 1-18 | 1-18 |
| $Na_2O$ | 0-1 | 0-1 | 0-1 | 0-1 | 0-1 | 0-1 | 0-1 |

| Composition (mol %) | O | P | Q | R | S | T | U |
|---|---|---|---|---|---|---|---|
| $SiO_2$ | 60-75 | 60-75 | 60-75 | 60-75 | 60-75 | 60-75 | 60-75 |
| $Al_2O_3$ | 2-11 | 2-11 | 2-11 | 2-11 | 2-11 | 2-11 | 2-11 |

TABLE 1-continued

| | | | | | | | |
|---|---|---|---|---|---|---|---|
| B₂O₃ | 0-11 | 0-11 | 0-11 | 0-11 | 0-11 | 0-11 | 0-11 |
| MgO | 0-7 | 0-7 | 0-7 | 0-7 | 0-7 | 0-7 | 0-7 |
| CaO | >0-9 | 0-6 | >0-6 | 0-9 | 0-9 | 0-9 | 0-9 |
| SrO | 1-8 | 1-8 | 1-8 | 2-8 | 1-6 | 2-6 | 1-8 |
| BaO | 0-4 | 0-4 | 0-4 | 0-4 | 0-4 | 0-4 | >0-4 |
| K₂O | 1-18 | 1-18 | 1-18 | 1-18 | 1-18 | 1-18 | 1-18 |
| Na₂O | 0-1 | 0-1 | 0-1 | 0-1 | 0-1 | 0-1 | 0-1 |

| Composition (mol %) | V | W | X | Y | Z | AA | AB |
|---|---|---|---|---|---|---|---|
| SiO₂ | 60-75 | 60-75 | 60-75 | 60-75 | 60-75 | 60-75 | 60-75 |
| Al₂O₃ | 2-11 | 2-11 | 2-11 | 2-11 | 2-11 | 2-11 | 2-11 |
| B₂O₃ | 0-11 | 0-11 | 0-11 | 0-11 | 0-11 | 0-11 | 0-11 |
| MgO | 0-7 | 0-7 | 0-7 | 0-7 | 0-7 | 0-7 | 0-7 |
| CaO | 0-9 | 0-9 | 0-9 | 0-9 | 0-9 | 0-9 | 0-9 |
| SrO | 1-8 | 1-8 | 1-8 | 1-8 | 1-8 | 1-8 | 1-8 |
| BaO | 0-3 | >0-3 | 0-4 | 0-4 | 0-4 | 0-4 | 0-4 |
| K₂O | 1-18 | 1-18 | 3-18 | 1-13 | 3-13 | 1-18 | 1-18 |
| Na₂O | 0-1 | 0-1 | 0-1 | 0-1 | 0-1 | >0-1 | 0-0.5 |

| Composition (mol %) | AC | AD | AE | AF | AG | AH | AI |
|---|---|---|---|---|---|---|---|
| SiO₂ | 60-75 | 61-73 | 61-73 | 61-73 | 61-73 | 61-73 | 61-73 |
| Al₂O₃ | 2-11 | 5-8 | 2-11 | 2-11 | 2-11 | 2-11 | 2-11 |
| B₂O₃ | 0-11 | 0-11 | 4-8 | 0-11 | 0-11 | 0-11 | 0-11 |
| MgO | 0-7 | 0-7 | 0-7 | 2-4 | 0-7 | 0-7 | 0-7 |
| CaO | 0-9 | 0-9 | 0-9 | 0-9 | >0-6 | 0-9 | 0-9 |
| SrO | 1-8 | 1-8 | 1-8 | 1-8 | 1-8 | 2-6 | 1-8 |
| BaO | 0-3 | 0-4 | 0-4 | 0-4 | 0-4 | 0-4 | >0-3 |
| K₂O | 1-18 | 1-18 | 1-18 | 1-18 | 1-18 | 1-18 | 1-18 |
| Na₂O | >0-0.5 | 0-1 | 0-1 | 0-1 | 0-1 | 0-1 | 0-1 |

| Composition (mol %) | AJ | AK | AL | AM | AN | AO | AP |
|---|---|---|---|---|---|---|---|
| SiO₂ | 61-73 | 60-75 | 60-75 | 60-75 | 60-75 | 60-75 | 60-75 |
| Al₂O₃ | 2-11 | 5-8 | 5-8 | 5-8 | 5-8 | 5-8 | 5-8 |
| B₂O₃ | 0-11 | 4-8 | 0-11 | 0-11 | 0-11 | 0-11 | 0-11 |
| MgO | 0-7 | 0-7 | 2-4 | 0-7 | 0-7 | 0-7 | 0-7 |
| CaO | 0-9 | 0-9 | 0-9 | >0-6 | 0-9 | 0-9 | 0-9 |
| SrO | 1-8 | 1-8 | 1-8 | 1-8 | 2-6 | 1-8 | 1-8 |
| BaO | 0-4 | 0-4 | 0-4 | 0-4 | 0-4 | >0-3 | 0-4 |
| K₂O | 3-13 | 1-18 | 1-18 | 1-18 | 1-18 | 1-18 | 3-13 |
| Na₂O | 0-1 | 0-1 | 0-1 | 0-1 | 0-1 | 0-1 | 0-1 |

| Composition (mol %) | AQ | AR | AS | AT | AU | AV | AW |
|---|---|---|---|---|---|---|---|
| SiO₂ | 60-75 | 60-75 | 60-75 | 60-75 | 60-75 | 60-75 | 60-75 |
| Al₂O₃ | 2-11 | 5-8 | 5-8 | 5-8 | 5-8 | 5-8 | 5-8 |
| B₂O₃ | 4-8 | 4-8 | 4-8 | 4-8 | 4-8 | 0-11 | 4-8 |
| MgO | 2-4 | 0-7 | 0-7 | 0-7 | 0-7 | 2-4 | 2-4 |
| CaO | 0-9 | >0-6 | 0-9 | 0-9 | 0-9 | >0-6 | 0-9 |
| SrO | 1-8 | 1-8 | 2-6 | 1-8 | 2-6 | 1-8 | 2-6 |
| BaO | 0-4 | 0-4 | 0-4 | >0-3 | 0-4 | 0-4 | 0-4 |
| K₂O | 3-13 | 1-18 | 1-18 | 1-18 | 3-13 | 1-18 | 3-13 |
| Na₂O | 0-1 | 0-1 | 0-1 | 0-1 | 0-1 | 0-1 | 0-1 |

| Composition (mol %) | AX | AY | AZ | BA | BB | BC | BD |
|---|---|---|---|---|---|---|---|
| SiO₂ | 60-75 | 60-75 | 60-75 | 60-75 | 60-75 | 60-75 | 60-75 |
| Al₂O₃ | 2-11 | 2-11 | 2-11 | 2-11 | 2-11 | 2-11 | 2-11 |
| B₂O₃ | 0-11 | 0-11 | 0-11 | 0-11 | 0-11 | 0-11 | 0-11 |
| MgO | 2-4 | 0-7 | 2-4 | 0-7 | 0-7 | 0-7 | 0-7 |
| CaO | 0-9 | 0-9 | >0-6 | >0-6 | >0-6 | 0-9 | 0-9 |
| SrO | 2-6 | 1-8 | 2-6 | 1-8 | 1-8 | 2-6 | 2-6 |
| BaO | >0-3 | 0-4 | 0-4 | >0-3 | 0-4 | >0-3 | 0-4 |
| K₂O | 1-18 | 3-13 | 1-18 | 1-18 | 3-13 | 1-18 | 3-13 |
| Na₂O | 0-1 | 0-1 | 0-1 | 0-1 | 0-1 | 0-1 | 0-1 |

| Composition (mol %) | BE | BF | BG | BH | BI | BJ | BK |
|---|---|---|---|---|---|---|---|
| SiO₂ | 61-73 | 61-73 | 61-73 | 61-73 | 61-73 | 61-73 | 61-73 |
| Al₂O₃ | 5-8 | 5-8 | 5-8 | 5-8 | 5-8 | 5-8 | 5-8 |
| B₂O₃ | 4-8 | 4-8 | 4-8 | 4-8 | 4-8 | 4-8 | 4-8 |
| MgO | 2-4 | 0-7 | 0-7 | 0-7 | 0-7 | 2-4 | 2-4 |

TABLE 1-continued

| | | | | | | | |
|---|---|---|---|---|---|---|---|
| CaO | 0-9 | >0-6 | 0-9 | 0-9 | 0-9 | >0-6 | 0-9 |
| SrO | 1-8 | 1-8 | 2-6 | 1-8 | 1-8 | 1-8 | 2-6 |
| BaO | 0-4 | 0-4 | 0-4 | >0-3 | 0-4 | 0-4 | 0-4 |
| $K_2O$ | 1-18 | 1-18 | 1-18 | 1-18 | 3-13 | 1-18 | 1-18 |
| $Na_2O$ | 0-1 | 0-1 | 0-1 | 0-1 | 0-1 | 0-1 | 0-1 |

| Composition (mol %) | BL | BM | BN | BO | BP | BQ | BR |
|---|---|---|---|---|---|---|---|
| $SiO_2$ | 61-73 | 61-73 | 61-73 | 61-73 | 61-73 | 61-73 | 61-73 |
| $Al_2O_3$ | 5-8 | 5-8 | 5-8 | 5-8 | 5-8 | 5-8 | 5-8 |
| $B_2O_3$ | 4-8 | 4-8 | 4-8 | 4-8 | 4-8 | 4-8 | 4-8 |
| MgO | 2-4 | 2-4 | 2-4 | 2-4 | 2-4 | 2-4 | 2-4 |
| CaO | 0-9 | 0-9 | >0-6 | >0-6 | >0-6 | >0-6 | >0-6 |
| SrO | 1-8 | 1-8 | 2-6 | 1-8 | 1-8 | 2-6 | 2-6 |
| BaO | >0-3 | 0-4 | 0-4 | >0-3 | 0-4 | >0-3 | 0-4 |
| $K_2O$ | 1-18 | 3-13 | 1-18 | 3-13 | 1-18 | 1-18 | 3-13 |
| $Na_2O$ | 0-1 | 0-1 | 0-1 | 0-1 | 0-1 | 0-1 | 0-1 |

| Composition (mol %) | BS | BT | BU | BV | BW | BX | BY |
|---|---|---|---|---|---|---|---|
| $SiO_2$ | 61-73 | 61-75 | 60-73 | 61-75 | 60-73 | 60-73 | 61-75 |
| $Al_2O_3$ | 5-8 | 4-11 | 2-8 | 2-11 | 2-11 | 2-11 | 2-11 |
| $B_2O_3$ | 4-8 | 4-11 | 0-8 | 2-11 | 0-8 | 0-8 | 2-11 |
| MgO | 2-4 | 0-7 | 0-4 | 0-7 | 0-4 | 0-4 | 0-7 |
| CaO | >0-6 | >0-9 | 0-6 | >0-9 | >0-6 | 0-6 | 0-9 |
| SrO | 2-6 | 2-8 | 1-6 | 2-8 | 1-8 | 1-8 | 2-8 |
| BaO | >0-3 | >0-4 | 0-3 | 0-4 | 0-3 | >0-3 | >0-4 |
| $K_2O$ | 3-13 | 3-18 | 1-13 | 3-18 | 1-18 | 1-18 | 3-18 |
| $Na_2O$ | 0-1 | 0-1 | 0-1 | 0-1 | 0-1 | 0-1 | 0-1 |

| Composition (mol %) | BZ | CA | CB | CC | CD | CE | CF |
|---|---|---|---|---|---|---|---|
| $SiO_2$ | 60-75 | 61-75 | 60-73 | 61-73 | 64-71 | 60-75 | 60-75 |
| $Al_2O_3$ | 2-11 | 2-11 | 2-11 | 2-11 | 2-11 | 5-<8 | 2-8 |
| $B_2O_3$ | 4-11 | 4-11 | 4-11 | 4-11 | 4-11 | 4-11 | 4-<7 |
| R'O | 3-16 | 3-16 | 3-16 | 3-16 | 3-16 | 3-16 | 3-16 |
| $K_2O$ | 1-18 | 1-18 | 1-18 | 1-18 | 1-18 | 1-18 | 1-18 |
| $Na_2O$ | 0-1 | 0-1 | 0-1 | 0-1 | 0-1 | 0-1 | 0-1 |

| Composition (mol %) | BZ | CA | CB | CC | CD | CE | CF |
|---|---|---|---|---|---|---|---|
| $SiO_2$ | 60-75 | 60-75 | 61-73 | 61-73 | 61-73 | 61-73 | 61-73 |
| $Al_2O_3$ | 2-11 | 2-11 | 5-<8 | 2-11 | 2-11 | 5-11 | 5-<8 |
| $B_2O_3$ | 4-11 | 4-11 | 4-11 | 4-<7 | 4-11 | 4-11 | 4-<7 |
| R'O | 3-<9 | 3-16 | 3-16 | 3-16 | 3-<9 | 3-16 | 3-16 |
| $K_2O$ | 1-18 | >8-14 | 1-18 | 1-18 | 1-18 | >8-14 | 1-18 |
| $Na_2O$ | 0-1 | 0-1 | 0-1 | 0-1 | 0-1 | 0-1 | 0-1 |

| Composition (mol %) | CG | CH | CI | CJ | CK | CL | CM |
|---|---|---|---|---|---|---|---|
| $SiO_2$ | 61-73 | 61-73 | 61-73 | 61-73 | 61-73 | 62-71 | 62-71 |
| $Al_2O_3$ | 5-<8 | 5-<8 | 5-<8 | 5-<8 | 5-<8 | 5-<8 | 2-11 |
| $B_2O_3$ | 4-11 | 4-11 | 4-<7 | 4-<7 | 4-<7 | 4-<7 | 4-11 |
| R'O | 3-<9 | 3-16 | 3-<9 | 3-16 | 3-<9 | 3-<9 | 3-16 |
| $K_2O$ | 1-18 | >8-14 | 1-18 | >8-14 | >8-14 | 1-18 | 1-18 |
| $Na_2O$ | 0-1 | 0-1 | 0-1 | 0-1 | 0-1 | 0-1 | 0-1 |

Laminates

Figure 1:
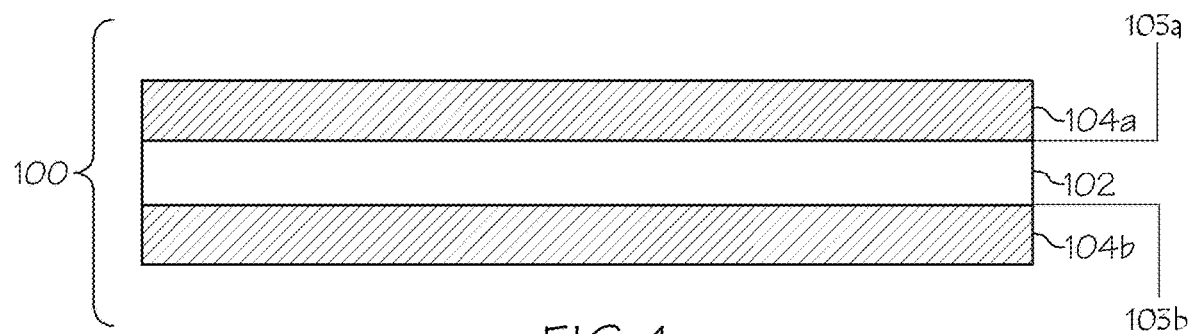
FIG. 1 schematically depicts a cross section of a laminated glass article according to one or more embodiments shown and described herein.

Referring now to FIG. 1, the glass compositions described herein (Compositions 1-6 and A-CM in Table 1) may be used to form a glass article, such as the laminated glass article 100 schematically depicted in cross section in FIG. 1. The laminated glass article 100 generally comprises a glass core layer 102 and a pair of glass cladding layers 104a, 104b. The glass compositions described herein are particularly well suited for use as the glass core layer due to their relatively high coefficients of thermal expansion, as will be discussed in more detail herein.

FIG. 1 illustrates the glass core layer 102 shown comprising a first surface 103a and a second surface 103b which is opposed to the first surface 103a. A first glass cladding layer 104a is fused to the first surface 103a of the glass core layer 102 and a second glass cladding layer 104b is fused to the second surface 103b of the glass core layer 102. The glass cladding layers 104a, 104b are fused to the glass core layer 102 without any additional materials, such as adhesives, coating layers or the like, disposed between the glass core layer 102 and the glass cladding layers 104a, 104b. Thus, a first surface of the glass core layer is directly adjacent the first glass cladding layer, and a second surface of the glass core layer is directly adjacent the second glass cladding layer. In some embodiments, the glass core layer 102 and the glass cladding layers 104a, 104b are formed via a fusion lamination process.

Diffusive layers (not shown) may form between the glass core layer 102 and the glass cladding layer 104a, or between the glass core layer 102 and the glass cladding layer 104b, or both. In such case, the average cladding coefficient of thermal expansion of the first diffusive layer has a value between that of an average cladding coefficient of thermal expansion of the core and an average cladding coefficient of thermal expansion of the first clad layer, or the average cladding coefficient of thermal expansion of the second diffusive layer has a value between that of an average cladding coefficient of thermal expansion of the core and an average cladding coefficient of thermal expansion of the second clad layer.

In the embodiments of the laminated glass article 100 described herein, the glass core layer 102 is formed from a first glass composition having an average core coefficient of thermal expansion $CTE_{core}$ and the glass cladding layers 104a, 104b are formed from a second, different glass composition which has an average cladding coefficient of thermal expansion $CTE_{clad}$. The $CTE_{core}$ is greater than $CTE_{clad}$ which results in the glass cladding layers 104a, 104b being compressively stressed without being ion exchanged or thermally tempered.

Figure 2:
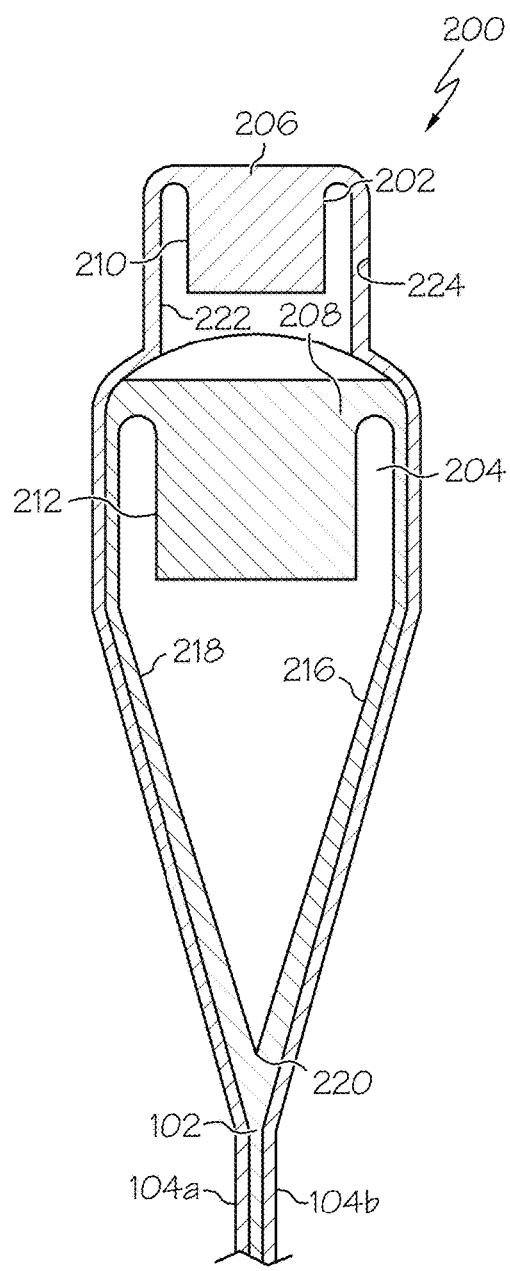
FIG. 2 schematically depicts a fusion draw process for making the glass article of FIG. 1.

Specifically, the glass articles 100 described herein may be formed by a fusion lamination process such as the process described in U.S. Pat. No. 4,214,886, which is incorporated herein by reference. Referring to FIG. 2 by way of example, a laminate fusion draw apparatus 200 for forming a laminated glass article includes an upper isopipe 202 which is positioned over a lower isopipe 204. The upper isopipe 202 includes a trough 210 into which a molten glass cladding composition 206 is fed from a melter (not shown). Similarly, the lower isopipe 204 includes a trough 212 into which a molten glass core composition 208 is fed from a melter (not shown). In the embodiments, described herein, the molten glass core composition 208 has an average coefficient of thermal expansion $CTE_{core}$ which is greater than the average coefficient of thermal expansion $CTE_{clad}$ of the molten glass cladding composition 206.

As the molten glass core composition 208 fills the trough 212, it overflows the trough 212 and flows over the outer forming surfaces 216, 218 of the lower isopipe 204. The outer forming surfaces 216, 218 of the lower isopipe 204 converge at a root 220.

Accordingly, the molten glass core composition 208 flowing over the outer forming surfaces 216, 218 rejoins at the root 220 of the lower isopipe 204 thereby forming a glass core layer 102 of a laminated glass article.

Simultaneously, the molten glass cladding compositions 206 overflows the trough 210 formed in the upper isopipe 202 and flows over outer forming surfaces 222, 224 of the upper isopipe 202. The molten glass cladding composition 206 is outwardly deflected by the upper isopipe 202 such that the molten glass cladding composition 206 flows around the lower isopipe 204 and contacts the molten glass core composition 208 flowing over the outer forming surfaces 216, 218 of the lower isopipe, fusing to the molten glass core composition and forming glass cladding layers 104a, 104b around the glass core layer 102.

As noted hereinabove, the molten glass core composition 208 generally has an average coefficient of thermal expansion $CTE_{core}$ which is greater than the average cladding coefficient of thermal expansion $CTE_{clad}$ of the molten glass cladding composition 206. Accordingly, as the glass core layer 102 and the glass cladding layers 104a, 104b cool, the difference in the coefficients of thermal expansion of the glass core layer 102 and the glass cladding layers 104a, 104b cause a compressive stresses to develop in the glass cladding layers 104a, 104b. The compressive stress increases the strength of the resulting laminated glass article without an ion-exchange treatment or thermal tempering treatment.

Referring again to the laminated glass article 100 depicted in FIG. 1, the glass core layer 102 of the laminated glass article is formed from a glass composition with a relatively high average coefficient of thermal expansion, such as the glass compositions described herein which have coefficients of thermal expansion greater than or equal to $55 \times 10^{-7}/°$ C. In some embodiments, the CTE of the glass core may be from about $55 \times 10^{-7}/°$ C. to about $120 \times 10^{-7}/°$ C. in a range from 20° C. to 300° C. In other embodiments, the CTE of the glass core may be from about $60 \times 10^{-7}/°$ C. to about $110 \times 10^{-7}/°$ C. in a range from 20° C. to 300° C. In other embodiments, the CTE of the glass core may be from about $75 \times 10^{-7}/°$ C. to about $110 \times 10^{-7}/°$ C. in a range from 20° C. to 300° C. In yet other embodiments, the CTE of the glass core may be from about $90 \times 10^{-7}/°$ C. to about $110 \times 10^{-7}/°$ C. in a range from 20° C. to 300° C.

In one embodiment, the glass core layer is formed from a glass composition having an intermediate to high CTE, such as the glass compositions described in Compositions 1-6, hereinabove, those shown in Table 1, and those shown in the Examples below.

For example, a first glass laminate comprises a core glass composition which comprises from about 60 mol % to about 75 mol % $SiO_2$; from about 2 mol % to about 11 mol % $Al_2O_3$; and from 0 mol % to about 11 mol % $B_2O_3$; from 0 mol % to about 1 mol % $Na_2O$; from about 1 mol % to about 18 mol % $K_2O$; from 0 mol % to about 7 mol % MgO; from 0 mol % to about 9 mol % CaO; from about 1 mol % to about 8 mol % SrO; and from 0 mol % to about 4 mol % BaO. In other embodiments, the glass core may comprise a composition comprising from about 65 mol % to about 75 mol % $SiO_2$; from about 5 mol % to about 11 mol % $Al_2O_3$; from 4 mol % to about 11 mol % $B_2O_3$; from 0 mol % to about 0.5 mol % $Na_2O$; from about 2 mol % to about 13 mol % $K_2O$; from 0 mol % to about 7 mol % MgO; from 0 mol % to about 9 mol % CaO; from about 2 mol % to about 6 mol % SrO; and from 0 mol % to about 1 mol % BaO. The glass compositions may further comprise 0 to about 3 mol %, or in some cases >0 to about 1 mol %, additional components and fining agents, such as $SnO_2$, $Fe_2O_3$, $ZrO_2$.

While specific glass compositions for use as the glass core layer 102 have been described herein, it should be understood that any of the glass compositions described herein may be used to form the glass core layer 102 of the laminated glass article 100.

While the glass core layer 102 of the glass laminate structure has been described hereinabove as being formed from a glass composition having a relatively high average coefficient of thermal expansion, the glass cladding layers 104a, 104b of the glass article 100 are formed from glass compositions which have a lower average coefficient of thermal expansion to facilitate the development of compressive stress in the cladding layers upon cooling of the laminated glass article following fusion formation. For example, the glass cladding layers may be formed from a glass composition as described in U.S. Provisional Patent Application No. 61/604,839 entitled "Low CTE Alkali-Free Boroaluminosilcate Glass Compositions and Glass Articles Comprising the Same," U.S. Provisional Patent Application No. 61/866,272, entitled "Alkali-Free Boroaluminosilicate Glasses with High Native Scratch Resistance," and U.S. Provisional Patent Application No. 61/821,426 entitled "Alkali-Free Phosphoboroaluminosilicate Glass," all assigned to Corning Incorporated, and all herein incorporated by reference in their entireties. In some embodiments, the glass clad layers have coefficients of thermal expansion from about 10 to about $45 \times 10^{-7}/°$ C. in a temperature range from 20° C. to 300° C. In other embodiments, the glass clad layers have coefficients of thermal expansion from about 20 to about $40 \times 10^{-7}/°$ C. in a temperature range from 20° C. to 300° C. In still other embodiments, the glass clad has a coefficients of thermal expansion of less than $40 \times 10^{-7}/°$ C. in a temperature range from 20° C. to 300° C.

Alternatively, it may be advantageous in certain circumstances to design the clad and the core such that the CTE difference between the two is equal to or greater than a certain value. Such designs may allow for control of the compressive stress of the composite laminate. In some embodiments, the CTE of the glass core is at least about $20 \times 10^{-7}/°$ C. greater than the glass clad in a range from 20° C. to 300° C. In other embodiments, the CTE of the glass core is at least about $30 \times 10^{-7}/°$ C. greater than the glass clad in a range from 20° C. to 300° C. In still other embodiments, the CTE of the glass core is from about $10 \times 10^{-7}/°$ C. to about $80 \times 10^{-7}/°$ C. greater than the glass clad in a range from 20° C. to 300° C. In other embodiments, the CTE of the glass core is from about $20 \times 10^{-7}/°$ C. to about $60 \times 10^{-7}/°$ C. greater than the glass clad in a range from 20° C. to 300° C.

One example glass clad comprises a glass composition comprising: from about 60 mol % to about 66 mol % $SiO_2$; from about 7 mol % to about 10 mol % $Al_2O_3$; from about 14 mol % to about 18 mol % $B_2O_3$; and from about 9 mol % to about 16 mol % alkaline earth oxide, wherein the alkaline earth oxide comprises at least CaO and the CaO is present in the glass composition in a concentration from about 3 mol % to about 12 mol % and the glass composition is substantially free from alkali metals and compounds containing alkali metals. However, it should be understood that other glass compositions may also be used to form the glass cladding layers 104a, 104b of the laminated glass article 100, so long as the coefficients of thermal expansion of the glass cladding layers 104a, 104b are less than the average coefficient of thermal expansion of the glass core layer 102.

EXAMPLES

The embodiments of the glass compositions described herein will be further clarified by the following examples. The glass properties set forth in the Table 2 were determined in accordance with techniques conventional in the glass art. Thus, $T_{str}$(° C.) is the strain point which is the temperature when the viscosity is equal to $10^{14.7}$ P as measured by beam bending or fiber elongation. The linear coefficient of thermal expansion (CTE) was done using ASTM E228-85 over the temperature range 25-300° C. is expressed in terms of $\times 10^{-7}/°$ C. The annealing point is expressed in terms of ° C. and was determined from fiber elongation techniques (ASTM C336). The density in terms of grams/cm$^3$ was measured via the Archimedes method (ASTM C693). The melting temperature in terms of ° C. (defined as the temperature at which the glass melt demonstrates a viscosity of 400 poises) was calculated employing a Fulcher equation fit to high temperature viscosity data measured via rotating cylinders viscometry (ASTM C965-81).

$T_{liq}$(° C.) is the liquidus temperature—the temperature where the first crystal is observed in a standard gradient boat liquidus measurement (ASTM C829-81). Under these conditions, the temperature at which crystals are observed in the internal portion of the sample is taken to represent the liquidus of the glass (for the corresponding test period). Testing may be carried out from 24 hours to longer times (e.g. 72 hours), wherein longer times provide the opportunity to observe slower growing phases. The liquidus viscosity in poises was determined from the liquidus temperature and the coefficients of the Fulcher equation.

A plurality of exemplary glass compositions were prepared according to the batch compositions listed in Table 2 below. Batches of the oxide constituent components were mixed, melted and formed into glass plates. The properties of the glass melt (i.e., liquidus temperature, annealing point, etc.) and the resultant glass article were measured and the results are reported in Table 2. As indicated, Examples 1-20 each exhibit a relatively high coefficient of thermal expansion (greater than or equal to about $60 \times 10^{-7}/°$ C.) which makes the glass compositions well suited for use with fusion forming processes and, in particular, for use as glass core layers in fusion-formed laminated glass articles.

TABLE 2

| Example Component (mol %) | 1 | 2 | 3 | 4 | 5 | 6 | 7 | 8 |
|---|---|---|---|---|---|---|---|---|
| SiO$_2$ | 68.92 | 69.95 | 65.20 | 72.97 | 74.97 | 70.97 | 70.97 | 70.97 |
| Al$_2$O$_3$ | 2.40 | 2.43 | 10.46 | 2.47 | 2.47 | 4.47 | 2.47 | 2.47 |
| B$_2$O$_3$ | 0.234 | 0.156 | 6.19 | 0.078 | 0.078 | 0.078 | 0.078 | 0.078 |
| MgO | 0.648 | 0.432 | 0 | 0.216 | 0.216 | 0.216 | 2.22 | 4.22 |
| CaO | 8.95 | 5.97 | 7.74 | 2.98 | 2.98 | 2.98 | 2.98 | 2.98 |
| SrO | 3.35 | 4.65 | 4.09 | 5.95 | 5.95 | 5.95 | 5.95 | 5.95 |
| BaO | 0 | 0 | 0 | 0 | 0 | 0 | 0 | 0 |
| K$_2$O | 14.85 | 15.74 | 6.25 | 14.62 | 12.62 | 14.62 | 14.62 | 12.62 |
| Na$_2$O | 0.5 | 0.5 | 0 | 0.5 | 0.5 | 0.5 | 0.5 | 0.5 |
| SnO$_2$ | 0.142 | 0.178 | 0.07 | 0.214 | 0.214 | 0.214 | 0.214 | 0.214 |
| Properties | | | | | | | | |
| Anneal point (° C.) | 618 | 605 | 669 | 604 | 620 | 625 | 610 | 629 |
| Strain point (° C.) | 571 | 559 | 623 | 556 | 568 | 575 | 561 | 578 |
| Softening point (° C.) | 802.4 | 794.5 | 893.2 | 799.2 | 821.9 | 828.3 | 807.3 | 833.6 |
| CTE ($\times 10^{-7}$/° C.) | 99.8 | 101.8 | 62.4 | 98.4 | 88.8 | 95 | 98 | 91.7 |
| Density (g/cm$^3$) | 2.566 | 2.573 | 2.515 | 2.566 | 2.551 | 2.567 | 2.576 | 2.753 |
| 24 h air liquidus (° C.) | 1030 | | 1030 | No devit > 730° C. | No devit > 765° C. | 1000 | 890 | 1000 |
| 24 h internal liquidus (° C.) | 1020 | Blisters 1045° C. | 1020 | No devit > 730° C. | No devit > 765° C. | 995 | 890 | 1000 |

TABLE 2-continued

| | | | | | | | | |
|---|---|---|---|---|---|---|---|---|
| 24 h Pt liquidus (° C.) | 1015 | | 1010 | No devit > 730° C. | No devit > 765° C. | 990 | 885 | 960 |
| Primary Devit Phase | Potash feldspar | | Potash feldspar | | | Leucite | Potassium disilicate | Potassium disilicate |
| $T_{200\ Poise}$ (° C.) | | | 1601.3 | | 1527.7 | | | |
| $T_{35\ kPoise}$ (° C.) | | | 1177.7 | | 1076.9 | | | |
| Liquidus Viscosity (Poise) | | | 893 k | | $1.17 \times 10^9$ | | | |

| Example Component (mol %) | 9 | 10 | 11 | 12 | 13 | 14 | 15 | 16 |
|---|---|---|---|---|---|---|---|---|
| $SiO_2$ | 72.97 | 71.75 | 73.93 | 71.75 | 73.75 | 73.75 | 71.75 | 71.75 |
| $Al_2O_3$ | 2.47 | 4.18 | 2.09 | 4.18 | 4.18 | 4.18 | 4.18 | 6.18 |
| $B_2O_3$ | 0.078 | 5.64 | 5.45 | 5.64 | 3.64 | 3.64 | 5.64 | 3.64 |
| MgO | 2.22 | 0 | 0 | 2 | 0 | 2 | 2 | 0 |
| CaO | 2.98 | 3.10 | 1.55 | 2.11 | 3.10 | 2.11 | 1.13 | 3.10 |
| SrO | 5.95 | 3.21 | 2.92 | 2.19 | 3.21 | 2.19 | 1.18 | 3.21 |
| BaO | 0 | 1.58 | 2.11 | 1.58 | 1.58 | 1.58 | 3.58 | 1.58 |
| $K_2O$ | 12.62 | 10.45 | 11.85 | 10.45 | 10.45 | 10.45 | 10.45 | 10.45 |
| $Na_2O$ | 0.5 | 0 | 0 | 0 | 0 | 0 | 0 | 0 |
| $SnO_2$ | 0.214 | 0.088 | 0.094 | 0.088 | 0.088 | 0.088 | 0.088 | 0.088 |
| Properties | | | | | | | | |
| Anneal point (° C.) | 622 | 640 | 662 | 636 | 645 | 647 | 635 | 652 |
| Strain point (° C.) | 572 | 596 | 619 | 591 | 598 | 599 | 588 | 605 |
| Softening point (° C.) | 828.4 | 830.9 | 814.7 | 836.7 | 842.6 | 859 | 838 | 864.2 |
| CTE ($\times 10^{-7}$/° C.) | 91.4 | 74.7 | 77.6 | 74.2 | 76.6 | 74.2 | 74.5 | 75.9 |
| Density (g/cm³) | 2.564 | 2.551 | 2.565 | 2.515 | 2.542 | 2.508 | 2.562 | 2.538 |
| 24 h air liquidus (° C.) | 935 | 910 | No devit > 875° C. | | | | | 980 |
| 24 h internal liquidus (° C.) | 920 | 895 | No devit > 875° C. | No devit > 780° C. | No devit > 760° C. | No devit > 825° C. | No devit > 870° C. | 965 |
| 24 h Pt liquidus (° C.) | 910 | 870 | No devit > 875° C. | | | | | 960 |
| Primary Devit Phase | Potassium dislicate | unknown | | | | | | Potash feldspar |
| $T_{200\ Poise}$ (° C.) | 1510.9 | | | 1547.7 | 1565.4 | 1611.3 | 1552.4 | 1622.9 |
| $T_{35\ kPoise}$ (° C.) | 1088.6 | | | 1095.3 | 1109.6 | 1135.1 | 1096.4 | 1142.2 |
| Liquidus Viscosity (Poise) | $1.74 \times 10^6$ | | | $2.9 \times 10^8$ | $7.42 \times 10^8$ | $1.15 \times 10^8$ | $9.08 \times 10^6$ | $1.55 \times 10^6$ |

| Example Component (mol %) | 17 | 18 | 19 | 20 | 21 | 22 | 23 | 24 |
|---|---|---|---|---|---|---|---|---|
| $SiO_2$ | 72 | 65.2 | 65.2 | 65.2 | 66.09 | 66.28 | 66.18 | 66.26 |
| $Al_2O_3$ | 2.5 | 10.46 | 8.46 | 9.46 | 10.00 | 9.95 | 9.78 | 9.77 |
| $B_2O_3$ | 0 | 6.19 | 6.19 | 6.19 | 6.64 | 6.50 | 6.75 | 6.70 |
| MgO | 0 | 2 | 2 | 2 | 2.45 | 2.20 | 2.16 | 2.10 |
| CaO | 0 | 6.431 | 7.74 | 7.086 | 6.20 | 6.22 | 6.23 | 6.22 |
| SrO | 7.25 | 3.399 | 4.09 | 3.744 | 3.29 | 3.29 | 3.30 | 3.29 |
| BaO | 0 | 0 | 0 | 0 | 0.04 | 0.04 | 0.04 | 0.04 |
| $K_2O$ | 18 | 6.25 | 6.25 | 6.25 | 5.11 | 5.33 | 5.38 | 5.44 |
| $Na_2O$ | 0 | 0 | 0 | 0 | 0.09 | 0.09 | 0.09 | 0.09 |
| $SnO_2$ | 0.25 | 0.07 | 0.07 | 0.07 | 0.05 | 0.05 | 0.05 | 0.05 |
| Properties | | | | | | | | |
| Anneal point (° C.) | 597 | 670 | 662 | 668 | 660.2 | 657.8 | 660.5 | 660.1 |
| Strain point (° C.) | 551 | 622 | 619 | 623 | 610.2 | 608.9 | 610.2 | 609.8 |
| Softening point (° C.) | 787 | 904.8 | 885.7 | 893 | 901.4 | 898.4 | 898.1 | 893.2 |
| CTE ($\times 10^{-7}$/° C.) | 109 | 59.9 | 66 | 62.7 | 56.2 | 57.3 | 58 | 58.3 |
| Density (g/cm³) | 2.577 | 2.486 | 2.526 | 2.501 | 2.478 | 2.479 | 2.479 | 2.467 |
| 24 h air liquidus (° C.) | <780 | | | | | | | |
| 24 h internal liquidus (° C.) | <780 | | | | | | | |
| 24 h Pt liquidus (° C.) | <780 | | | | | | | |
| Primary Devit Phase | none | | | | | | | |
| $T_{200\ Poise}$ (° C.) | | 1630 | 1555 | 1596 | 1626.8 | 1640.6 | 1619.4 | 1623.2 |
| $T_{35\ kPoise}$ (° C.) | | 1188 | 1139 | 1175 | 1188.3 | 1191.4 | 1185.3 | 1186.1 |
| Liquidus Viscosity (Poise) | | 356K | | 278 k | | | | |

TABLE 2-continued

| Example Component (mol %) | 25 | 26 | 27 | 28 | 29 | 30 | 31 | 32 |
|---|---|---|---|---|---|---|---|---|
| $SiO_2$ | 66.28 | 66.33 | 66.64 | 66.56 | 66.47 | 66.72 | 66.69 | 66.34 |
| $Al_2O_3$ | 9.78 | 9.51 | 9.57 | 9.49 | 9.51 | 9.77 | 9.91 | 9.90 |
| $B_2O_3$ | 6.65 | 6.88 | 6.65 | 6.73 | 6.63 | 6.08 | 5.97 | 6.17 |
| MgO | 2.06 | 2.02 | 1.94 | 1.96 | 1.93 | 1.92 | 1.92 | 1.93 |
| CaO | 6.26 | 6.26 | 6.15 | 6.17 | 6.24 | 6.24 | 6.23 | 6.28 |
| SrO | 3.27 | 3.28 | 3.24 | 3.25 | 3.27 | 3.26 | 3.27 | 3.29 |
| BaO | 0.04 | 0.04 | 0.04 | 0.04 | 0.04 | 0.04 | 0.04 | 0.04 |
| $K_2O$ | 5.47 | 5.50 | 5.59 | 5.63 | 5.75 | 5.78 | 5.79 | 5.86 |
| $Na_2O$ | 0.09 | 0.09 | 0.09 | 0.09 | 0.09 | 0.10 | 0.09 | 0.09 |
| $SnO_2$ | 0.05 | 0.05 | 0.06 | 0.06 | 0.06 | 0.06 | 0.06 | 0.06 |
| Properties | | | | | | | | |
| Anneal point (° C.) | 660.1 | 658.5 | 658.8 | 660.3 | 657.5 | 658 | 660.6 | 660.4 |
| Strain point (° C.) | 609.4 | 607.8 | 610.1 | 609.4 | 607.7 | 609.1 | 610.5 | 610 |
| Softening point (° C.) | 898.4 | 892.5 | 887.3 | 896.4 | 891.8 | 900.4 | 899.3 | 898.5 |
| CTE ($\times 10^{-7}$/° C.) | 58.2 | 58.2 | 58.2 | 58.7 | 59.5 | 59.3 | 59 | 59.2 |
| Density (g/cm³) | 2.467 | 2.466 | 2.464 | 2.465 | 2.466 | 2.466 | 2.469 | 2.469 |
| Primary Devit Phase | | | | | | | | |
| $T_{200\ Poise}$ (° C.) | 1632.6 | 1621.6 | 1640.7 | 1613.9 | 1637.0 | 1652.4 | 1653.2 | 1639.3 |
| $T_{35\ kPoise}$ (° C.) | 1191.3 | 1184.5 | 1191.3 | 1182.6 | 1190.9 | 1197.0 | 1201.0 | 1194.0 |
| Liquidus Viscosity (Poise) | | | | | | | | |

| Example Component (mol %) | 33 | 34 | 35 | 36 | 37 | 38 | 39 | 40 |
|---|---|---|---|---|---|---|---|---|
| $SiO_2$ | 66.54 | 66.47 | 65.37 | 64.30 | 63.91 | 63.55 | 63.53 | 63.49 |
| $Al_2O_3$ | 10.03 | 10.00 | 9.84 | 9.67 | 9.57 | 9.55 | 9.59 | 9.55 |
| $B_2O_3$ | 6.00 | 6.10 | 6.47 | 6.86 | 6.94 | 7.22 | 7.15 | 7.13 |
| MgO | 1.90 | 1.89 | 2.12 | 2.32 | 2.40 | 2.44 | 2.46 | 2.46 |
| CaO | 6.23 | 6.21 | 6.64 | 7.05 | 7.26 | 7.32 | 7.31 | 7.39 |
| SrO | 3.28 | 3.26 | 3.51 | 3.76 | 3.86 | 3.89 | 3.92 | 3.95 |
| BaO | 0.04 | 0.04 | 0.04 | 0.04 | 0.04 | 0.04 | 0.04 | 0.04 |
| $K_2O$ | 5.79 | 5.83 | 5.83 | 5.81 | 5.82 | 5.80 | 5.81 | 5.77 |
| $Na_2O$ | 0.09 | 0.09 | 0.09 | 0.09 | 0.09 | 0.10 | 0.09 | 0.10 |
| $SnO_2$ | 0.07 | 0.07 | 0.07 | 0.07 | 0.07 | 0.07 | 0.07 | 0.08 |
| Properties | | | | | | | | |
| Anneal point (° C.) | 661.2 | 663.2 | 658.7 | 658.6 | 657.7 | 655.8 | 658.4 | 654.2 |
| Strain point (° C.) | 611.3 | 612.4 | 610.6 | 608.4 | 608.4 | 607.2 | 608.6 | 605.9 |
| Softening point (° C.) | 904 | 904.3 | 896.1 | 877.6 | 875.3 | 875.1 | 873.8 | 870.4 |
| CTE ($\times 10^{-7}$/° C.) | 58.7 | | 60.2 | 61.2 | 62.5 | 62.4 | 62.7 | 62.2 |
| Density (g/cm³) | 2.47 | 2.469 | 2.482 | 2.496 | 2.501 | 2.503 | 2.504 | 2.505 |
| Primary Devit Phase | Potash Feldspar | | | | | | | |
| $T_{200\ Poise}$ (° C.) | 1650.7 | 1638.3 | 1605.3 | 1562.1 | 1553.7 | 1545.7 | 1537.3 | 1528.9 |
| $T_{35\ kPoise}$ (° C.) | 1198.5 | 1195.7 | 1174.7 | 1156.0 | 1150.7 | 1144.2 | 1143.8 | 1136.6 |
| Liquidus Viscosity (Poise) | 1251 | | | | | | | |

| Example Component (mol %) | 41 | 42 | 43 | 44 | 45 | 46 | 47 | 48 |
|---|---|---|---|---|---|---|---|---|
| $SiO_2$ | 63.54 | 63.46 | 64.07 | 66.23 | 66.52 | 68.18 | 69.50 | 70.83 |
| $Al_2O_3$ | 9.55 | 9.56 | 9.31 | 9.07 | 8.23 | 7.57 | 6.98 | 6.36 |
| $B_2O_3$ | 7.08 | 7.09 | 6.89 | 6.87 | 6.40 | 6.01 | 5.87 | 5.73 |
| MgO | 2.47 | 2.49 | 2.37 | 0.23 | 1.89 | 1.58 | 1.29 | 1.06 |
| CaO | 7.39 | 7.41 | 7.15 | 6.83 | 5.88 | 5.08 | 4.34 | 3.64 |
| SrO | 3.93 | 3.95 | 3.96 | 4.08 | 4.02 | 4.02 | 4.00 | 4.02 |
| BaO | 0.04 | 0.04 | 0.04 | 0.05 | 0.04 | 0.04 | 0.04 | 0.04 |
| $K_2O$ | 5.80 | 5.79 | 5.96 | 6.43 | 6.81 | 7.30 | 7.76 | 8.11 |
| $Na_2O$ | 0.09 | 0.09 | 0.10 | 0.10 | 0.10 | 0.10 | 0.10 | 0.10 |
| $SnO_2$ | 0.07 | 0.07 | 0.09 | 0.08 | 0.08 | 0.08 | 0.08 | 0.08 |
| Properties | | | | | | | | |
| Anneal point (° C.) | 655.2 | 657.2 | 653.6 | 661.6 | 667.3 | 662.7 | 656.6 | 646.4 |
| Strain point (° C.) | 607.5 | 608.5 | 606.5 | 608.2 | 610.5 | 607.4 | 602.6 | 596.8 |
| Softening point (° C.) | 864.1 | 870.5 | 873 | 874.2 | 886 | 888.2 | 870.8 | 862 |
| CTE ($\times 10^{-7}$/° C.) | 62.2 | 62.4 | 62.3 | 64.8 | 66.2 | 67.8 | 69.2 | 68.5 |
| Density (g/cm³) | 2.505 | 2.507 | 2.505 | | 2.489 | 2.48 | 2.477 | 2.476 |
| Primary Devit Phase | | Potash Feldspar | | | | | | |
| $T_{200\ Poise}$ (° C.) | 1540.9 | 1523.4 | 1574.7 | 1551.5 | 1546.4 | 1569.4 | 1570.8 | 1575.7 |
| $T_{35\ kPoise}$ (° C.) | 1140.6 | 1136.1 | 1155.8 | 1153.6 | 1156.0 | 1162.4 | 1160.0 | 1154.4 |
| Liquidus Viscosity (Poise) | | 256 | | | | | | |

TABLE 2-continued

| Example Component (mol %) | 49 | 50 | 51 | 52 | 53 | 54 | 55 | 56 |
|---|---|---|---|---|---|---|---|---|
| $SiO_2$ | 71.28 | 71.44 | 71.42 | 71.47 | 71.31 | 71.34 | 71.35 | 71.47 |
| $Al_2O_3$ | 6.21 | 6.16 | 6.12 | 6.11 | 6.09 | 6.05 | 6.05 | 6.03 |
| $B_2O_3$ | 5.56 | 5.38 | 5.46 | 5.46 | 5.69 | 5.73 | 5.56 | 5.41 |
| MgO | 0.99 | 0.97 | 0.96 | 0.94 | 0.96 | 0.94 | 0.91 | 0.78 |
| CaO | 3.47 | 3.43 | 3.41 | 3.39 | 3.37 | 3.32 | 3.21 | 2.79 |
| SrO | 4.01 | 4.04 | 4.03 | 4.03 | 4.03 | 4.02 | 4.12 | 4.26 |
| BaO | 0.04 | 0.04 | 0.04 | 0.04 | 0.04 | 0.04 | 0.05 | 0.05 |
| $K_2O$ | 8.23 | 8.32 | 8.34 | 8.34 | 8.31 | 8.33 | 8.54 | 8.98 |
| $Na_2O$ | 0.10 | 0.10 | 0.10 | 0.10 | 0.10 | 0.10 | 0.09 | 0.10 |
| $SnO_2$ | 0.08 | 0.08 | 0.08 | 0.09 | 0.08 | 0.09 | 0.10 | 0.10 |
| Properties | | | | | | | | |
| Anneal point (° C.) | 638.4 | 640.2 | 638.9 | 637.8 | 639.3 | 638 | 636.8 | 635.6 |
| Strain point (° C.) | 592 | 592.3 | 590.6 | 591.4 | 592 | 589.5 | 589.7 | 587.8 |
| Softening point (° C.) | 860.5 | 857.4 | 854.9 | 857.9 | 853.6 | 858.8 | 856.4 | 854.8 |
| CTE ($\times 10^{-7}$/° C.) | 69.4 | 69.8 | 69.7 | 69.7 | 70 | 70.4 | 70.7 | 71.4 |
| Density (g/cm³) | 2.475 | 2.477 | 2.477 | 2.477 | 2.478 | 2.478 | 2.482 | 2.485 |
| Primary Devit Phase | | | | | | | | |
| $T_{200\ Poise}$ (° C.) | 1594.1 | 1581.1 | 1580.9 | 1590.9 | 1579.2 | 1586.6 | 1586.9 | 1573.7 |
| $T_{35\ kPoise}$ (° C.) | 1156.2 | 1153.1 | 1151.8 | 1154.0 | 1151.3 | 1154.3 | 1151.8 | 1147.1 |
| Liquidus Viscosity (Poise) | | 256 | | | | | | |

| Example Component (mol %) | 57 | 58 | 59 | 60 | 61 | 62 | 63 | 64 |
|---|---|---|---|---|---|---|---|---|
| $SiO_2$ | 71.53 | 71.90 | 71.95 | 72.33 | 71.98 | 72.10 | 72.09 | 72.42 |
| $Al_2O_3$ | 6.03 | 6.02 | 6.00 | 6.01 | 6.00 | 5.99 | 5.99 | 6.01 |
| $B_2O_3$ | 5.23 | 4.82 | 4.77 | 4.13 | 4.57 | 4.49 | 4.46 | 4.05 |
| MgO | 0.66 | 0.38 | 0.20 | 0.07 | 0.08 | 0.02 | 0.02 | 0.00 |
| CaO | 2.36 | 1.48 | 0.85 | 0.39 | 0.42 | 0.21 | 0.20 | 0.16 |
| SrO | 4.43 | 4.70 | 4.87 | 5.08 | 5.06 | 5.11 | 5.13 | 5.16 |
| BaO | 0.05 | 0.05 | 0.05 | 0.06 | 0.06 | 0.06 | 0.06 | 0.06 |
| $K_2O$ | 9.47 | 10.42 | 11.07 | 11.66 | 11.57 | 11.77 | 11.80 | 11.87 |
| $Na_2O$ | 0.11 | 0.11 | 0.11 | 0.11 | 0.11 | 0.11 | 0.11 | 0.11 |
| $SnO_2$ | 0.10 | 0.10 | 0.10 | 0.11 | 0.11 | 0.11 | 0.11 | 0.12 |
| Properties | | | | | | | | |
| Anneal point (° C.) | 633.9 | 628.5 | 627.7 | 625.7 | 623.6 | 624.4 | 623.5 | 621.6 |
| Strain point (° C.) | 586.4 | 582.3 | 580.7 | 579 | 577.4 | 577.1 | 576.3 | 575.1 |
| Softening point (° C.) | 847.6 | 844 | 836.1 | 834.7 | 840 | 830.6 | 831.2 | 833.9 |
| CTE ($\times 10^{-7}$/° C.) | 73.3 | 76.5 | 78.1 | 80.2 | 78.8 | 80.2 | 80.5 | 80.2 |
| Density (g/cm³) | 2.492 | 2.5 | 2.504 | 2.51 | 2.511 | 2.511 | 2.512 | 2.513 |
| Primary Devit Phase | | | | | | | | Unknown Feldspar |
| $T_{200\ Poise}$ (° C.) | 1573.5 | 1546.1 | 1544.9 | 1545.3 | 1550.1 | 1530.4 | 1544.4 | 1537.1 |
| $T_{35\ kPoise}$ (° C.) | 1145.2 | 1127.4 | 1128.0 | 1126.6 | 1126.5 | 1119.1 | 1124.8 | 1118.9 |
| Liquidus Viscosity (Poise) | | | | | | | | 544 |

Because the glass compositions described herein have a relatively high average coefficient of thermal expansion, they are particularly well suited for use in conjunction with glass compositions having relatively lower coefficients of thermal expansion to form compressively stressed laminated glass articles by the fusion laminate process. These glass articles may be employed in a variety of consumer electronic devices including, without limitation, mobile telephones, personal music players, tablet computers, LCD and LED displays, automated teller machines and the like. Further, the properties of the glass compositions described herein (e.g., the liquidus viscosity, the liquidus temperature, and the like) make the glass compositions well suited for use with fusion forming processes, such as the fusion down draw process or the fusion lamination process. Additionally, the mobility of alkali ions in the glass compositions is significantly reduced due to the low concentration of $Al_2O_3$ as well as the higher concentration of $B_2O_3$ in the glass compositions, making the compositions particularly well suited for use as backplane substrates of LCD, LED and OLED displays where the presence of highly mobile alkali ions in the backplane substrate may damage the thin film transistors on the substrate. Finally, while specific reference has been made herein to the use of the glass compositions as glass core layers in a laminated glass article, it should be understood that the glass compositions may also be used independently (i.e., not as part of a laminated structure) to form glass articles such as cover glasses for electronic devices and other, similar glass articles.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

As indicated in original disclosure above, U.S. Application Nos. 61/604,839, 61/866,272, and 61/821,426 are incorporated by reference herein in their entireties. Original subject matter from these applications is transcribed below. To avoid ambiguity, reference numbers from U.S. App. No.

61/604,839 are further designated with a single prime ('), reference numbers from U.S. App. No. 61/866,272 are further designated with a double prime ("), and reference numbers from U.S. App. No. 61/821,426 are further designated with a triple prime ('"). No new matter has been added.

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

Glass articles are commonly strengthened by thermal tempering and/or by ion exchange treatment. In either case, the glass article is subjected to additional processing steps after the glass article is formed. These additional processing steps may increase the overall cost of the glass article. Moreover, the additional handling required to carry out these processing steps increases the risk of damage to the glass article which decreases manufacturing yields and further increases production costs and the ultimate cost of the glass article.

Accordingly, a need exists for alternative glass compositions which may be used to produce strengthened glass articles without the need for additional processing steps and glass articles manufactured from such compositions.

According to one embodiment, a glass composition may include from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 9 mol. % to about 16 mol. % alkaline earth oxide. The alkaline earth oxide includes at least CaO. The CaO may be present in the glass composition in a concentration from about 3 mol. % to about 12 mol. %. The glass composition may be substantially free from alkali metals and compounds containing alkali metals. The glass composition has a coefficient of thermal expansion which is less than or equal to $40\times10^{-7}/°$ C. over the temperature range from about 20° C. to 300° C. The glass compositions are particularly well suited for use as glass cladding layers in laminated glass articles, such as laminated glass articles formed by the fusion lamination process.

In one set of embodiments, a glass article includes a glass core layer disposed between a first glass cladding layer and a second glass cladding layer. In some of these embodiments, the core glass may have a first surface and a second surface opposite the first surface, where the first glass cladding layer may be fused to the first surface of the glass core layer and a second glass cladding layer may be fused to the second surface of the glass core layer. In other embodiments, a first diffusive glass layer may be disposed between the glass core layer and the first glass cladding layer; additionally a second diffusive glass layer may be disposed between the glass core layer and the second glass cladding layer; these diffusive layers may be formed during, for example, the fusion forming process. The first glass cladding layer and the second glass cladding layer are formed from a glass composition which includes from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 9 mol. % to about 16 mol. % alkaline earth oxide. The alkaline earth oxide includes at least CaO. The CaO may be present in the glass composition in a concentration from about 3 mol. % to about 12 mol. %. The glass cladding layers may be substantially free from alkali metals and compounds containing alkali metals. The glass cladding layers may have a coefficient of thermal expansion which is less than or equal to $40\times10^{-7}/°$ C. averaged over the temperature range from about 20° C. to 300° C.

Reference will now be made in detail to embodiments of glass compositions having low coefficients of thermal expansion and glass articles incorporating the same, examples of which are illustrated in the accompanying drawings. Whenever possible, the same reference numerals will be used throughout the drawings to refer to the same or like parts. The glass compositions described herein generally have relatively low coefficients of thermal expansion and, as such, may be utilized in conjunction with core glass compositions having relatively high coefficients of thermal expansion to produce laminated glass articles which are compressively stressed without being ion-exchanged or thermally tempered. In one embodiment, a glass composition may include from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 9 mol. % to about 16 mol. % alkaline earth oxide. The alkaline earth oxide includes at least CaO. The CaO may be present in the glass composition in a concentration from about 3 mol. % to about 12 mol. %. The glass composition may be substantially free from alkali metals and compounds containing alkali metals. The glass composition has a coefficient of thermal expansion which is less than or equal to $40\times10^{-7}/°$ C. averaged over the temperature range from about 20° C. to 300° C. The glass compositions and glass articles formed from the glass compositions will be described in more detail herein with specific reference to the appended drawings.

The term "liquidus viscosity," as used herein, refers to the shear viscosity of the glass composition at its liquidus temperature.

The term "liquidus temperatures," as used herein, refers to the highest temperature at which devitrification occurs in the glass composition The term "CTE," as used herein, refers to the coefficient of thermal expansion of the glass composition averaged over a temperature range from about 20° C. to about 300° C.

The term "substantially free," when used to described the absence of a particular oxide component in a glass composition, means that the component is present in the glass composition as a contaminant in a trace amount of less than 1 mol. %.

In the embodiments of the glass compositions described herein, the concentration of constituent components (e.g., $SiO_2$, $Al_2O_3$, $B_2O_3$ and the like) are given in mole percent (mol. %) on an oxide basis, unless otherwise specified.

The glass compositions described herein have properties, such as the liquidus viscosity and the liquidus temperature, which make the glass compositions particularly well suited for use with fusion forming processes, such as the fusion down draw process and/or the fusion lamination process. These properties are attributable to the specific compositions of the glasses, as will be described in more detail herein.

In the embodiments of the glass compositions described herein $SiO_2$ is the largest constituent of the composition and, as such, $SiO_2$ is the primary constituent of the glass network formed from the glass compositions. Pure $SiO_2$ has a relatively low CTE and is alkali free. However, pure $SiO_2$ has an extremely high melting point. Accordingly, if the concentration of $SiO_2$ in the glass compositions described herein is too high, the formability of the glass composition may be diminished as higher concentrations of $SiO_2$ increase the difficulty of melting the glass which, in turn, adversely impacts the formability of the glass. In the embodiments described herein, the glass composition generally comprises $SiO_2$ in a concentration less than or equal to about 66 mol. % in order to facilitate fusion forming the glass compositions. For example, in some embodiments, the concentration of $SiO_2$ in the glass composition is greater than or equal to about 60 mol. % and less than or equal to about 66 mol. %. In some other embodiments, $SiO_2$ is present in the glass composition in a concentration greater than or equal to about 63 mol. % and less than or equal to about 65 mol. %.

The glass compositions described herein also comprise $Al_2O_3$. $Al_2O_3$ serves as a glass network former, similar to $SiO_2$. Like $SiO_2$, $Al_2O_3$ increases the viscosity of the glass composition due to its tetrahedral coordination in a glass melt formed from the glass composition. However, when the concentration of $Al_2O_3$ is balanced against the concentration of $SiO_2$ and the concentration of alkaline earth oxides in the glass composition, $Al_2O_3$ can reduce the liquidus temperature of the glass melt, thereby enhancing the liquidus viscosity and improving the compatibility of the glass composition with certain forming processes such as the fusion forming process.

In the embodiments described herein, the concentration of $Al_2O_3$ in the glass compositions is generally less than or equal to about 10 mol. % in order to achieve compositions having the desired liquidus temperature. For example, in some embodiments, the concentration of $Al_2O_3$ in the glass compositions is greater than or equal to about 7 mol. % and less than or equal to about 10 mol. %. In some of these embodiments, the concentration of $Al_2O_3$ in the glass compositions may be less than or equal to about 9 mol. % or even less than or equal to about 8 mol. %. For example, in some embodiments, the concentration of $Al_2O_3$ in the glass compositions is greater than or equal to about 7 mol. % and less than or equal to about 9 mol. % or even greater than or equal to about 7 mol. % and less than or equal to about 8 mol. %.

The glass compositions in the embodiments described herein further comprise $B_2O_3$. Like $SiO_2$ and $Al_2O_3$, $B_2O_3$ contributes to the formation of the glass network. $B_2O_3$ is added to the glass compositions to decrease the viscosity and liquidus temperature of the glass compositions. Specifically, an increase in the concentration of $B_2O_3$ by 1 mol. % may decrease the temperature required to obtain an equivalent viscosity by 10° C. to 14° C., depending on the specific composition of the glass. However, $B_2O_3$ can lower the liquidus temperature of a glass composition by 18° C. to 22° C. per mol. % of $B_2O_3$. As such, $B_2O_3$ decreases the liquidus temperature of the glass composition more rapidly than it decreases the liquidus viscosity of the glass compositions. $B_2O_3$ is also added to the glass composition to soften the glass network. Moreover, when the glass compositions are used for glass cladding layers in a fusion formed laminated glass article, the $B_2O_3$ in the glass cladding layers is utilized to match the viscosity of the glass cladding layers to that of the glass core layer, particularly when the glass core layer in an alkali-containing glass core layer. Further, additions of $B_2O_3$ to the glass composition also reduce the Young's modulus of the glass composition and improve the intrinsic damage resistance of the glass.

In the embodiments described herein, $B_2O_3$ is generally present in the glass compositions in a concentration greater than or equal to about 14 mol. %. For example, in some embodiments, $B_2O_3$ is present in the glass compositions in a concentration greater than or equal to about 14 mol. % and less than or equal to about 18 mol. %. In some of these embodiments, the concentration of $B_2O_3$ in the glass compositions may be less than or equal to about 17 mol. % or even less than or equal to about 16 mol. %. In other embodiments described herein, $B_2O_3$ is present in the glass compositions in a concentration greater than or equal to about 16 mol. % and less than or equal to about 17 mol. %.

The glass compositions described herein also include at least one alkaline earth oxide. The alkaline earth oxide generally improves the melting behavior of the glass compositions by lowering the temperature required for melting. Moreover, a combination of several different alkaline earth oxides assists in lowering the liquidus temperature of the glass compositions and increases the liquidus viscosity of the glass compositions. The alkaline earth oxides included in the glass compositions described herein are CaO, MgO, SrO and combinations thereof.

In the embodiments described herein, the alkaline earth oxide is present in the glass composition in a concentration greater than or equal to about 9 mol. % and less than or equal to about 16 mol. %. In some embodiments, the glass composition may comprise from about 11 mol. % to about 12 mol. % alkaline earth oxide. In each of the embodiments described herein, the glass compositions include at least CaO as an alkaline earth oxide in a concentration greater than or equal to about 3 mol. % and less than or equal to about 12 mol. %. In some embodiments, the concentration of CaO may be greater than or equal to about 7 mol. % and less than or equal to about 12 mol. %. The alkaline earth oxide may further include MgO in a concentration greater than or equal to about 0 mol. % and less than or equal to about 6 mol. %. In some embodiments the concentration of MgO in the glass composition may be greater than or equal to about 2 mol. % and less than or equal to about 4 mol. %. The alkaline earth oxide in the glass composition may also include SrO in a concentration greater than or equal to about 0 mol. % and less than or equal 6 mol. %. In some embodiments, the SrO may be present in the glass composition in a concentration from about 1 mol. % to about 4 mol. %.

In all the embodiments of the glass compositions described herein, the glass compositions are substantially free from alkali metals and compounds containing alkali metals. Accordingly, it should be understood that the glass compositions described herein are substantially free from alkali oxides such as $K_2O$, $Na_2O$ and $Li_2O$.

The glass compositions described herein may optionally include one or more fining agents. The fining agents may include, for example, $SnO_2$, $As_2O_3$, $Sb_2O_3$ and combinations thereof. The fining agents may be present in the glass compositions in an amount greater than or equal to about 0 mol. % and less than or equal to about 0.5 mol. %. In exemplary embodiments, the fining agent is $SnO_2$. In these embodiments, $SnO_2$ may be present in the glass composition in a concentration which is greater than about 0 mol. % and less than or equal to about 0.2 mol. % or even less than or equal to about 0.15 mol. %.

In some embodiments described herein, the glass compositions may further comprise trace amounts of $Fe_2O_3$ and/or $ZrO_2$. For example, in some embodiments, the glass compositions may comprise $Fe_2O_3$ in a concentration greater than or equal to 0 mol. % and less than or equal to 0.2 mol. %. Alternatively or additionally, the glass compositions may comprise $ZrO_2$ in a concentration greater than or equal to 0 mol. % and less than or equal to about 0.08 mol. %.

In some embodiments described herein, the glass compositions are substantially free of heavy metals and compounds containing heavy metals. Glass compositions which are substantially free from heavy metals and compounds containing heavy metals may also be referred to as "Super-Green" glass compositions. The term "heavy metals," as used herein, refers to Ba, As, Sb, Cd, and Pb.

The glass compositions described herein generally have a coefficient of thermal expansion (CTE) which is less than or equal to about $40 \times 10^{-7}/°$ C. averaged over a range from 20° C. to 300° C. In some embodiments, the CTE of the glass compositions may be less than or equal to about $37 \times 10^{-7}/°$ C. in a range from 20° C. to 300° C. In yet other embodiments, the CTE of the glass compositions may be less than or equal to about $35 \times 10^{-7}/°$ C. in a range from 20° C. to 300° C. The relatively low CTE values of the glass compositions are attributable, at least in part, to the absence of alkali oxides, such as $K_2O$, $Na_2O$, and $Li_2O$ which raise the CTE of the glass composition. These relatively low CTEs make the glass compositions particularly well suited for use as glass cladding layers of a fusion-formed laminated glass article. Specifically, when low CTE glass cladding layers are paired with a glass core layer having a higher CTE during a fusion lamination process, the difference in the CTEs of the glass core layer and the glass cladding layers results in the formation of a compressive stress in the glass cladding layers upon cooling. Accordingly, the glass compositions described herein may be utilized to form a strengthened laminated glass article without the need for an ion exchange treatment.

The glass compositions described herein have a liquidus viscosity which renders them suitable for use in a fusion draw process and, in particular, for use as a glass cladding composition in a fusion laminate process. In some embodiments, the liquidus viscosity is greater than or equal to about 50 kPoise. In some other embodiments, the liquidus viscosity may be greater than or equal to 100 kPoise or even greater than or equal to 250 kPoise.

As noted hereinabove, the addition of $B_2O_3$ to the glass compositions decreases the Young's modulus of the glass compositions which, in turn, improves the intrinsic damage resistance of the glass. In the embodiments described herein, the glass compositions generally have Young's moduli which are less than or equal to about 10.5 MPsi. In some embodiments, the glass compositions may have Young's moduli which are less than 10 MPsi or even less than 9 MPsi.

Based on the foregoing, it should be understood that various embodiments of low CTE glass compositions are disclosed herein. In a first exemplary embodiment, the glass composition includes from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 9 mol. % to about 16 mol. % alkaline earth oxide. The alkaline earth oxide includes at least CaO. The CaO may be present in the glass composition in a concentration from about 3 mol. % to about 12 mol. %.

The glass composition may be substantially free from alkali metals and compounds containing alkali metals. The glass composition has a coefficient of thermal expansion which is less than or equal to $40 \times 10^{-7}/°$ C. averaged over the temperature range from about 20° C. to 300° C.

In a second exemplary embodiment, the glass composition includes from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 9 mol. % to about 16 mol. % alkaline earth oxide. The alkaline earth oxide includes CaO and at least one of MgO and SrO. The CaO may be present in the glass composition in a concentration from about 3 mol. % to about 12 mol. %.

The glass composition may be substantially free from alkali metals and compounds containing alkali metals. The glass composition has a coefficient of thermal expansion which is less than or equal to $40 \times 10^{-7}/°$ C. averaged over the temperature range from about 20° C. to 300° C.

In a third exemplary embodiment, the glass composition includes from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 11 mol. % to about 12 mol. % alkaline earth oxide. The alkaline earth oxide includes at least CaO. The CaO may be present in the glass composition in a concentration from about 3 mol. % to about 12 mol. %. The glass composition may be substantially free from alkali metals and compounds containing alkali metals. The glass composition has a coefficient of thermal expansion which is less than or equal to $40 \times 10^{-7}/°$ C. averaged over the temperature range from about 20° C. to 300° C.

In a fourth exemplary embodiment, the glass composition includes from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 9 mol. % to about 16 mol. % alkaline earth oxide. The alkaline earth oxide includes at least CaO. The alkaline earth oxide may further include at least one of MgO and SrO. The CaO may be present in the glass composition in a concentration from about 3 mol. % to about 12 mol. %. The MgO may be present in the glass composition in a concentration from about 0 mol. % to about 6 mol. %. The SrO may be present in the glass composition in a concentration from about 0 mol. % to about 6 mol. %. The glass composition may be substantially free from alkali metals and compounds containing alkali metals. The glass composition has a coefficient of thermal expansion which is less than or equal to $40 \times 10^{-7}/°$ C. averaged over the temperature range from about 20° C. to 300° C.

In a fifth exemplary embodiment, the glass composition includes from about 63 mol. % to about 65 mol. % $SiO_2$; from about 7 mol. % to about 10 mol. % $Al_2O_3$; and from about 16 mol. % to about 17 mol. % $B_2O_3$ as glass network formers. The glass composition may further include from about 9 mol. % to about 16 mol. % alkaline earth oxide. The alkaline earth oxide includes CaO, MgO and SrO. The CaO may be present in the glass composition in a concentration from about 3 mol. % to about 12 mol. %. The MgO may be present in the glass composition in a concentration from about 2 mol. % to about 4 mol. %. The SrO may be present in the glass composition in a concentration from about 1 mol. % to about 4 mol. %. The glass composition may be substantially free from alkali metals and compounds containing alkali metals. The glass composition has a coefficient of thermal expansion which is less than or equal to 40×10$^{-7}$/° C. averaged over the temperature range from about 20° C. to 300° C.

In a sixth exemplary embodiment, the glass composition includes from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 9 mol. % to about 16 mol. % alkaline earth oxide. The alkaline earth oxide includes CaO, MgO, and SrO. The CaO may be present in the glass composition in a concentration from about 3 mol. % to about 12 mol. %. The MgO may be present in the glass composition in a concentration from about 2 mol. % to about 4 mol. %. The SrO may be present in the glass composition in a concentration from about 1 mol. % to about 4 mol. %. The glass composition may be substantially free from alkali metals and compounds containing alkali metals. The glass composition has a coefficient of thermal expansion which is less than or equal to 40×10$^{-7}$/° C. averaged over the temperature range from about 20° C. to 300° C.

In a seventh exemplary embodiment, the glass composition includes from about 63 mol. % to about 65 mol. % $SiO_2$; from about 7 mol. % to about 10 mol. % $Al_2O_3$; and from about 16 mol. % to about 17 mol. % $B_2O_3$ as glass network formers. The glass composition may further include from about 9 mol. % to about 16 mol. % alkaline earth oxide. The alkaline earth oxide includes at least CaO. The CaO may be present in the glass composition in a concentration from about 3 mol. % to about 12 mol. %. The glass composition may be substantially free from alkali metals and compounds containing alkali metals. The glass composition has a coefficient of thermal expansion which is less than or equal to 40×10$^{-7}$/° C. averaged over the temperature range from about 20° C. to 300° C.

While exemplary glass compositions have been described hereinabove with reference to specific compositional ranges for various constituent components (such as $SiO_2$, $Al_2O_3$, $B_2O_3$, and the like) of each glass composition, it should be understood that each compositional range of each constituent component may include one or more narrower compositional ranges for that constituent component, as described above. Further, it should also be understood that these narrower ranges of the constituent components and/or the relationships between various constituent components may be incorporated in any of the embodiments of the glass compositions described herein in order to produce a glass having the desired properties.

Referring now to FIG. 3, the glass compositions described herein may be used to form a glass article, such as the laminated glass article 100' schematically depicted in cross section in FIG. 3. The laminated glass article 100' generally comprises a glass core layer 102' and a pair of glass cladding layers 104a', 104b'. The glass compositions described herein are particularly well suited for use as the glass claddings layers due to their relatively low coefficients of thermal expansion, as will be discussed in more detail herein.

FIG. 3 illustrates the glass core layer 102' shown comprising a first surface 103a' and a second surface 103b' which is opposed to the first surface 103a'. A first glass cladding layer 104a' is fused to the first surface 103a' of the glass core layer 102' and a second glass cladding layer 104b' is fused to the second surface 103b' of the glass core layer 102'. The glass cladding layers 104a', 104b' are fused to the glass core layer 102' without any additional materials, such as adhesives, coating layers or the like, being disposed between the glass core layer 102' and the glass cladding layers 104a', 104b'. Thus, a first surface of the glass core layer is directly adjacent the first glass cladding layer, and a second surface of the glass core layer is directly adjacent the second glass cladding layer. In some embodiments, the glass core layer 102' and the glass cladding layers 104a', 104b' are formed via a fusion lamination process. Diffusive layers (not shown) may form between the glass core layer 102' and the glass cladding layer 104a', or between the glass core layer 102' and the glass cladding layer 104b', or both. In such case, the average cladding coefficient of thermal expansion of the first diffusive layer has a value between that of an average cladding coefficient of thermal expansion of the core and an average cladding coefficient of thermal expansion of the first clad layer, or the average cladding coefficient of thermal expansion of the second diffusive layer has a value between that of an average cladding coefficient of thermal expansion of the core and an average cladding coefficient of thermal expansion of the second clad layer.

In the embodiments of the laminated glass article 100' described herein, the glass cladding layers 104a', 104b' are formed from a first glass composition having an average cladding coefficient of thermal expansion $CTE_{clad}$ and the glass core layer 102' is formed from a second, different glass composition which has an average coefficient of thermal expansion $CTE_{core}$. The $CTE_{core}$ is greater than $CTE_{clad}$ which results in the glass cladding layers 104a', 104b' being compressively stressed without being ion exchanged or thermally tempered.

Specifically, the glass articles 100' described herein may be formed by a fusion lamination process such as the process described in U.S. Pat. No. 4,214,886, which is incorporated herein by reference. Referring to FIG. 4 by way of example, a laminate fusion draw apparatus 200' for forming a laminated glass article includes an upper isopipe 202' which is positioned over a lower isopipe 204'. The upper isopipe 202' includes a trough 210' into which a molten glass cladding composition 206' is fed from a melter (not shown). Similarly, the lower isopipe 204' includes a trough 212' into which a molten glass core composition 208' is fed from a melter (not shown). In the embodiments, described herein, the molten glass core composition 208' has an average coefficient of thermal expansion $CTE_{core}$ which is greater than the average coefficient of thermal expansion $CTE_{clad}$ of the molten glass cladding composition 206'.

As the molten glass core composition 208' fills the trough 212', it overflows the trough 212' and flows over the outer forming surfaces 216', 218' of the lower isopipe 204'. The outer forming surfaces 216', 218' of the lower isopipe 204' converge at a root 220'. Accordingly, the molten glass core composition 208' flowing over the outer forming surfaces 216', 218' rejoins at the root 220' of the lower isopipe 204' thereby forming a glass core layer 102' of a laminated glass article.

Simultaneously, the molten glass cladding compositions 206' overflows the trough 210' formed in the upper isopipe 202' and flows over outer forming surfaces 222', 224' of the upper isopipe 202'. The molten glass cladding composition 206' is outwardly deflected by the upper isopipe 202' such that the molten glass cladding composition 206' flows around the lower isopipe 204' and contacts the molten glass core composition 208' flowing over the outer forming surfaces 216', 218' of the lower isopipe, fusing to the molten glass core composition and forming glass cladding layers 104a', 104b' around the glass core layer 102'.

As noted hereinabove, the molten glass core composition 208' generally has an average coefficient of thermal expansion $CTE_{core}$ which is greater than the average coefficient of thermal expansion $CTE_{clad}$ of the molten glass cladding composition 206'. Accordingly, as the glass core layer 102' and the glass cladding layers 104a', 104b' cool, the difference in the coefficients of thermal expansion of the glass core layer 102' and the glass cladding layers 104a', 104b' cause a compressive stresses to develop in the glass cladding layers 104a', 104b'. The compressive stress increases the strength of the resulting laminated glass article without an ion-exchange treatment or a thermal tempering treatment.

Referring again to the laminated glass article 100' depicted in FIG. 3, the glass cladding layers 104a', 104b' of the laminated glass article 100' are formed from a glass composition with a relatively low average coefficient of thermal expansion, such as the glass compositions described herein which have coefficients of thermal expansion less than or equal to $40 \times 10^{-7}/°$ C.

For example, in one embodiment, the glass cladding layer is formed from a glass composition having a low CTE, such as the glass compositions described hereinabove which comprise from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition used for the glass cladding layers may further include from about 9 mol. % to about 16 mol. % alkaline earth oxide. The alkaline earth oxide includes at least CaO. The CaO may be present in the glass composition in a concentration from about 3 mol. % to about 12 mol. %. The glass composition used in these glass cladding layers may be substantially free from alkali metals and compounds containing alkali metals.

In another exemplary embodiment, the glass cladding layer may be formed from a glass composition with a low CTE, such as the glass composition described hereinabove which includes from about 63 mol. % to about 65 mol. % $SiO_2$; from about 7 mol. % to about 10 mol. % $Al_2O_3$; and from about 16 mol. % to about 17 mol. % $B_2O_3$ as glass network formers. The glass composition used for the glass cladding layers may further include from about 9 mol. % to about 16 mol. % alkaline earth oxide. The alkaline earth oxide includes a combination of CaO, MgO, and SrO. The CaO may be present in the glass composition in a concentration from about 3 mol. % to about 12 mol. %. The MgO may be present in the glass composition in a concentration from about 2 mol. % to about 4 mol. %. The SrO may be present in the composition in a concentration form about 1 mol. % to about 4 mol. %. The glass composition used in these glass cladding layers may be substantially free from alkali metals and compounds containing alkali metals.

While specific glass compositions for use as the glass cladding layers 104a', 104b' have been described herein, it should be understood that any of the glass compositions described herein may be used to form the glass cladding layers 104a', 104b' of the laminated glass article 100'.

Further, while the glass cladding layers 104a', 104b' of the laminated glass article 100 have been described hereinabove as being formed from a glass composition having a relatively low average coefficient of thermal expansion, the glass core layer 102' of the glass article 100' is formed from a glass composition which has a higher average coefficient of thermal expansion than the glass cladding layers 104a', 104b' to facilitate the development of compressive stress in the cladding layers upon cooling of the laminate article following fusion formation. For example, the glass core layer may be formed from a glass composition comprising alkali ions, such as a glass composition described in U.S. Patent Application No. 61/604,869 entitled "High CTE Potassium Borosilicate Core Glasses and Glass Articles Comprising the Same" assigned to Corning Incorporated, which have coefficients of thermal expansion greater than or equal to $75 \times 10^{-7}/°$ C. in a temperature range from 20° C. to 300° C. For example, the core glass layer may be formed from a glass composition which comprises: from about 70 mol. % to about 80 mol. % $SiO_2$; from about 0 mol. % to about 8 mol. % $Al_2O_3$; from about 3 mol. % to about 10 mol. % $B_2O_3$; from about 0 mol. % to about 2 mol. % $Na_2O$; from about 10 mol. % to about 15 mol. % $K_2O$; and from about 5 mol. % to about 6 mol. % of alkaline earth oxide, wherein the alkaline earth oxide is at least one of CaO, SrO, and BaO without containing MgO. However, it should be understood that other glass compositions may also be used to form the glass core layer 102 of the laminated glass article 100', so long as the average coefficient of thermal expansion of the glass core layer 102' is greater than the average coefficient of thermal expansion of the glass cladding layers 104a', 104b'.

EXAMPLES

The various embodiments of the glass compositions described herein will be further clarified by the following examples.

A plurality of exemplary glass compositions were prepared according to the batch compositions listed in Tables 1'-3' below. Batches of the oxide constituent components were mixed, melted and formed into glass plates. The properties of the glass melt (i.e., liquidus temperature, annealing point, etc.) and the resultant glass article were measured and the results are reported in Tables 1'-3'.

Referring to Tables 1'-3' the composition and properties of inventive glass compositions (i.e., Examples A1'-A26') and comparative glass compositions (i.e., Examples C1'-C4') are provided. As indicated in the Tables, Examples A1 and A3-A26 each exhibited a relatively high liquidus viscosity (greater than about 50 kPoise), and a relatively low coefficient of thermal expansion (less than or equal to about $40 \times 10^{-7}/°$ C.) which makes the glass compositions well suited for use with fusion forming processes and, in particular, for use as glass cladding layers in fusion-formed laminated glass articles. These glasses also exhibited a relatively high annealing point (greater than about 650° C.) which makes the glasses less susceptible to stress relaxation upon exposure to elevated temperatures following strengthening.

The glass composition identified as Example A2' falls within the inventive glass compositions described herein. However, this glass composition exhibited a liquidus viscosity which was slightly lower than 50 kPoise. While not wishing to be bound by theory, it is believed that this relatively low liquidus viscosity is due, at least in part, to the concentration of tin ($SnO_2$) in the composition relative to the other constituent components in this particular composition.

Referring to Table 3', the properties of Comparative Examples C1'-C4' are provided. Comparative Examples C1'-C4' each included higher concentrations of $Al_2O_3$. This increase in the $Al_2O_3$ concentration resulted in a decrease in the liquidus viscosity due to an imbalance between the concentration $Al_2O_3$, the concentration of $SiO_2$, and the concentration of the alkaline earth oxides.

TABLE 1′

Exemplary Glass Compositions

| Analyzed (mol %) | A1′ | A2′ | A3′ | A4′ | A5′ | A6′ | A7′ | A8′ | A9′ | A10′ |
|---|---|---|---|---|---|---|---|---|---|---|
| $SiO_2$ | 62.89 | 63.13 | 61.61 | 61.09 | 62.44 | 62.21 | 60.88 | 64.30 | 61.88 | 60.86 |
| $B_2O_3$ | 16.23 | 16.55 | 16.81 | 16.89 | 16.54 | 16.32 | 16.72 | 14.39 | 17.76 | 16.05 |
| $Al_2O_3$ | 7.32 | 8.45 | 8.00 | 8.96 | 8.11 | 8.23 | 7.51 | 7.50 | 7.11 | 7.17 |
| MgO | 2.54 | 2.54 | 2.94 | 2.85 | 2.42 | 3.56 | 2.79 | 2.61 | 2.50 | 3.01 |
| CaO | 9.54 | 8.12 | 8.39 | 8.96 | 8.46 | 8.88 | 10.66 | 9.78 | 9.39 | 11.31 |
| SrO | 1.31 | 1.04 | 2.08 | 1.07 | 1.87 | 0.62 | 1.36 | 1.34 | 1.29 | 1.52 |
| $ZrO_2$ | 0.02 | 0.02 | 0.02 | 0.02 | 0.02 | 0.02 | 0.01 | 0.01 | 0.01 | 0.01 |
| $SnO_2$ | 0.15 | 0.15 | 0.15 | 0.16 | 0.15 | 0.15 | 0.07 | 0.07 | 0.07 | 0.07 |
| Total | 100 | 100 | 100 | 100 | 100 | 100 | 100 | 100 | 100 | 100 |
| AMPL Anneal (C.): | 670 | 670 | 670 | 670 | 670 | 670 | 700 | 700 | 700 | 700 |
| Anneal Pt (C.): | 688 | 689 | 692 | 681 | 678 | 686 | 675 | 680 | 664 | 672 |
| Strain Pt (C.): | 648 | 642 | 645 | 640 | 637 | 643 | 636 | 638 | 626 | 634 |
| Fiber Soft Pt (C.): | | | | | | | 971.4 | 969.4 | 968.6 | 972 |
| PPV Soft Pt (C.): | 990.6 | 933.2 | 955.6 | 925.9 | 945.8 | 971.5 | 995 | 990.5 | 968.2 | 1007.5 |
| Log[Eta_inf (Pa-s)]: | −1.95 | −2.38 | −1.94 | −2.57 | −2.39 | −2.31 | −4.72 | −4.40 | −4.37 | −5.02 |
| Tg (C.): | 688.1 | 694.2 | 699.2 | 680.5 | 680.8 | 689.2 | 669.6 | 681.7 | 664.4 | 669.9 |
| Fragility: | 39.43 | 37.19 | 40.18 | 36.69 | 37.39 | 38.04 | 31.33 | 31.77 | 32.48 | 31.88 |
| Density (g/cm^3): | 2.38 | 2.351 | 2.387 | 2.367 | 2.382 | 2.359 | 2.385 | 2.394 | 2.365 | 2.41 |
| CTE (×10^−7/C.): | 35.8 | 33.9 | 35.6 | 35.8 | 36.3 | 35.3 | 37.7 | 37.1 | 37.5 | 39.7 |
| Liquidus Temp (C.): | 995 | 1130 | 1045 | 1070 | 1050 | 1070 | 995 | 1030 | 990 | 1055 |
| Primary Devit Phase: | Cassiterite | Cassiterite | Cassiterite | Cassiterite | Cassiterite | Cassiterite | Cristobalite | Cristobalite | Cristobalite | Cristobalite |
| Liquidus Visc (Poise): | 7.00E+05 | 4.74E+04 | 2.16E+05 | 1.23E+05 | 1.79E+05 | 1.25E+05 | 1.64E+06 | 9.00E+05 | 1.15E+06 | 2.30E+05 |
| Poisson's Ratio: | 0.242 | 0.235 | 0.233 | 0.239 | 0.237 | 0.24 | 0.245 | 0.233 | 0.242 | 0.241 |
| Shear Modulus (Mpsi): | 4.019 | 3.896 | 3.994 | 3.96 | 3.993 | 3.983 | 4.025 | 4.121 | 3.906 | 4.148 |
| Young's Modulus (Mpsi): | 9.979 | 9.62 | 9.847 | 9.814 | 9.882 | 9.877 | 10.024 | 10.158 | 9.702 | 10.299 |
| Indentation Threshold (gf): | | | | | | | | | | |

TABLE 2′

Exemplary Glass Compositions

| Analyzed (mol %) | A11′ | A12′ | A13′ | A14′ | A15′ | A16′ | A17′ | A18′ | A19′ | A20′ |
|---|---|---|---|---|---|---|---|---|---|---|
| $SiO_2$ | 64.63 | 62.67 | 62.78 | 63.04 | 63.24 | 62.74 | 61.15 | 63.17 | 64.25 | 64.43 |
| $B_2O_3$ | 16.29 | 16.40 | 16.55 | 16.00 | 15.77 | 16.65 | 15.94 | 15.89 | 16.16 | 16.19 |
| $Al_2O_3$ | 7.49 | 7.30 | 7.26 | 7.34 | 7.35 | 7.29 | 9.32 | 7.32 | 7.45 | 7.44 |
| MgO | 2.20 | 3.62 | 2.54 | 4.62 | 3.62 | 0.51 | 2.57 | 1.54 | 2.18 | 3.91 |
| CaO | 8.18 | 7.59 | 7.47 | 7.59 | 9.65 | 9.43 | 9.62 | 11.76 | 3.20 | 3.98 |
| SrO | 1.13 | 2.34 | 3.33 | 1.32 | 0.29 | 3.31 | 1.32 | 0.29 | 6.68 | 3.99 |
| $ZrO_2$ | 0.01 | 0.01 | 0.01 | 0.01 | 0.01 | 0.01 | 0.01 | 0.01 | 0.01 | 0.01 |
| $SnO_2$ | 0.07 | 0.07 | 0.07 | 0.07 | 0.07 | 0.07 | 0.07 | 0.01 | 0.06 | 0.07 |
| Total | 100 | 100 | 100 | 100 | 100 | 100 | 100 | 100 | 100 | 100 |
| AMPL Anneal (C.): | 700 | 700 | 700 | 700 | 700 | 700 | 700 | 700 | 670 | 670 |
| Anneal Pt (C.): | 668 | 671 | 669 | 676 | 673 | 670 | 675 | 674 | 670 | 670 |
| Strain Pt (C.): | 624 | 631 | 628 | 635 | 634 | 630 | 631 | 634 | 625 | 625 |
| Fiber Soft Pt (C.): | 951 | 961.7 | 950.6 | 987.6 | 981.5 | 935 | 891.6 | 982.2 | 898.4 | 941.8 |
| PPV Soft Pt (C.): | 972.6 | 988.3 | 973.5 | 1001.9 | 1006.4 | 964.2 | 910 | 997.2 | | |

TABLE 2'-continued

Exemplary Glass Compositions

| Analyzed (mol %) | A11' | A12' | A13' | A14' | A15' | A16' | A17' | A18' | A19' | A20' |
|---|---|---|---|---|---|---|---|---|---|---|
| Log[Eta_inf (Pa-s)]: | −2.93 | −4.26 | −4.05 | −4.60 | −4.97 | −2.01 | −2.94 | −4.53 | −2.19 | −3.13 |
| Tg (C.): | 714.3 | 677.6 | 673.7 | 680.3 | 671.2 | 676.4 | 685.2 | 671.0 | 673.6 | 700.0 |
| Fragility: | 36.58 | 32.64 | 33.08 | 31.76 | 30.78 | 38.72 | 36.70 | 31.70 | 36.42 | 35.37 |
| Density (g/cm^3): | 2.344 | 2.388 | 2.411 | 2.362 | 2.352 | 2.422 | 2.388 | 2.363 | 2.441 | 2.391 |
| CTE (×10^−7/C.): | 35.5 | 37.2 | 38.3 | 35.8 | 36.2 | 39.1 | 37.2 | 37 | 37.5 | 36 |
| Liquidus Temp (C.): | 960 | 1040 | 990 | 1035 | 1040 | 995 | 975 | 1025 | 950 | 960 |
| Primary Devit Phase: | Cristobalite | Cristobalite | Cristobalite | Cristobalite | Cristobalite | Cristobalite | Cristobalite | Cristobalite | Cristobalite | Cristobalite |
| Liquidus Visc (Poise): | 1.06E+07 | 4.51E+05 | 1.49E+06 | 7.00E+05 | 5.50E+05 | 5.31E+05 | 1.73E+06 | 6.78E+05 | 3.31E+06 | 7.49E+06 |
| Poisson's Ratio: | 0.234 | 0.231 | 0.239 | 0.234 | 0.242 | 0.225 | 0.239 | 0.238 | 0.239 | 0.243 |
| Shear Modulus (Mpsi): | 3.862 | 4 | 4.02 | 3.991 | 3.993 | 4.078 | 4.058 | 4.061 | 3.946 | 3.894 |
| Young's Modulus (Mpsi): | 9.533 | 9.851 | 9.966 | 9.852 | 9.915 | 9.991 | 10.059 | 10.052 | 9.776 | 9.679 |
| Indentation Threshold (gf): | | | | | | | | | 300-400 | 400-500 |

TABLE 3'

Exemplary Glass Compositions

| Analyzed (mol %) | A21' | C1' | C2' | A22' | A23' | A24' | A25' | A26' | C3' | C4' |
|---|---|---|---|---|---|---|---|---|---|---|
| $SiO_2$ | 63.03 | 60.93 | 60.17 | 63.37 | 63.82 | 63.76 | 63.78 | 63.87 | 63.71 | 63.61 |
| $B_2O_3$ | 16.24 | 17.60 | 17.99 | 16.39 | 15.74 | 15.49 | 15.35 | 14.93 | 14.75 | 14.60 |
| $Al_2O_3$ | 9.13 | 11.10 | 12.53 | 7.59 | 9.15 | 9.45 | 9.65 | 9.92 | 10.23 | 10.47 |
| MgO | 3.83 | 2.05 | 1.04 | 3.47 | 3.70 | 3.73 | 3.68 | 3.70 | 3.71 | 3.73 |
| CaO | 3.86 | 3.12 | 4.11 | 3.49 | 3.76 | 3.76 | 3.74 | 3.76 | 3.77 | 3.76 |
| SrO | 3.84 | 5.11 | 4.09 | 5.61 | 3.75 | 3.73 | 3.72 | 3.74 | 3.76 | 3.75 |
| $ZrO_2$ | 0.01 | 0.01 | 0.01 | 0.01 | 0.01 | 0.01 | 0.01 | 0.01 | 0.01 | 0.01 |
| $SnO_2$ | 0.07 | 0.07 | 0.07 | 0.07 | 0.07 | 0.07 | 0.07 | 0.07 | 0.06 | 0.07 |
| Total | 100 | 100 | 100 | 100 | 100 | 100 | 100 | 100 | 100 | 100 |
| AMPL Anneal (C.): | 670 | 670 | 670 | 670 | 670 | 670 | 670 | 670 | 670 | 670 |
| Anneal Pt (C.): | 676 | 675 | 677 | 670 | 681 | 680 | 685 | 690 | 692 | 695 |
| Strain Pt (C.): | 628 | 622 | 626 | 625 | 632 | 630 | 634 | 641 | 642 | 644 |
| Fiber Soft Pt (C.): | 914.1 | 910.9 | 908.5 | 922.4 | 913.6 | 915.2 | 920 | 920.9 | 927.8 | 927.8 |
| PPV Soft Pt (C.): | | | | | | | | | | |
| Log[Eta_inf (Pa-s)]: | −2.93 | −3.32 | −3.23 | −2.37 | −2.93 | −2.93 | −2.93 | −2.93 | −2.93 | −2.93 |
| Tg (C.): | 687.9 | 676.0 | 687.9 | 679.0 | 688.9 | 699.0 | 696.4 | 705.2 | 702.3 | 710.2 |
| Fragility: | 34.80 | 33.66 | 35.29 | 36.09 | 34.54 | 35.26 | 34.94 | 35.58 | 35.42 | 35.82 |
| Density (g/cm^3): | 2.384 | 2.4 | 2.388 | 2.419 | 2.385 | 2.386 | 2.391 | 2.393 | 2.397 | 2.4 |
| CTE (×10^−7/C.): | 34 | 34.2 | 33.5 | 36.7 | | | | | | |
| Liquidus Temp (C.): | 940 | 1135 | 1250 | 960 | | | | | | |
| Primary Devit Phase: | Cristobalite | Mullite | Mullite | Cristobalite | | | | | | |
| Liquidus Visc (Poise): | 1.10E+07 | 4.67E+04 | 4.79E+03 | 3.12E+06 | | | | | | |

TABLE 3'-continued

Exemplary Glass Compositions

| Analyzed (mol %) | A21' | C1' | C2' | A22' | A23' | A24' | A25' | A26' | C3' | C4' |
|---|---|---|---|---|---|---|---|---|---|---|
| Poisson's Ratio: | 0.252 | 0.254 | 0.256 | 0.24 | | | | | | |
| Shear Modulus (Mpsi): | 3.89 | 3.778 | 3.807 | 3.913 | | | | | | |
| Young's Modulus (Mpsi): | 9.741 | 9.473 | 9.566 | 9.702 | | | | | | |
| Indentation Threshold (gf): | 500-600 | 500-600 | 600-700 | 400-500 | | | | | | |

It should now be understood that the glass compositions described herein have relatively low coefficients of thermal expansion. As such, the glass compositions described herein are particularly well suited for use in conjunction with glass compositions with relatively high coefficients of thermal expansion to form a compressively stressed laminated glass article by the fusion laminate process. These glass articles may be employed in a variety of consumer electronic devices including, without limitation, mobile telephones, personal music players, tablet computers, LCD and LED displays, automated teller machines and the like.

It should also be understood that the properties of the glass compositions described herein, (e.g., the liquidus viscosity, the liquidus temperature, and the like) make the glass compositions well suited for use with fusion forming processes, such as the fusion down draw process or the fusion lamination process.

Moreover, the glass compositions described herein are free from alkali metals. As such, the glass compositions described herein may be particularly well suited for use as backplane substrates of LCD, LED and OLED displays where the presence of alkali metals may damage the thin film transistor deposited on the backplane substrate. The glass compositions described herein may be used to form the entire backplane substrate or, alternatively, may be used as cladding glasses in a laminated glass substrate which includes an alkali containing glass core.

Further, while specific reference has been made herein to the use of the glass compositions as cladding layers of a laminated glass article, it should be understood that the glass compositions may also be used to independently form glass articles (i.e., non-laminated glass articles), such as, for example, cover glasses for electronic devices, backplane glasses for display devices and other, similar glass articles.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

Alkali-doped and alkali-free boroaluminosilicate glasses are provided. The glasses include the network formers $SiO_2$, $B_2O_3$, and $Al_2O_3$. The glass may, in some embodiments, have a Young's modulus of less than about 65 GPa and/or a coefficient of thermal expansion, averaged over a temperature range from about 20° C. to about 300° C., of less than about $40 \times 10^{-7}/°$ C. The glass may be used as a cover glass for electronic devices, a color filter substrate, a thin film transistor substrate, or an outer clad layer for a glass laminate.

Accordingly, one aspect of the disclosure is to provide a glass comprising from about 50 mol % to about 70 mol % $SiO_2$; from about 5 mol % to about 20 mol % $Al_2O_3$; from about 12 mol % to about 35 mol % $B_2O_3$; up to about 5 mol % MgO; up to about 12 mol % CaO; and up to about 5 mol % SrO, wherein the sum of alkali metal oxide modifiers is less than or equal to about 1 mol %.

A second aspect of the disclosure is to provide a glass comprising $SiO_2$, $B_2O_3$, and $Al_2O_3$. The glass is substantially free of alkali metal oxide modifiers and $P_2O_5$, and has at least one of a Young's modulus of less than about 65 GPa, a coefficient of thermal expansion, averaged over a temperature range from about 20° C. to about 300° C., of less than about $40 \times 10^{-7}/°$ C., and a Knoop scratch threshold of at least about 15 N (Newtons).

A third aspect of the disclosure is to provide a glass laminate comprising a core glass and a clad glass laminated onto an outer surface of the core glass. The clad glass layer comprises $SiO_2$, $B_2O_3$, and $Al_2O_3$ and is substantially free of alkali metal oxide modifiers. The clad glass has a first coefficient of thermal expansion, averaged over a temperature range from about 20° C. to about 300° C., of less than about $40 \times 10^{-7}/°$ C. and the core glass has a second coefficient of thermal expansion, averaged over a temperature range from about 20° C. to about 300° C., that is greater than the first coefficient of thermal expansion.

A fourth aspect of the disclosure is to provide a method of making a glass. The method comprises: providing a glass melt, the glass melt comprising $SiO_2$, $B_2O_3$, and $Al_2O_3$, wherein the glass melt is substantially free of alkali metal oxide modifiers; and down-drawing the glass melt to form the glass.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %). Coefficients of thermal expansion (CTE) are expressed in terms of $10^{-7}/°$ C. and represent a value measured over a temperature range from about 20° C. to about 300° C., unless otherwise specified.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of alkali metal oxides" or "substantially free of $P_2O_5$" is one in which such oxides are not actively added or batched into the glass, but may be present in very small amounts as contaminants.

Referring to the drawings in general and to FIG. 5 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are glasses and glass articles made therefrom that comprise the network formers $SiO_2$, $B_2O_3$, and $Al_2O_3$, and, in some embodiments, have low (i.e., less than about $40 \times 10^{-7}/°$ C.) coefficients of thermal expansion (CTE). In some embodiments, the glasses are intentionally lightly doped with less than about 1 mol % of alkali metals or alkali metal oxides to lower the resistivity of the glass melt and avoid "fire-through" of refractory containment and processing structures. In other embodiments, the glasses are free of alkali metals and alkali metal oxides (also referred to herein as "alkali metal oxide modifiers"). In some embodiments, these glasses also have low values of Young's modulus and shear modulus to improve the intrinsic or native damage resistance of the glass.

In some embodiments, the glasses described herein are formable by down-draw processes that are known in the art, such as slot-draw and fusion-draw processes. The fusion draw process is an industrial technique that has been used for the large-scale manufacture of thin glass sheets. Compared to other flat glass manufacturing techniques, such as the float or slot draw processes, the fusion draw process yields thin glass sheets with superior flatness and surface quality. As a result, the fusion draw process has become the dominant manufacturing technique in the fabrication of thin glass substrates for liquid crystal displays, as well as for cover glass for personal electronic devices such as notebooks, entertainment devices, tables, laptops, and the like.

The fusion draw process involves the flow of molten glass over a trough known as an "isopipe," which is typically made of zircon or another refractory material. The molten glass overflows the top of the isopipe from both sides, meeting at the bottom of the isopipe to form a single sheet where only the interior of the final sheet has made direct contact with the isopipe. Since neither exposed surface of the final glass sheet has made contact with the isopipe material during the draw process, both outer surfaces of the glass are of pristine quality and do not require subsequent finishing.

In order to be fusion drawable, a glass must have a sufficiently high liquidus viscosity (i.e., the viscosity of a molten glass at the liquidus temperature). In some embodiments, the glasses described herein have a liquidus viscosity of at least about 100 kilopoise (kpoise), in other embodiments, at least about 120 kpoise, and in still other embodiments, these glasses have a liquidus viscosity of at least about 300 kpoise. In those instances in which the alkali-doped and alkali-free glass is used as a clad layer in a glass laminate and the viscosity behavior of the core glass with respect to temperature is approximately the same as that of the clad glass, the liquidus viscosity of the clad glass may be greater than or equal to about 70 kPoise.

Traditional fusion draw is accomplished using a single isopipe, resulting in a homogeneous glass product. The more complicated laminate fusion process makes use of two isopipes to form a laminated sheet comprising a core glass composition surrounded on either (or both) side by outer clad layers. One of the main advantages of laminate fusion is that when the coefficient of thermal expansion of the clad glass is less than that of the core glass, the CTE difference results in a compressive stress in the outer clad layer. This compressive stress increases the strength of the final glass product without the need for ion exchange treatment. Unlike ion exchange, this strengthening can be achieved without the use of alkali ions in the glass.

Accordingly, in some embodiments, the alkali-doped and alkali-free glasses described herein may be used to form a glass laminate, schematically shown in FIG. 5. Glass laminate 100" comprises a core glass 110" surrounded by a clad glass 120" or "clad layer" formed from the alkali-doped and alkali-free glass described herein. The core glass 110" has a CTE that is greater than that of the alkali-doped and alkali-free glass in the clad layer 120". The core glass may, in some embodiments, be an alkali aluminosilicate glass. In one non-limiting example, the core glass is an alkali aluminosilicate glass having the composition 66.9 mol % $SiO_2$, 10.1 mol % $Al_2O_3$, 0.58 mol % $B_2O_3$, 7.45 mol % $Na_2O$, 8.39 mol % $K_2O$, 5.78 mol % MgO, 0.58 mol % CaO, 0.2 mol % $SnO_2$, 0.01 mol % $ZrO_2$, and 0.01 mol % $Fe_2O_3$, with a strain point of 572° C., an anneal point of 629° C., a softening point of 888° C., and CTE=$95.5 \times 10^{-7}/°$ C.

When employed as a clad glass in a laminated product, the alkali-doped and alkali-free glass compositions described herein can provide high compressive stresses to the clad layer. The CTE of low alkali metal oxide/alkali-doped and alkali-free fusion-formable glasses described herein are generally in the range of about $40 \times 10^{-7}/°$ C. or less and, in some embodiments, in the range of about $35 \times 10^{-7}/°$ C. or less. When such a glass is paired with, for example, an alkali aluminosilicate glass (e.g., Gorilla® Glass, manufactured by Corning Incorporated) having a CTE of $90 \times 10^{-7}/°$ C., the expected compressive stress in the clad glass can be calculated using the elastic stress equations given below in which subscripts 1 and 2 refer to the core glass and the clad glass, respectively:

$$\sigma_2 = \frac{E_1(e_2 - e_1)}{(\frac{E_1}{E_2}(1-v_2)) + (\frac{2t_2}{t_1}(1-v_1))}$$

and $$\sigma_1 = -\frac{2t_2}{t_1}\sigma_2$$

where E is Young's modulus, $v$ is Poisson's ratio, t is the glass thickness, $\sigma$ is the stress, and $e_2-e_1$ is the difference in thermal expansion between the clad glass and the core glass. Using the same elastic modulus and Poisson's ratio for the clad glass and core glass further simplifies the above equations.

To calculate the difference in thermal expansion between the clad glass and core glass, it is assumed that the stress sets in below the strain point of the softer glass of the clad and core. The stresses in the clad glass can be estimated using these assumptions and the equations above. For typical display-like glass with a CTE of $30\times10^{-7}/°$ C. as the clad glass and an alkali aluminosilicate core glass with CTE of $90\times10^{-7}/°$ C., overall thicknesses in the range of 0.5-1.0 mm and clad glass thickness of 10-100 μm, the compressive stress of the clad glass is estimated to be in a range from about 200 MPa to about 315 MPa. In some embodiments, the glasses described herein have coefficients of thermal expansion of less than about $40\times10^{-7}/°$ C. and, in some embodiments, less than about $35\times10^{-7}/°$ C. For these glasses, the compressive stress of the clad glass layer would be at least about 40 MPa, and in other embodiments, at least about 80 MPa.

The alkali-doped and alkali-free glasses described herein have especially low coefficients of thermal expansion. In some embodiments, the CTE of the glass is less than less than about $40\times10^{-7}/°$ C. and, in other embodiments, is less than about $35\times10^{-7}/°$ C. When paired with a core glass having a higher CTE, the glasses described herein provide a high level of compressive stress in the clad layers of the final laminated glass product. This increases the strength of the glass laminate product. Room-temperature compressive stresses of at least about 40 MPa and, in some embodiments, at least about 80 MPa are attainable by using the glasses disclosed herein in the clad layer of the laminate. When used as a clad layer, the liquidus viscosity requirements of the glasses described herein may be lowered. In those embodiments where the viscosity behavior of the core glass with respect to temperature is approximately the same as (i.e., "matched with") that of the clad glass, the liquidus viscosity of the clad glass may be greater than or equal to about 70 kPoise.

The alkali-doped and alkali-free glasses have values of Young's modulus and shear modulus that are significantly less than those of other commercially available fusion-drawn glasses. In some embodiments, the Young's modulus is less than about 65 gigapascals (GPa) and, in still other embodiments, less than about 60 GPa. The low elastic moduli provide these glasses with a high level of intrinsic damage resistance.

In some embodiments, the glasses described herein consist essentially of or comprise: from about 50 mol % to about 70 mol % $SiO_2$ (i.e., 50 mol %≤$SiO_2$≤70 mol %); from about 5 mol % to about 20 mol % $Al_2O_3$ (i.e., 5 mol %≤$Al_2O_3$≤20 mol %); from about 12 mol % to about 35 mol % $B_2O_3$ (i.e., 12 mol %≤$B_2O_3$≤35 mol %); up to about 5 mol % MgO (i.e., 0 mol %≤MgO≤5 mol %); up to about 12 mol % CaO (i.e., 0 mol %≤CaO≤12 mol %); and up to about 5 mol % SrO (i.e., 0 mol %≤SrO≤5 mol %), wherein the sum of the alkali metal oxide modifiers is less than or equal to 0.1 mol % (i.e., 0 mol %≤$Li_2O$+$Na_2O$+$K_2O$≤0.1 mol %). In some embodiments, 4 mol %≤MgO+CaO+SrO≤$Al_2O_3$+1 mol %. In certain embodiments, the glass is substantially free of, or contains 0 mol %, $P_2O_5$ and/or alkali metal oxide modifiers.

The glass may further include up to about 0.5 mol % $Fe_2O_3$ (i.e., 0 mol %≤$Fe_2O_3$≤0.5 mol %); up to about 0.2 mol % $ZrO_2$ (i.e., 0 mol %≤$ZrO_2$≤0.2 mol %); and, optionally, at least one fining agent such as $SnO_2$, $CeO_2$, $As_2O_3$, $Sb_2O_5$, Cl⁻, F⁻, or the like. The at least one fining agent may, in some embodiments, include up to about 0.7 mol % $SnO_2$ (i.e., 0 mol %≤$SnO_2$≤0.5 mol %); up to about 0.7 mol % $CeO_2$ up to about 0.5 mol % (i.e., 0 mol %≤$CeO_2$≤0.7 mol %); $As_2O_3$ (i.e., 0 mol %≤$As_2O_3$≤0.5 mol %); and up to about 0.5 mol % $Sb_2O_3$ (i.e., 0 mol %≤$Sb_2O_3$≤0.5 mol %).

In particular embodiments, the glasses consist essentially of or comprise: from about 55 mol % to about 70 mol % $SiO_2$ (i.e., 55 mol %≤$SiO_2$≤70 mol %); from about 6 mol % to about 10 mol % $Al_2O_3$ (i.e., 6 mol %≤$Al_2O_3$≤10 mol %); from about 18 mol % to about 30 mol % $B_2O_3$ (i.e., 18 mol %≤$B_2O_3$≤30 mol %); up to about 3 mol % MgO (i.e., 0 mol %≤MgO≤3 mol %); from about 2 mol % up to about 10 mol % CaO (i.e., 2 mol %≤CaO≤10 mol %); and up to about 3 mol % SrO (i.e., 0 mol %≤SrO≤3 mol %), wherein the sum of the alkali metal oxide modifiers is less than or equal to 1 mol % (i.e., 0 mol %≤$Li_2O$+$Na_2O$+$K_2O$≤1 mol %). In some embodiments, the total amount of MgO, CaO, and SrO in the glasses described herein is greater than or equal to about 4 mol % and less than or equal to the amount of $Al_2O_3$ present in the glass (i.e., 4 mol %≤MgO+CaO+SrO≤$Al_2O_3$). In some embodiments, the total amount of alkali and alkaline earth oxides in the glasses described herein is greater than or equal to about 4 mol % and less than or equal to the amount of $Al_2O_3$ present in the glass (i.e., 4 mol %≤$Li_2O$+$Na_2O$+$K_2O$+MgO+CaO+SrO≤$Al_2O_3$). In certain embodiments, the glass is free of $P_2O_5$.

The glass may further include up to about 0.2 mol % $ZrO_2$ (i.e., 0 mol %≤$ZrO_2$≤0.2 mol %), up to about 0.2 mol % $Fe_2O_3$ (i.e., 0 mol %≤$Fe_2O_3$≤0.2 mol %) and at least one fining agent such as $SnO_2$, $CeO_2$, $As_2O_3$, $Sb_2O_5$, Cl⁻, F⁻, or the like. The at least one fining agent may, in some embodiments, include up to about 0.2 mol % $SnO_2$ (i.e., 0 mol %≤$SnO_2$≤0.2 mol %).

Compositions and of non-limiting examples of these glasses are listed in Table 1". Each of the oxide components of these glasses serves a function. Silica ($SiO_2$) is the primary glass forming oxide, and forms the network backbone for the molten glass. Pure $SiO_2$ has a low CTE and is alkali metal-free. Due to its extremely high melting temperature, however, pure $SiO_2$ is incompatible with the fusion draw process. The viscosity curve is also much too high to match with any core glass in a laminate structure. In some embodiments, the amount of $SiO_2$ in the glasses described herein ranges from about 50 mol % to about 70 mol %. In other embodiments, the $SiO_2$ concentration ranges from about 55 mol % to about 70 mol %.

In addition to silica, the glasses described herein comprise the network formers $Al_2O_3$ and $B_2O_3$ to achieve stable glass formation, low CTE, low Young's modulus, low shear modulus, and to facilitate melting and forming. By mixing all four of these network formers in appropriate concentrations, it is possible achieve stable bulk glass formation while minimizing the need for network modifiers such as alkali or alkaline earth oxides, which act to increase CTE and modulus. Like $SiO_2$, $Al_2O_3$ contributes to the rigidity to the glass network. Alumina can exist in the glass in either fourfold or fivefold coordination. In some embodiments, the glasses described herein comprise from about 5 mol % to about 12 mol % $Al_2O_3$ and, in particular embodiments, from about 6 mol % to about 10 mol % $Al_2O_3$.

Boron oxide ($B_2O_3$) is also a glass-forming oxide that is used to reduce viscosity and thus improves the ability to melt and form glass. $B_2O_3$ can exist in either threefold or fourfold coordination in the glass network. Threefold coordinated $B_2O_3$ is the most effective oxide for reducing the Young's modulus and shear modulus, thus improving the intrinsic damage resistance of the glass. Accordingly, the glasses described herein, in some embodiments, comprise from about 12 mol % up to about 35 mol % $B_2O_3$ and, in other embodiments, from about 18 mol % to about 30 mol % $B_2O_3$.

Alkaline earth oxides (MgO, CaO, and SrO), like $B_2O_3$, also improve the melting behavior of the glass. However, they also act to increase CTE and Young's and shear moduli. In some embodiments, the glasses described herein comprise up to about 5 mol % MgO, up to about 12 mol % CaO, and up to about 5 mol % SrO and, in other embodiments, up to about 3 mol % MgO, from about 2 mol % up to about 10 mol % CaO, and up to about 3 mol % SrO. In order to ensure that the vast majority of $B_2O_3$ in the glass is in the threefold coordinated state and thus obtain a high native scratch resistance, $(MgO)+(CaO)+(SrO) \leq (Al_2O_3)+1$ mol % in some embodiments, or, in other embodiments, $(MgO)+(CaO)+(SrO) \leq (Al_2O_3)$.

The glass may also include at least one fining agent such as $SnO_2$, $CeO_2$, $As_2O_3$, $Sb_2O_5$, $Cl^-$, $F^-$, or the like in small concentrations to aid in the elimination of gaseous inclusions during melting. In some embodiments, the glass may comprise up to about 0.7 mol % $SnO_2$, up to about 0.7 mol % $CeO_2$, up to about 0.5 mol % $As_2O_3$, and/or up to about 0.5 mol % $Sb_2O_3$. In other embodiments, at least one fining agent may comprise up to about 0.2 mol % $SnO_2$.

A small amount of $ZrO_2$ may also be introduced by contact of hot glass with zirconia-based refractory materials in the melter, and thus monitoring its level in the glass may be important to judging the rate of tank wear over time. The glass, may in some embodiments, include up to about 0.1 mol % $ZrO_2$. The glass may further comprise low concentrations of $Fe_2O_3$, as this material is a common impurity in batch materials. In some embodiments, the glass may include up to about 0.5 mol % $Fe_2O_3$ and, in other embodiments, up to about 0.2 mol % $Fe_2O_3$.

TABLE 1″

Exemplary compositions of glasses.

| mol % | 1″ | 2″ | 3″ | 4″ | 5″ | 6″ |
|---|---|---|---|---|---|---|
| $SiO_2$ | 67.11 | 65.75 | 65.82 | 65.79 | 65.81 | 65.63 |
| $Al_2O_3$ | 9.90 | 9.49 | 9.46 | 9.41 | 9.39 | 9.36 |
| $B_2O_3$ | 13.30 | 15.44 | 15.43 | 15.60 | 15.65 | 15.94 |
| $Na_2O$ | 0.04 | 0.04 | 0.04 | 0.04 | 0.04 | 0.04 |
| $K_2O$ | 0.02 | 0.02 | 0.02 | 0.02 | 0.02 | 0.01 |
| MgO | 0.39 | 0.39 | 0.39 | 0.39 | 0.21 | 0.19 |
| CaO | 8.92 | 8.72 | 8.73 | 8.66 | 8.75 | 8.64 |
| SrO | 0.21 | 0.07 | 0.02 | 0.01 | 0.01 | 0.01 |
| BaO | 0.00 | 0.00 | 0.00 | 0.00 | 0.00 | 0.00 |
| $SnO_2$ | 0.07 | 0.05 | 0.05 | 0.05 | 0.08 | 0.11 |
| $ZrO_2$ | 0.03 | 0.02 | 0.03 | 0.03 | 0.03 | 0.05 |
| $Fe_2O_3$ | 0.01 | 0.01 | 0.01 | 0.01 | 0.01 | 0.01 |
| Total | 100.00 | 100.00 | 100.00 | 100.00 | 100.00 | 100.00 |
| mol % | 7″ | 8″ | 9″ | 10″ | 11″ | 12″ |
| $SiO_2$ | 66.14 | 66.35 | 66.59 | 66.45 | 67.24 | 67.51 |
| $Al_2O_3$ | 9.17 | 8.81 | 8.38 | 8.01 | 7.66 | 7.45 |
| $B_2O_3$ | 15.81 | 16.27 | 16.90 | 17.72 | 17.60 | 17.87 |
| $Na_2O$ | 0.04 | 0.04 | 0.04 | 0.04 | 0.04 | 0.04 |
| $K_2O$ | 0.02 | 0.01 | 0.01 | 0.01 | 0.01 | 0.01 |
| MgO | 0.19 | 0.18 | 0.17 | 0.17 | 0.15 | 0.00 |
| CaO | 8.47 | 8.17 | 7.75 | 7.39 | 7.07 | 6.90 |
| SrO | 0.01 | 0.01 | 0.01 | 0.01 | 0.01 | 0.01 |
| BaO | 0.00 | 0.00 | 0.00 | 0.00 | 0.00 | 0.00 |
| $SnO_2$ | 0.10 | 0.10 | 0.09 | 0.12 | 0.12 | 0.11 |
| $ZrO_2$ | 0.04 | 0.05 | 0.04 | 0.07 | 0.08 | 0.08 |
| $Fe_2O_3$ | 0.01 | 0.01 | 0.01 | 0.01 | 0.01 | 0.01 |
| Total | 100.00 | 100.00 | 100.00 | 100.00 | 100.00 | 100.00 |
| mol % | 13″ | 14″ | 15″ | 16″ | 17″ | 18″ |
| $SiO_2$ | 67.54 | 67.48 | 67.41 | 66.80 | 67.49 | 67.38 |
| $Al_2O_3$ | 7.32 | 7.27 | 7.27 | 7.20 | 7.23 | 7.22 |
| $B_2O_3$ | 17.94 | 18.11 | 18.17 | 18.94 | 18.19 | 18.29 |
| $Na_2O$ | 0.04 | 0.04 | 0.04 | 0.04 | 0.04 | 0.04 |
| $K_2O$ | 0.01 | 0.01 | 0.01 | 0.01 | 0.01 | 0.01 |
| MgO | 0.15 | 0.15 | 0.15 | 0.15 | 0.15 | 0.15 |
| CaO | 6.79 | 6.75 | 6.76 | 6.67 | 6.71 | 6.73 |
| SrO | 0.01 | 0.01 | 0.01 | 0.01 | 0.01 | 0.01 |
| BaO | 0.00 | 0.00 | 0.00 | 0.00 | 0.00 | 0.00 |
| $SnO_2$ | 0.10 | 0.10 | 0.10 | 0.09 | 0.09 | 0.09 |
| $ZrO_2$ | 0.08 | 0.06 | 0.06 | 0.07 | 0.06 | 0.06 |
| $Fe_2O_3$ | 0.01 | 0.01 | 0.01 | 0.01 | 0.01 | 0.01 |
| Total | 100.00 | 100.00 | 100.00 | 100.00 | 100.00 | 100.00 |
| mol % | 19″ | 20″ | 21″ | 22″ | 23″ | 24″ |
| $SiO_2$ | 66.56 | 64.20 | 61.34 | 59.18 | 60.52 | 60.66 |
| $Al_2O_3$ | 7.39 | 7.46 | 8.17 | 8.08 | 8.25 | 8.24 |
| $B_2O_3$ | 18.75 | 20.87 | 22.04 | 24.39 | 22.71 | 22.60 |
| $Na_2O$ | 0.04 | 0.04 | 0.04 | 0.04 | 0.04 | 0.04 |
| $K_2O$ | 0.01 | 0.01 | 0.01 | 0.01 | 0.01 | 0.01 |
| MgO | 0.16 | 0.15 | 0.17 | 0.17 | 0.18 | 0.18 |
| CaO | 6.91 | 7.06 | 7.92 | 7.90 | 8.07 | 8.04 |
| SrO | 0.01 | 0.01 | 0.01 | 0.01 | 0.01 | 0.01 |
| BaO | 0.00 | 0.00 | 0.00 | 0.00 | 0.00 | 0.00 |
| $SnO_2$ | 0.10 | 0.11 | 0.17 | 0.13 | 0.12 | 0.12 |
| $ZrO_2$ | 0.06 | 0.07 | 0.11 | 0.07 | 0.07 | 0.08 |
| $Fe_2O_3$ | 0.01 | 0.01 | 0.01 | 0.01 | 0.01 | 0.01 |
| Total | 100.00 | 100.00 | 100.00 | 100.00 | 100.00 | 100.00 |
| mol % | 25″ | 26″ | 27″ | 28″ | 29″ | 30″ |
| $SiO_2$ | 58.20 | 60.20 | 60.27 | 58.75 | 60.33 | 60.32 |
| $Al_2O_3$ | 8.53 | 8.12 | 8.08 | 7.87 | 8.09 | 8.07 |
| $B_2O_3$ | 24.88 | 23.24 | 23.30 | 25.21 | 23.19 | 23.22 |
| $Na_2O$ | 0.04 | 0.04 | 0.04 | 0.03 | 0.03 | 0.03 |
| $K_2O$ | 0.01 | 0.02 | 0.01 | 0.01 | 0.01 | 0.01 |
| MgO | 0.26 | 0.30 | 1.95 | 2.55 | 3.04 | 3.16 |
| CaO | 7.89 | 7.77 | 6.14 | 5.36 | 5.08 | 4.96 |
| SrO | 0.01 | 0.01 | 0.01 | 0.01 | 0.01 | 0.01 |
| BaO | 0.00 | 0.00 | 0.00 | 0.00 | 0.00 | 0.00 |
| $SnO_2$ | 0.11 | 0.16 | 0.11 | 0.11 | 0.12 | 0.12 |
| $ZrO_2$ | 0.07 | 0.12 | 0.08 | 0.08 | 0.09 | 0.09 |
| $Fe_2O_3$ | 0.01 | 0.01 | 0.01 | 0.01 | 0.01 | 0.01 |
| Total | 100.00 | 100.00 | 100.00 | 100.00 | 100.00 | 100.00 |
| mol % | 31″ | 32″ | 33″ | 34″ | 35″ | 36″ |
| $SiO_2$ | 58.80 | 60.59 | 60.69 | 61.01 | 60.98 | 59.86 |
| $Al_2O_3$ | 7.89 | 8.16 | 8.24 | 8.27 | 8.29 | 8.12 |

TABLE 1''-continued

Exemplary compositions of glasses.

| | | | | | | |
|---|---|---|---|---|---|---|
| $B_2O_3$ | 25.23 | 23.43 | 23.85 | 23.85 | 23.96 | 25.52 |
| $Na_2O$ | 0.03 | 0.03 | 0.04 | 0.04 | 0.04 | 0.05 |
| $K_2O$ | 0.01 | 0.01 | 0.01 | 0.01 | 0.01 | 0.01 |
| MgO | 3.19 | 3.44 | 3.67 | 3.84 | 3.89 | 3.84 |
| CaO | 4.64 | 4.09 | 3.26 | 2.72 | 2.56 | 2.34 |
| SrO | 0.01 | 0.01 | 0.01 | 0.01 | 0.01 | 0.01 |
| BaO | 0.00 | 0.00 | 0.00 | 0.00 | 0.00 | 0.00 |
| $SnO_2$ | 0.11 | 0.12 | 0.11 | 0.13 | 0.13 | 0.12 |
| $ZrO_2$ | 0.10 | 0.10 | 0.10 | 0.11 | 0.12 | 0.12 |
| $Fe_2O_3$ | 0.01 | 0.01 | 0.01 | 0.01 | 0.01 | 0.01 |
| Total | 100.00 | 100.00 | 100.00 | 100.00 | 100.00 | 100.00 |

The high amount of boron present provides the glass with a high level of intrinsic or "native" scratch resistance without chemical strengthening by ion exchange. Scratch resistance is determined by Knoop scratch threshold testing. In Knoop threshold testing, a mechanical tester holds a Knoop diamond in which a glass is scratched at increasing loads to determine the onset of lateral cracking; i.e., sustained cracks that are greater than twice the width of the original scratch/groove. This onset of lateral cracking is defined as the "Knoop Scratch Threshold." The glasses described herein have a minimum Knoop scratch threshold of about 15 N (Newtons). In some embodiments, the Knoop scratch threshold is at least 20 N and, in other embodiments, at least about 25 N.

Photographs of Knoop scratch test results for glass sample 25" in Table 1" are shown in FIGS. 6a-f. The glass was not ion exchanged prior to testing. At loads of up to 26 N (FIGS. 26a-d), no lateral cracking associated with the original scratch 200" is observed. Lateral cracking 202" is observed at a load of 28 N (FIG. 6e), but the degree of lateral cracking 212" is less than twice the width of the original scratch 202". The Knoop Scratch Threshold for the glass is reached at a load of 30 N (FIG. 6f), as the lateral observed cracking 214" is greater than twice the width of the original scratch 204".

In comparison to the glasses described herein, other alkaline earth borosilicate glasses (Eagle XG® Glass, manufactured by Corning Incorporated) exhibit a Knoop Scratch Threshold of 8-10 N, and ion exchanged alkali aluminosilicate glasses (Gorilla® Glass and Gorilla® Glass 3, manufactured by Corning Incorporated) exhibit Knoop Scratch Thresholds of 3.9-4.9 N and 9.8-12 N. respectively.

A method of making the glasses described herein is also provided. The method includes providing a glass melt comprising $SiO_2$, $B_2O_3$, and at least one of $Al_2O_3$ and $P_2O_5$, wherein the glass melt is substantially free of alkali metal oxide modifiers, and down-drawing the glass melt to form the glass. In some embodiments, the step of down-drawing the glass comprises slot-drawing the glass melt and, in other embodiments, fusion-drawing the glass melt.

In certain embodiments, the method further includes providing a core glass melt and fusion drawing the core glass melt to form a core glass having a coefficient of thermal expansion that is less than the coefficient of thermal expansion of the clad glass. The clad glass melt is then fusion drawn to form the clad glass layer, thereby surrounding the core glass. The clad glass layer is under a compressive stress of at least about 40 MPa and, in some embodiments, at least about 80 MPa.

Being substantially free of alkali metals, the glasses described herein are suitable for use in thin film transistor (TFT) display applications. These applications require an alkali-doped and alkali-free interface, since the presence of alkali ions poisons the thin film transistors. Thus, ion exchanged alkali-containing glasses are unsuitable for such applications. Glass laminates that employ the alkali-doped and alkali-free glasses described herein as a clad layer provide a strengthened glass product combined with an interface that is either alkali-doped and alkali-free or doped with a low level (<1 mol %) alkali metals or alkali metal oxides. In some embodiments, the alkali-doped and alkali-free glasses also have high annealing and strain points to reduce thermal compaction, which is desirable for TFT display substrates. The glasses described herein may also be used in color filter substrates, cover glasses, or touch interfaces in various electronic devices.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

Alkali-free phosphoboroaluminosilicate glasses are provided. The glasses include the network formers $SiO_2$, $B_2O_3$, and at least one of $Al_2O_3$ and $P_2O_5$. The glass may, in some embodiments, have a Young's modulus of less than about 78 GPa and/or a coefficient of thermal expansion, averaged over a temperature range from about 20° C. to about 300° C., of less than about $38 \times 10^{-7}$/° C. The glass may be used as a cover glass for electronic devices or as an outer clad layer for a glass laminate.

Accordingly, one aspect of the disclosure is to provide a glass comprising: from about 50 mol % to about 75 mol % $SiO_2$; from greater than 0 mol % to about 20 mol % $Al_2O_3$; from greater than 0 mol % to about 35 mol % $B_2O_3$; from greater than 0 mol % to about 20 mol % $P_2O_5$; up to about 5 mol % MgO; up to about 10 mol % CaO; up to about 5 mol % SrO; up to about 0.5 mol % $Fe_2O_3$; and up to about 0.1 mol % $ZrO_2$, wherein the glass is substantially free of alkali metal modifiers.

A second aspect of the disclosure is to provide a glass comprising $SiO_2$, $B_2O_3$, $Al_2O_3$, and $P_2O_3$. The glass is substantially free of alkali metal modifiers, and has at least one of a Young's modulus of less than about 78 GPa and a coefficient of thermal expansion, averaged over a temperature range from about 20° C. to about 300° C., of less than about $38 \times 10^{-7}$/° C.

A third aspect of the disclosure is to provide a glass laminate comprising a core glass and a clad glass laminated onto an outer surface of the core glass. The clad glass layer comprises $SiO_2$, $B_2O_3$, $Al_2O_3$, and $P_2O_3$, and is substantially free of alkali metal modifiers. The clad glass has a first coefficient of thermal expansion, averaged over a temperature range from about 20° C. to about 300° C., of less than about $38 \times 10^{-7}$/° C. and the core glass has a second coefficient of thermal expansion, averaged over a temperature range from about 20° C. to about 300° C., that is greater than the first coefficient of thermal expansion.

A fourth aspect of the disclosure is to provide a method of making a glass. The method comprises: providing a glass melt, the glass melt comprising $SiO_2$, $B_2O_3$, and at least one of $Al_2O_3$ and $P_2O_3$, wherein the glass melt is substantially free of alkali metal modifiers; and down-drawing the glass melt to form the glass In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %) and coefficients of thermal expansion (CTE) are expressed in terms of $10^{-7}/°$ C.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Referring to the drawings in general and to FIG. 7 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are glasses and glass articles made therefrom that comprise the network formers $SiO_2$, $Al_2O_3$, $B_2O_3$, and $P_2O_5$ and are free of alkali metals and alkali metal oxides and have low (i.e., less than about $40 \times 10^{-7}/°$ C. when measured over a temperature range from about 20° C. to about 300° C.) coefficients of thermal expansion (CTE). In addition, the amount of alkaline earth oxides is also minimized in order to further reduce the CTE of the glass. In some embodiments, these glasses also have low values of Young's modulus and shear modulus to improve the intrinsic or native damage resistance of the glass.

In some embodiments, the glasses described herein are formable by down-draw processes that are known in the art, such as slot-draw and fusion-draw processes. The fusion draw process is an industrial technique that has been used for the large-scale manufacture of thin glass sheets. Compared to other flat glass manufacturing techniques, such as the float or slot draw processes, the fusion draw process yields thin glass sheets with superior flatness and surface quality. As a result, the fusion draw process has become the dominant manufacturing technique in the fabrication of thin glass substrates for liquid crystal displays, as well as for cover glass for personal electronic devices such as notebooks, entertainment devices, tables, laptops, and the like.

The fusion draw process involves the flow of molten glass over a trough known as an "isopipe," which is typically made of zircon or another refractory material. The molten glass overflows the top of the isopipe from both sides, meeting at the bottom of the isopipe to form a single sheet where only the interior of the final sheet has made direct contact with the isopipe. Since neither exposed surface of the final glass sheet has made contact with the isopipe material during the draw process, both outer surfaces of the glass are of pristine quality and do not require subsequent finishing.

In order to be fusion drawable, a glass must have a sufficiently high liquidus viscosity (i.e., the viscosity of a molten glass at the liquidus temperature). In some embodiments, the glasses described herein have a liquidus viscosity of at least about 150 kilopoise (kpoise). In some embodiments, these glasses have a liquidus viscosity of at least about 300 kpoise.

Traditional fusion draw is accomplished using a single isopipe, resulting in a homogeneous glass product. The more complicated laminate fusion process makes use of two isopipes to form a laminated sheet comprising a core glass composition surrounded on either (or both) side by outer clad layers. One of the main advantages of laminate fusion is that when the coefficient of thermal expansion of the clad glass is less than that of the core glass, the CTE difference results in a compressive stress in the outer clad layer. This compressive stress increases the strength of the final glass product without the need for ion exchange treatment. Unlike ion exchange, this strengthening can be achieved without the use of alkali ions in the glass.

Accordingly, in some embodiments, the alkali-free glasses described herein may be used to form a glass laminate, schematically shown in FIG. 7. Glass laminate 100''' comprises a core glass 110''' surrounded by a clad glass 120''' or "clad layer" formed from the alkali-free glass described herein. The core glass 110''' has a CTE that is greater than that of the alkali-free glass in the clad layer 120'''. The core glass may, in some embodiments, be an alkali aluminosilicate glass. In one non-limiting example, the core glass is an alkali aluminosilicate glass having the composition 66.9 mol % $SiO_2$, 10.1 mol % $Al_2O_3$, 0.58 mol % $B_2O_3$, 7.45 mol % $Na_2O$, 8.39 mol % $K_2O$, 5.78 mol % MgO, 0.58 mol % CaO, 0.2 mol % $SnO_2$, 0.01 mol % $ZrO_2$, and 0.01 mol % $Fe_2O_3$, with a strain point of 572° C., an anneal point of 629° C., a softening point of 888° C., and CTE=$95.5 \times 10^{-7}/°$ C.

When employed as a clad glass in a laminated product, the alkali-free glass compositions described herein can provide high compressive stresses to the clad layer. The CTE of alkali-free fusion formable glasses are generally in the range of $30 \times 10^{-7}/°$ C. or less. When such a glass is paired with, for example, an alkali aluminosilicate glass (e.g., Gorilla® Glass, manufactured by Corning Incorporated) having a CTE of $90 \times 10^{-7}/°$ C., the expected compressive stress in the clad glass can be calculated using the elastic stress equations given below in which subscripts 1 and 2 refer to the core glass and the clad glass, respectively:

$$\sigma_2 = \frac{E_1(e_2 - e_1)}{(\frac{E_1}{E_2}(1 - v_2)) + (\frac{2t_2}{t_1}(1 - v_1))}$$

and $$\sigma_1 = -\frac{2t_2}{t_1}\sigma_2$$

where E is Young's modulus, v is Poisson's ratio, t is the glass thickness, σ is the stress, and $e_2 - e_1$ is the difference in thermal expansion between the clad glass and the core glass. Using the same elastic modulus and Poisson's ratio for the clad glass and core glass further simplifies the above equations.

To calculate the difference in thermal expansion between the clad glass and core glass, one assumes that the stress sets in below the strain point of the softer glass of the clad and core. The stresses in the clad glass can be estimated using these assumptions and the equations above. For typical display-like glass with a CTE of $30 \times 10^{-7}/°$ C. as the clad glass and an alkali aluminosilicate core glass with CTE of $90 \times 10^{-7}/°$ C., overall thicknesses in the range of 0.5-1.0 mm and clad glass thickness of 10-100 μm, the compressive stress of the clad glass is estimated to be in a range from about 200 MPa to about 315 MPa. As seen in Table 2 below, several the alkali-free glass samples have coefficients of thermal expansion in the range from about 15 to about $13 \times 10^{-7}/°$ C. For these glasses, the compressive stress of the clad glass layer would be in a range from 240 MPa to about 400 MPa.

The alkali-free glasses described herein have especially low coefficients of thermal expansion. In some embodiments, the CTE, which is averaged over a temperature range from about 20° C. to about 300° C., is less than less than $38 \times 10^{-7}/°$ C. In other embodiments the CTE of the glass averaged over a temperature range from about 20° C. to about 300° C. is less than about $20 \times 10^{-7}/°$ C. When paired with a core glass having a higher CTE, the glasses described herein provide a high level of compressive stress in the clad layers of the final laminated glass product. This increases the strength of the glass laminate product. Room-temperature compressive stresses of at least about 100 MPa and, in some embodiments, at least about 400 MPa are attainable by using the glasses disclosed herein in the clad layer of the laminate.

The alkali-free glasses have values of Young's modulus and shear modulus that are significantly less than those of other commercially available fusion-drawn glasses. In some embodiments, the Young's modulus is less than about 78 gigapascals (GPa), in other embodiments, less than about 70 GPa, and in still other embodiments, less than about 60 GPa. The low elastic moduli provide these glasses with a high level of intrinsic damage resistance.

In some embodiments, these alkali-free glasses have strain points of less than 800° C.

In some embodiments, the glasses described herein consist essentially of or comprise: from about 50 mol % to about 75 mol % $SiO_2$ (i.e., 50 mol %≤$SiO_2$≤75 mol %); from greater than 0 mol % to about 20 mol % $Al_2O_3$ (i.e., 0 mol %≤$Al_2O_3$≤20 mol %); from greater than 0 mol % to about 35 mol % $B_2O_3$ (i.e., 0 mol %≤$B_2O_3$≤35 mol %); from greater than 0 mol % to about 20 mol % $P_2O_5$ (i.e., 0 mol %≤$P_2O_5$≤20 mol %); up to about 5 mol % MgO (i.e., 0 mol %≤MgO≤5 mol %); up to about 10 mol % CaO (i.e., 0 mol %≤CaO≤10 mol %); up to about 5 mol % SrO (i.e., 0 mol %≤SrO≤5 mol %); up to about 0.5 mol % $Fe_2O_3$ (i.e., 0 mol %≤$Fe_2O_3$≤0.5 mol %); up to about 0.1 mol % $ZrO_2$ (i.e., 0 mol %≤$ZrO_2$≤0.1 mol %); and, optionally, at least one fining agent such as $SnO_2$, $CeO_2$, $As_2O_3$, $Sb_2O_5$, $Cl^-$, $F^-$, or the like. The at least one fining agent may, in some embodiments, include up to about 0.7 mol % $SnO_2$ (i.e., 0 mol %≤$SnO_2$≤0.5 mol %); up to about 0.5 mol % $As_2O_3$ (i.e., 0 mol %≤$As_2O_3$≤0.5 mol %); and up to about 0.5 mol % $Sb_2O_3$ (i.e., 0 mol %≤$Sb_2O_3$≤0.5 mol %).

In particular embodiments, the glasses consist essentially of or comprise: from about 55 mol % to about 72 mol % $SiO_2$ (i.e., 55 mol %≤$SiO_2$≤75 mol %); from greater than 0 mol % to about 16 mol % $Al_2O_3$ (i.e., 0 mol %≤$Al_2O_3$≤16 mol %); from about 8 mol % to about 35 mol % $B_2O_3$ (i.e., 8 mol %≤$B_2O_3$≤35 mol %); from about 3 mol % to about 20 mol % $P_2O_5$ (i.e., 3 mol %≤$P_2O_5$≤20 mol %); up to about 5 mol % MgO (i.e., 0 mol %≤MgO≤5 mol %); up to about 0.2 mol % CaO (i.e., 0 mol %≤CaO≤0.2 mol %); up to about 0.2 mol % SrO (i.e., 0 mol %≤SrO≤0.2 mol %); up to about 0.1 mol % $ZrO_2$ (i.e., 0 mol %≤$ZrO_2$≤0.1 mol %). The glass may further include at least one fining agent such as $SnO_2$, $CeO_2$, $As_2O_3$, $Sb_2O_5$, $Cl^-$, $F^-$, or the like. The at least one fining agent may, in some embodiments, include up to about 0.2 mol % $SnO_2$ (i.e., 0 mol %≤$SnO_2$≤0.2 mol %).

In some embodiments, the total amount of MgO, CaO, and SrO in the glasses described herein is less than or equal to about 5 mol %, in other embodiments, less than or equal to about 0.2 mol % and, in particular embodiments, the glass is substantially free of alkaline earth modifiers.

Compositions and of non-limiting examples of these glasses are listed in Tables 1a'''-d'''. Properties of examples 1'''-20''' in Tables 1a'''-d''' are listed in Table 2'''. Each of the oxide components of these glasses serves a function. Silica ($SiO_2$) is the primary glass forming oxide, and forms the network backbone for the molten glass. Pure $SiO_2$ has a low CTE and is alkali metal-free. Due to its extremely high melting temperature, however, pure $SiO_2$ is incompatible with the fusion draw process. The viscosity curve is also much too high to match with any core glass in a laminate structure. In some embodiments, the amount of $SiO_2$ in the glasses described herein ranges from about 50 mol % to about 75 mol %. In other embodiments, the $SiO_2$ concentration ranges from about 55 mol % to about 72 mol %.

In addition to silica, three network formers—$Al_2O_3$, $B_2O_3$, and $P_2O_5$—are included in the glasses described herein to achieve stable glass formation, low CTE, low Young's modulus, low shear modulus, and to facilitate melting and forming. By mixing all four of these network formers in appropriate concentrations, it is possible achieve stable bulk glass formation while minimizing the need for network modifiers such as alkali or alkaline earth oxides, which act to increase CTE and modulus. Like $SiO_2$, $Al_2O_3$ contributes to the rigidity to the glass network. Alumina can exist in the glass in either fourfold or fivefold coordination. In some embodiments, the glasses described herein comprise from about 2 mol % to about 20 mol % $Al_2O_3$ and, in particular embodiments, from about 2 mol % to about 16 mol % $Al_2O_3$.

Boron oxide ($B_2O_3$) is also a glass-forming oxide that is used to reduce viscosity and thus improves the ability to melt and form glass. $B_2O_3$ can exist in either threefold or fourfold coordination in the glass network. Threefold coordinated $B_2O_3$ is the most effective oxide for reducing the Young's modulus and shear modulus, thus improving the intrinsic damage resistance of the glass. Accordingly, the glasses described herein comprise $B_2O_3$. In some embodiments, the glasses include up to about 35 mol % $B_2O_3$ and, in other embodiments, from about 8 mol % to about 35 mol % $B_2O_3$.

Phosphorous pentoxide ($P_2O_5$) is the fourth network former incorporated in these glasses. $P_2O_5$ adopts a quasi-tetrahedral structure in the glass network; i.e., it is coordinated with four oxygen atoms, but only three of which are connected to the rest of the network. The fourth oxygen is a terminal oxygen that is doubly bound to the phosphorous cation. Association of boron with phosphorus in the glass network can lead to a mutual stabilization of these network formers in tetrahedral configurations, as with $SiO_2$. Like $B_2O_3$, the incorporation of $P_2O_5$ in the glass network is highly effective at reducing Young's modulus and shear modulus. In some embodiments, the glasses described herein comprise from greater than 0 mol % to about 20 mol % $P_2O_5$ and, in other embodiments, from about 3 mol % to about 20 mol % $P_2O_5$.

Alkaline earth oxides (MgO, CaO, and SrO), like $B_2O_3$, also improve the melting behavior of the glass. However, they also act to increase CTE and Young's and shear moduli. In some embodiments, the glasses described herein comprise up to about 5 mol % MgO, up to about 10 mol % CaO, and up to about 5 mol % SrO and, in other embodiments, up to about 5 mol % MgO, up to about 0.2 mol % CaO, and up to about 0.2 mol % SrO. In some embodiments, the total amount of MgO, CaO, and SrO is less than or equal to about 0.2 mol %. In other embodiments, alkaline earth oxides are present only in trace contaminant levels (i.e., ≤100 ppm). In still other embodiments, the glass is substantially free of alkaline earth oxides.

The glass may also include at least one fining agent such as $SnO_2$, $CeO_2$, $As_2O_3$, $Sb_2O_5$, $Cl^-$, $F^-$, or the like in small concentrations to aid in the elimination of gaseous inclusions during melting. In some embodiments, the glass may comprise up to about 0.7 mol % $SnO_2$, up to about 0.5 mol % $As_2O_3$, and/or up to about 0.5 mol % $Sb_2O_3$. In other embodiments, at least one fining agent may comprise up to about 0.2 mol % $SnO_2$.

A small amount of $ZrO_2$ may also be introduced by contact of hot glass with zirconia-based refractory materials in the melter, and thus monitoring its level in the glass may be important to judging the rate of tank wear over time. The glass, may in some embodiments, include up to about 0.1 mol % $ZrO_2$. The glass may further comprise low concentrations of $Fe_2O_3$, as this material is a common impurity in batch materials. In some embodiments, the glass may include up to about 0.5 mol % $Fe_2O_3$.

TABLE 1a'''

Exemplary compositions of glasses.

| Analyzed (mol %) | 1''' | 2''' | 3''' | 4''' |
|---|---|---|---|---|
| $SiO_2$ | 65.62 | 64.75 | 65.63 | 61.14 |
| $Al_2O_3$ | 11.91 | 12.27 | 15.86 | 15.96 |
| $B_2O_3$ | 3.96 | 6.79 | 2.90 | 6.92 |
| $P_2O_5$ | 6.91 | 7.12 | 6.87 | 9.95 |
| MgO | 2.05 | 1.62 | 1.54 | 1.07 |
| CaO | 5.46 | 4.28 | 4.09 | 2.81 |
| SrO | 4.00 | 3.11 | 3.02 | 2.08 |
| $SnO_2$ | 0.07 | 0.07 | 0.07 | 0.07 |

| Analyzed (mol %) | 5''' | 6''' | 7''' |
|---|---|---|---|
| $SiO_2$ | 54.54 | 52.45 | 63.65 |
| $Al_2O_3$ | 16.16 | 18.71 | 15.75 |
| $B_2O_3$ | 7.02 | 10.02 | 0.04 |
| $P_2O_5$ | 10.19 | 9.91 | 6.89 |
| MgO | 2.16 | 1.57 | 2.05 |
| CaO | 5.70 | 4.17 | 7.50 |
| SrO | 4.15 | 3.08 | 4.03 |
| $SnO_2$ | 0.07 | 0.07 | 0.06 |

TABLE 1b'''

Exemplary compositions of glasses.

| Batched (mol %) | 8''' | 9''' | 10''' | 11''' | 12''' |
|---|---|---|---|---|---|
| $SiO_2$ | 60.74 | 62.89 | 64.45 | 64.47 | 66.60 |
| $Al_2O_3$ | 14.12 | 16.10 | 13.61 | 15.78 | 15.90 |
| $B_2O_3$ | 6.28 | 0.04 | 0.03 | 0.03 | 2.86 |
| $P_2O_5$ | 8.61 | 7.03 | 8.57 | 6.72 | 6.84 |
| MgO | 1.81 | 2.13 | 2.04 | 0.10 | 1.56 |
| CaO | 4.87 | 7.73 | 7.37 | 7.05 | 4.06 |
| SrO | 3.49 | 4.01 | 3.86 | 5.77 | 2.09 |
| $SnO_2$ | 0.06 | 0.05 | 0.05 | 0.06 | 0.06 |

| Batched (mol %) | 13''' | 14''' | 15''' | 16''' | 17''' |
|---|---|---|---|---|---|
| $SiO_2$ | 69.41 | 70.01 | 70.08 | 70.52 | 70.69 |
| $Al_2O_3$ | 17.80 | 17.75 | 15.62 | 13.76 | 11.73 |
| $B_2O_3$ | 0.04 | 1.92 | 1.87 | 1.85 | 1.92 |
| $P_2O_5$ | 7.05 | 6.66 | 6.87 | 6.71 | 6.73 |
| MgO | 1.60 | 1.02 | 1.57 | 2.06 | 2.56 |
| CaO | 2.93 | 1.88 | 2.85 | 3.68 | 4.58 |
| SrO | 1.09 | 0.69 | 1.06 | 1.35 | 1.69 |
| $SnO_2$ | 0.06 | 0.06 | 0.06 | 0.07 | 0.06 |

TABLE 1c'''

Exemplary compositions of glasses.

| Analyzed (mol %) | 18''' | 19''' | 20''' | 21''' | 22''' |
|---|---|---|---|---|---|
| $SiO_2$ | 69.54 | 69.83 | 69.89 | 70.07 | 70.01 |
| $Al_2O_3$ | 13.66 | 13.70 | 4.00 | 3.84 | 3.89 |
| $B_2O_3$ | 6.82 | 9.43 | 16.15 | 16.15 | 14.27 |
| $P_2O_5$ | 6.84 | 6.88 | 9.83 | 9.90 | 11.79 |
| MgO | 3.00 | 0.05 | 0.03 | 0.00 | 0.00 |
| CaO | 0.05 | 0.03 | 0.03 | 0.00 | 0.00 |
| SrO | 0.00 | 0.00 | 0.00 | 0.00 | 0.00 |
| $SnO_2$ | 0.07 | 0.08 | 0.07 | 0.04 | 0.04 |

| Analyzed (mol %) | 23''' | 24''' | 25''' | 26''' |
|---|---|---|---|---|
| $SiO_2$ | 69.92 | 71.91 | 70.10 | 66.00 |
| $Al_2O_3$ | 3.97 | 2.99 | 2.95 | 3.88 |
| $B_2O_3$ | 18.21 | 16.27 | 18.05 | 20.17 |
| $P_2O_5$ | 7.87 | 8.79 | 8.86 | 9.91 |
| MgO | 0.00 | 0.00 | 0.00 | 0.00 |
| CaO | 0.00 | 0.00 | 0.00 | 0.00 |
| SrO | 0.00 | 0.00 | 0.00 | 0.00 |
| $SnO_2$ | 0.03 | 0.03 | 0.03 | 0.04 |

TABLE 1d'''

Exemplary compositions of glasses.

| Analyzed (mol %) | 27''' | 28''' | 29''' | 30''' | 31''' |
|---|---|---|---|---|---|
| $SiO_2$ | 70.00 | 65.44 | 65.59 | 61.51 | 67.86 |
| $Al_2O_3$ | 3.92 | 3.79 | 1.92 | 3.79 | 3.80 |
| $B_2O_3$ | 16.06 | 20.85 | 22.81 | 24.78 | 18.39 |
| $P_2O_5$ | 9.88 | 9.83 | 9.57 | 9.83 | 9.88 |
| MgO | 0.04 | 0.02 | 0.03 | 0.02 | 0.00 |
| CaO | 0.02 | 0.02 | 0.02 | 0.02 | 0.00 |
| SrO | 0.00 | 0.00 | 0.00 | 0.00 | 0.00 |
| $SnO_2$ | 0.08 | 0.05 | 0.06 | 0.05 | 0.07 |

| Analyzed (mol %) | 32''' | 33''' | 34''' | 35''' | 36''' |
|---|---|---|---|---|---|
| $SiO_2$ | 64.30 | 62.45 | 60.33 | 58.41 | 56.09 |
| $Al_2O_3$ | 3.81 | 3.83 | 3.85 | 3.84 | 3.84 |
| $B_2O_3$ | 22.05 | 23.76 | 25.86 | 27.71 | 29.97 |
| $P_2O_5$ | 9.78 | 9.89 | 9.91 | 9.95 | 10.03 |
| MgO | 0.00 | 0.00 | 0.00 | 0.00 | 0.00 |
| CaO | 0.00 | 0.00 | 0.00 | 0.00 | 0.00 |
| SrO | 0.00 | 0.00 | 0.00 | 0.00 | 0.00 |

TABLE 1d'''-continued

Exemplary compositions of glasses.

| | | | | | |
|---|---|---|---|---|---|
| SnO$_2$ | 0.07 | 0.07 | 0.07 | 0.07 | 0.07 |

| Analyzed (mol %) | 37''' | 38''' | 39''' | 40''' | 41''' |
|---|---|---|---|---|---|
| SiO$_2$ | 70.61 | 68.58 | 65.70 | 66.00 | 69.61 |
| Al$_2$O$_3$ | 0.06 | 2.02 | 3.96 | 3.99 | 3.92 |
| B$_2$O$_3$ | 14.73 | 14.38 | 14.88 | 14.74 | 16.82 |
| P$_2$O$_5$ | 14.55 | 14.97 | 15.40 | 15.21 | 9.58 |
| MgO | 0.00 | 0.00 | 0.00 | 0.00 | 0.00 |

TABLE 1d'''-continued

Exemplary compositions of glasses.

| | | | | | |
|---|---|---|---|---|---|
| CaO | 0.00 | 0.00 | 0.00 | 0.00 | 0.00 |
| SrO | 0.00 | 0.00 | 0.00 | 0.00 | 0.00 |
| SnO$_2$ | 0.05 | 0.06 | 0.06 | 0.06 | 0.07 |

| Analyzed (mol %) | | | 42''' | 43''' | 44''' |
|---|---|---|---|---|---|
| SiO$_2$ | | | 69.75 | 61.99 | 62.11 |
| Al$_2$O$_3$ | | | 3.93 | 3.95 | 3.96 |
| B$_2$O$_3$ | | | 16.86 | 30.19 | 30.36 |
| P$_2$O$_5$ | | | 9.39 | 3.80 | 3.50 |
| MgO | | | 0.00 | 0.00 | 0.00 |
| CaO | | | 0.00 | 0.00 | 0.00 |
| SrO | | | 0.00 | 0.00 | 0.00 |
| SnO$_2$ | | | 0.07 | 0.07 | 0.07 |

TABLE 2'''

Properties of glasses listed in Tables 1a'''-d'''.

| | 1''' | 2''' | 3''' | 4''' | 5''' |
|---|---|---|---|---|---|
| Anneal Pt. (° C.): | 784.5 | 759.9 | 802.5 | 774.6 | 718.6 |
| Strain Pt. (° C.): | 729.9 | 706.4 | 746.1 | 718.3 | 671.4 |
| Softening Pt. (° C.): | 1155 | 1177.1 | 1061.8 | 1180.8 | |
| Density (g/cm$^3$): | 2.424 | 2.359 | 2.405 | 2.311 | 2.416 |
| CTE (× 10$^{-7}$/° C.): | 32.7 | 37.5 | 26.9 | | |
| Poisson's Ratio: | 0.215 | 0.224 | 0.210 | 0.214 | 0.216 |
| Shear Modulus (Mpsi): | 4.163 | 3.907 | 4.360 | 3.833 | 3.938 |
| Young's Modulus (Mpsi): | 10.113 | 9.568 | 10.552 | 9.309 | 9.580 |
| Shear Modulus (GPa)): | 28.70 | 26.94 | 30.06 | 26.43 | 27.15 |
| Young's Modulus (GPa): | 69.73 | 65.97 | 72.75 | 64.18 | 66.05 |

| | 6''' | 7''' | 8''' | 9''' | 10''' |
|---|---|---|---|---|---|
| Anneal Pt. (° C.): | 815.1 | 724.5 | 713 | 812 | 793 |
| Strain Pt. (° C.): | 763.9 | 672.8 | 657 | 758 | 740 |
| Softening Pt. (° C.): | 1047.4 | 1040 | N/A | 1050.9 | N/A |
| Density (g/cm$^3$): | 2.368 | 2.497 | 2.421 | 2.499 | 2.474 |
| CTE (× 10$^{-7}$/° C.): | 34.4 | 34.4 | 35.6 | | |
| Poisson's Ratio: | 0.225 | 0.231 | 0.236 | 0.218 | 0.218 |
| Shear Modulus (Mpsi): | 4.564 | 3.871 | 3.946 | 4.588 | 4.408 |
| Young's Modulus (Mpsi): | 11.181 | 9.533 | 9.756 | 11.171 | 10.734 |
| Shear Modulus (GPa)): | 31.47 | 26.69 | 27.21 | 31.63 | 30.39 |
| Young's Modulus (GPa): | 77.09 | 65.73 | 67.27 | 77.02 | 74.01 |

TABLE 2'''-continued

Properties of glasses listed in Tables 1a'''-d'''.

| | 11''' | 12''' | 13''' | 14''' | 15''' |
|---|---|---|---|---|---|
| Anneal Pt. (° C.): | 826 | 801 | 868 | 843 | 834 |
| Strain Pt. (° C.): | 771 | 734 | 799 | 767 | 760 |
| Softening Pt. (° C.): | 1061.8 | 1078.8 | 1146 | 1138.5 | 1129.5 |
| Density (g/cm$^3$): | 2.529 | 2.385 | 2.373 | 2.342 | 2.346 |
| CTE (× 10$^{-7}$/° C.): | 37.1 | 24.9 | 18.2 | 15.1 | 18.7 |
| Poisson's Ratio: | 0.218 | 0.216 | 0.212 | 0.222 | 0.219 |
| Shear Modulus (Mpsi): | 4.485 | 4.370 | 4.648 | 4.530 | 4.519 |
| Young's Modulus (Mpsi): | 10.921 | 10.627 | 11.269 | 11.067 | 11.015 |
| Shear Modulus (GPa)): | 30.92 | 30.13 | 32.05 | 31.23 | 31.16 |
| Young's Modulus (GPa): | 75.30 | 73.27 | 77.70 | 76.30 | 75.95 |

| | 16''' | 17''' | 18''' | 19''' | 20''' |
|---|---|---|---|---|---|
| Anneal Pt. (° C.): | 821 | 796 | 779 | 743 | 611 |
| Strain Pt. (° C.): | 757 | 736 | 707 | 667 | 549 |
| Softening Pt. (° C.): | | | | | 1052.3 |
| Density (g/cm$^3$): | 2.354 | 2.368 | 2.256 | | |
| CTE (× 10$^{-7}$/° C.): | 22.5 | 25.7 | 15.7 | 13.7 | 43.7 |
| Poisson's Ratio: | 0.230 | 0.213 | 0.203 | 0.213 | 0.181 |
| Shear Modulus (Mpsi): | 4.354 | 4.312 | 4.044 | 3.761 | 3.369 |
| Young's Modulus (Mpsi): | 10.715 | 10.463 | 9.727 | 9.124 | 7.955 |
| Shear Modulus (GPa)): | 30.02 | 29.73 | 27.88 | 25.93 | 23.23 |
| Young's Modulus (GPa): | 73.88 | 72.14 | 67.07 | 62.91 | 54.85 |

| | 21''' | 22''' | 23''' | 24''' | 25''' |
|---|---|---|---|---|---|
| Anneal Pt. (° C.): | 634.9 | 656.4 | 584.6 | 625.5 | 612.9 |
| Strain Pt. (° C.): | 558.1 | 587.7 | 492.3 | 549 | 531.8 |
| Softening Pt. (° C.): | 1076.4 | 985.6 | 1023 | 976.2 | 993.6 |
| Density (g/cm$^3$): | 2.202 | 2.241 | 2.185 | 2.196 | 2.196 |
| CTE (× 10$^{-7}$/° C.): | 47 | 34.6 | 54.4 | 42.8 | 43 |
| Poisson's Ratio: | 0.19 | 0.21 | 0.22 | 0.19 | 0.22 |
| Shear Modulus (Mpsi): | 3.38 | 3.65 | 3.12 | 3.33 | 3.24 |
| Young's Modulus (Mpsi): | 8.05 | 8.81 | 7.60 | 7.94 | 7.92 |

TABLE 2'''-continued

Properties of glasses listed in Tables 1a'''-d'''.

| | | | | | |
|---|---|---|---|---|---|
| Shear Modulus (GPa)): | 23.27 | 25.18 | 21.54 | 22.98 | 22.34 |
| Young's Modulus (GPa): | 55.52 | 60.74 | 52.41 | 54.71 | 54.59 |

| | 26''' | 27''' | 28''' | 29''' | 30''' |
|---|---|---|---|---|---|
| Anneal Pt. (° C.): | 589.9 | 603 | | | |
| Strain Pt. (° C.): | 508.7 | 556.3 | 640.72 | 643.27 | 604.16 |
| Softening Pt. (° C.): | 1069.8 | 1081 | 1068.7 | 996.4 | 1049.4 |
| Density (g/cm³): | 2.191 | 2.207 | 2.194 | 2.202 | 2.179 |
| CTE (× $10^{-7}$/° C.): | 49.9 | 44.7 | 47.1 | 38.2 | 50.1 |
| Poisson's Ratio: | 0.228 | 0.197 | 0.217 | 0.215 | 0.231 |
| Shear Modulus (Mpsi): | 3.145 | 3.363 | 3.139 | 3.197 | 2.965 |
| Young's Modulus (Mpsi): | 7.746 | 8.05 | 7.642 | 7.769 | 7.297 |
| Shear Modulus (GPa)): | 21.69 | 23.19 | 21.64 | 22.04 | 20.44 |
| Young's Modulus (GPa): | 53.41 | 55.50 | 52.69 | 53.57 | 50.31 |

| | 31''' | 32''' | 33''' | 34''' | 35''' |
|---|---|---|---|---|---|
| Anneal Pt. (° C.): | | | | | |
| Strain Pt. (° C.): | 656.64 | 626.12 | 596.12 | 581.75 | 546.89 |
| Softening Pt. (° C.): | 1077 | 1056.1 | 1046.9 | 1030.8 | 1015.7 |
| Density (g/cm³): | 2.193 | 2.184 | 2.179 | 2.172 | 2.167 |
| CTE (× $10^{-7}$/° C.): | 45.3 | 46.9 | 49.3 | 51 | 50.6 |
| Poisson's Ratio: | 0.199 | 0.213 | 0.275 | 0.307 | 0.319 |
| Shear Modulus (Mpsi): | 3.243 | 3.024 | 2.937 | 2.856 | 2.795 |
| Young's Modulus (Mpsi): | 7.779 | 7.339 | 7.488 | 7.465 | 7.372 |
| Shear Modulus (GPa)): | 22.36 | 20.85 | 20.25 | 19.69 | 19.27 |
| Young's Modulus (GPa): | 53.63 | 50.60 | 51.63 | 51.47 | 50.83 |

| | 36''' | 37''' | 38''' | 39''' |
|---|---|---|---|---|
| Anneal Pt. (° C.): | | | | |
| Strain Pt. (° C.): | 535.92 | 724.14 | 736.31 | 722.71 |
| Softening Pt. (° C.): | 1014 | 1035.3 | 910.9 | 1093.9 |
| Density (g/cm³): | 2.161 | 2.327 | 2.315 | 2.299 |
| CTE (× $10^{-7}$/° C.): | 52.5 | 44.1 | 42.1 | 39.4 |
| Poisson's Ratio: | 0.212 | 0.171 | 0.177 | 0.196 |
| Shear Modulus (Mpsi): | 2.746 | 4.428 | 4.334 | 4.086 |

TABLE 2'''-continued

| Properties of glasses listed in Tables 1a'''-d'''. | | | | |
|---|---|---|---|---|
| Young's Modulus (Mpsi): | 6.655 | 10.372 | 10.201 | 9.771 |
| Shear Modulus (GPa)): | 18.93 | 30.53 | 29.88 | 28.17 |
| Young's Modulus (GPa): | 45.88 | 71.51 | 70.33 | 67.37 |

A method of making the glasses described herein is also provided. The method includes providing a glass melt comprising $SiO_2$, $B_2O_3$, and at least one of $Al_2O_3$ and $P_2O_3$, wherein the glass melt is substantially free of alkali metal modifiers, and down-drawing the glass melt to form the glass. In some embodiments, the step of down-drawing the glass comprises slot-drawing the glass melt and, in other embodiments, fusion-drawing the glass melt.

In certain embodiments, the method further includes providing a core glass melt and fusion drawing the core glass melt to form a core glass having a coefficient of thermal expansion that is less than the coefficient of thermal expansion of the clad glass. The clad glass melt is then fusion drawn to form the clad glass layer, thereby surrounding the core glass. The clad glass layer is under a compressive stress of at least about 400 MPa.

Being substantially free of alkali metals, the glasses described herein are suitable for use in thin film transistor (TFT) display applications. These applications require an alkali-free interface, since the presence of alkali ions poisons the thin film transistors. Thus, ion exchanged alkali-containing glasses are unsuitable for such applications. Glass laminates that employ the alkali-free glasses described herein as a clad layer provide a strengthened glass product combined with an alkali-free interface. In some embodiments, the alkali-free glasses also have high annealing and strain points to reduce thermal compaction, which is desirable for TFT display substrates. The glasses described herein may also be used in color filter transistor substrates, cover glasses, or touch interfaces in various electronic devices.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

What is claimed is:

1. A glass comprising:
   60 mol % ≤ $SiO_2$ ≤ 66 mol %;
   7 mol % ≤ $Al_2O_3$ ≤ 10 mol %;
   20.87 mol % ≤ $B_2O_3$ ≤ 30 mol %;
   SrO, MgO, and CaO each >0 mol %,
   wherein (SrO+MgO+CaO) ≤ 16 mol %; and
   wherein the glass comprises less than 1 mol % of alkali metal oxides.

2. The glass of claim 1, wherein (SrO+MgO+CaO) ≤ 12 mol %.

3. The glass of claim 2, wherein 4 mol % ≤ (SrO+MgO+CaO).

4. The glass of claim 1, wherein (SrO+MgO+CaO) ≤ $Al_2O_3$.

5. The glass of claim 4, wherein 4 mol % ≤ (SrO+MgO+CaO).

6. The glass of claim 1, wherein 4 mol % ≤ (SrO+MgO+CaO).

7. The glass of claim 1, wherein 60 mol % ≤ $SiO_2$ ≤ 65 mol %.

8. The glass of claim 1, wherein 7 mol % ≤ $Al_2O_3$ ≤ 9 mol %.

9. The glass of claim 1, wherein a majority of the $B_2O_3$ is in threefold coordinated state.

10. A glass comprising:
    60 mol % ≤ $SiO_2$ ≤ 66 mol %;
    7 mol % ≤ $Al_2O_3$ ≤ 10 mol %;
    18 mol % ≤ $B_2O_3$ ≤ 30 mol %, wherein a majority of the $B_2O_3$ is in threefold coordinated state;
    SrO, MgO, and CaO each >0 mol %,
    wherein 4 mol % ≤ (SrO+MgO+CaO) ≤ $Al_2O_3$; and
    wherein the glass comprises less than 1 mol % of alkali metal oxides.

11. The glass of claim 10, wherein 60 mol % ≤ $SiO_2$ ≤ 65 mol %.

12. The glass of claim 11, wherein 7 mol % ≤ $Al_2O_3$ ≤ 9 mol %.

13. A glass comprising:
    60 mol % ≤ $SiO_2$ ≤ 66 mol %;
    0 mol % ≤ $Al_2O_3$ ≤ 10 mol %;
    20.17 mol % ≤ $B_2O_3$ ≤ 30 mol %;
    ($Li_2O$+$Na_2O$+$K_2O$+MgO+CaO+SrO) ≤ $Al_2O_3$; and
    wherein the glass comprises less than 1 mol % of alkali metal oxides.

14. The glass of claim 13, wherein a majority of the $B_2O_3$ is in threefold coordinated state.

* * * * *